United States Patent
Karachale et al.

(10) Patent No.: US 8,990,695 B2
(45) Date of Patent: Mar. 24, 2015

(54) FLEXIBLE ARCHITECTURE FOR NOTIFYING APPLICATIONS OF STATE CHANGES

(75) Inventors: Jan Karachale, Sammamish, WA (US); Jason William Fuller, Bellevue, WA (US); Robert Levy, Virginia Beach, VA (US); Zeke Koch, Seattle, WA (US); Ardan Arac, Seattle, WA (US); Brian Cross, Redmond, WA (US); Ori M. Amiga, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 912 days.

(21) Appl. No.: 12/624,038

(22) Filed: Nov. 23, 2009

(65) Prior Publication Data

US 2010/0077310 A1     Mar. 25, 2010

Related U.S. Application Data

(63) Continuation of application No. 10/873,881, filed on Jun. 22, 2004, now Pat. No. 7,644,376.

(60) Provisional application No. 60/513,723, filed on Oct. 23, 2003.

(51) Int. Cl.
  *G06F 15/177* (2006.01)
  *H04L 29/08* (2006.01)
  (Continued)

(52) U.S. Cl.
  CPC ............... *H04L 67/26* (2013.01); *G06F 9/542* (2013.01); *G06Q 10/10* (2013.01); *H04L 67/325* (2013.01); *G06F 2209/544* (2013.01)
  USPC ........................................................ 715/736

(58) Field of Classification Search
  CPC ...................................................... G06F 9/542
  USPC ........................................................ 715/736
  See application file for complete search history.

(56) References Cited

U.S. PATENT DOCUMENTS

| 4,058,672 A | 11/1977 | Crager et al. | 370/394 |
| 4,780,821 A | 10/1988 | Crossley | 718/100 |

(Continued)

FOREIGN PATENT DOCUMENTS

| CA | 2120461 | 3/1994 |
| CN | 1429364 A | 7/2003 |

(Continued)

OTHER PUBLICATIONS

Amended Complaint for Patent Infringement, filed Oct. 6, 2010, in U.S. Dist. Court for the Western District of Washington, CA 2:10-cv-1577-RSM, 9 pgs.

(Continued)

*Primary Examiner* — William Bashore
*Assistant Examiner* — Henry Orr
(74) *Attorney, Agent, or Firm* — Merchant & Gould P.C.

(57) ABSTRACT

Described is a method and system a unified mechanism for storing device, application, and service state, as well as a rich notification brokerage architecture. Clients register with a notification broker to receive notifications for changes to state properties. When a registered state property changes, a notification broker determines which clients to notify of the state change and provides the client with a notification regarding the change. Clients may be notified whenever a state changes, when a state change meets a predetermined condition, or based on a schedule. An application may also be launched in response to a state change. An application programming interface (API) is provided that provides a unified way of accessing state change information across different components within the device.

18 Claims, 5 Drawing Sheets

(51) Int. Cl.
*G06F 9/54* (2006.01)
*G06Q 10/10* (2012.01)

(56) References Cited

U.S. PATENT DOCUMENTS

| | | | |
|---|---|---|---|
| 4,789,962 A | 12/1988 | Berry | 715/715 |
| 4,945,475 A | 7/1990 | Bruffey et al. | 1/1 |
| 4,945,476 A | 7/1990 | Bodick et al. | 600/301 |
| 4,987,531 A | 1/1991 | Nishikado et al. | 1/1 |
| 4,999,766 A | 3/1991 | Peters et al. | 1/1 |
| 5,058,000 A | 10/1991 | Cox et al. | 1/1 |
| 5,083,264 A | 1/1992 | Platteter et al. | 714/5.11 |
| 5,129,088 A | 7/1992 | Auslander et al. | 711/1 |
| 5,157,768 A | 10/1992 | Hoeber | 715/711 |
| 5,179,703 A | 1/1993 | Evans | 717/122 |
| 5,202,982 A | 4/1993 | Gramlich et al. | 1/1 |
| 5,202,983 A | 4/1993 | Orita et al. | 707/694 |
| 5,204,947 A | 4/1993 | Bernstein | 715/854 |
| 5,241,545 A | 8/1993 | Kazecki | 370/337 |
| 5,243,697 A | 9/1993 | Hoeber | 715/840 |
| 5,249,300 A | 9/1993 | Bachman | 1/1 |
| 5,287,502 A | 2/1994 | Kaneko | 1/1 |
| 5,291,595 A | 3/1994 | Martins | 1/1 |
| 5,297,249 A | 3/1994 | Bernstein | 715/854 |
| 5,307,494 A | 4/1994 | Yasumatsu et al. | 1/1 |
| 5,313,646 A | 5/1994 | Hendricks et al. | 1/1 |
| 5,317,733 A | 5/1994 | Murdock | 1/1 |
| 5,329,427 A | 7/1994 | Hogdahl | 361/730 |
| 5,333,266 A | 7/1994 | Boaz | 709/206 |
| 5,347,628 A | 9/1994 | Brewer | 715/775 |
| 5,355,497 A | 10/1994 | Cohen-Levy | 1/1 |
| 5,359,724 A | 10/1994 | Earle | 1/1 |
| 5,359,725 A | 10/1994 | Garcia et al. | 1/1 |
| 5,363,487 A | 11/1994 | Willman et al. | 710/8 |
| 5,367,671 A | 11/1994 | Feigenbaum et al. | 1/1 |
| 5,371,885 A | 12/1994 | Letwin | 1/1 |
| 5,388,257 A | 2/1995 | Bauer | 707/741 |
| 5,392,390 A | 2/1995 | Crozier | 715/751 |
| 5,392,427 A | 2/1995 | Barrett | 707/800 |
| 5,412,808 A | 5/1995 | Bauer | 707/822 |
| 5,421,001 A | 5/1995 | Methe | 1/1 |
| 5,434,974 A | 7/1995 | Loucks et al. | 1/1 |
| 5,437,029 A | 7/1995 | Sinha | 1/1 |
| 5,483,652 A | 1/1996 | Sudama et al. | 709/201 |
| 5,485,606 A | 1/1996 | Midgdey et al. | 1/1 |
| 5,530,828 A | 6/1996 | Kaki | 711/103 |
| 5,535,375 A | 7/1996 | Eshel | 703/27 |
| 5,537,592 A | 7/1996 | King | 707/756 |
| 5,579,517 A | 11/1996 | Reynolds | 1/1 |
| 5,581,686 A | 12/1996 | Koppolu | 715/784 |
| 5,596,755 A | 1/1997 | Pletcher | 710/261 |
| 5,598,370 A | 1/1997 | Niijima | 365/185.33 |
| 5,600,834 A | 2/1997 | Howard | 713/178 |
| 5,627,996 A | 5/1997 | Bauer | 703/20 |
| 5,630,081 A | 5/1997 | Rybicki | 715/839 |
| 5,647,002 A | 7/1997 | Brunson | 709/206 |
| 5,664,228 A | 9/1997 | Mital | 710/62 |
| 5,666,530 A | 9/1997 | Clark | 1/1 |
| 5,684,990 A | 11/1997 | Boothby | 1/1 |
| 5,694,606 A | 12/1997 | Pletcher | 710/261 |
| 5,701,423 A | 12/1997 | Crozier | 715/762 |
| 5,721,922 A | 2/1998 | Dingwall | 718/103 |
| 5,729,687 A | 3/1998 | Rothrock | 709/204 |
| 5,734,816 A | 3/1998 | Niijima | 714/6.13 |
| 5,737,601 A | 4/1998 | Jain | 707/622 |
| 5,745,418 A | 4/1998 | Ma | 365/185.33 |
| 5,745,752 A | 4/1998 | Hurvig | 1/1 |
| 5,745,902 A | 4/1998 | Miller | 1/1 |
| 5,754,848 A | 5/1998 | Hanes | 1/1 |
| 5,757,616 A | 5/1998 | May | 361/679.57 |
| 5,758,352 A | 5/1998 | Reynolds | 1/1 |
| 5,758,354 A | 5/1998 | Huang | 1/1 |
| 5,761,675 A | 6/1998 | Isenberg | 1/1 |
| 5,765,169 A | 6/1998 | Conner | 1/1 |
| 5,767,854 A | 6/1998 | Anwar | 715/848 |
| 5,787,262 A | 7/1998 | Shakib | 709/205 |
| 5,799,168 A | 8/1998 | Ban | 711/103 |
| 5,799,305 A | 8/1998 | Bortvedt | 1/1 |
| 5,805,830 A | 9/1998 | Reese | 709/205 |
| 5,812,749 A | 9/1998 | Fernandez | 714/4.4 |
| 5,812,773 A | 9/1998 | Norin | 709/204 |
| 5,812,793 A | 9/1998 | Shakib | 709/201 |
| 5,819,275 A | 10/1998 | Badger | 707/758 |
| 5,826,265 A | 10/1998 | Van Huben | 1/1 |
| 5,832,218 A | 11/1998 | Gibbs | 709/203 |
| 5,832,489 A | 11/1998 | Kucala | 1/1 |
| 5,856,978 A | 1/1999 | Anthias | 370/429 |
| 5,867,641 A | 2/1999 | Jenett | 714/6.32 |
| 5,878,408 A | 3/1999 | Van Huben | 1/1 |
| 5,884,323 A | 3/1999 | Hawkins | 1/1 |
| 5,884,325 A | 3/1999 | Bauer | 1/1 |
| 5,884,328 A | 3/1999 | Mosher | 1/1 |
| 5,887,198 A | 3/1999 | Houlberg | 710/62 |
| 5,903,752 A | 5/1999 | Dingwall | 718/103 |
| 5,920,873 A | 7/1999 | Van Huben | 1/1 |
| 5,924,094 A | 7/1999 | Sutter | 1/1 |
| 5,924,096 A | 7/1999 | Draper | 1/1 |
| 5,926,501 A | 7/1999 | Souissi | 375/131 |
| 5,926,805 A | 7/1999 | Hurvig | 707/690 |
| 5,928,329 A | 7/1999 | Clark | 709/227 |
| 5,930,268 A | 7/1999 | Johnson | 379/355.06 |
| 5,930,350 A | 7/1999 | Johnson | 379/355.06 |
| 5,937,425 A | 8/1999 | Ban | 711/103 |
| 5,943,055 A | 8/1999 | Sylvan | 715/839 |
| 5,956,473 A | 9/1999 | Ma | 714/5.1 |
| 5,960,406 A | 9/1999 | Rasansky | 705/7.18 |
| 5,961,590 A | 10/1999 | Mendez | 709/206 |
| 5,974,426 A | 10/1999 | Lee | 1/1 |
| 5,991,536 A * | 11/1999 | Brodsky et al. | 717/104 |
| 5,991,771 A | 11/1999 | Falls | 1/1 |
| 5,991,778 A | 11/1999 | Starek | 1/1 |
| 6,014,724 A | 1/2000 | Jenett | 711/103 |
| 6,016,478 A | 1/2000 | Zhang | 705/7.19 |
| 6,018,571 A | 1/2000 | Langlois | 379/201.04 |
| 6,018,761 A | 1/2000 | Uomini | 709/206 |
| 6,034,621 A | 3/2000 | Kaufman | 340/7.21 |
| 6,055,527 A | 4/2000 | Badger et al. | 1/1 |
| 6,058,401 A | 5/2000 | Stamos | 1/1 |
| 6,070,174 A | 5/2000 | Starek | 1/1 |
| 6,078,999 A | 6/2000 | Raju | 711/161 |
| 6,098,093 A * | 8/2000 | Bayeh et al. | 709/203 |
| 6,141,564 A | 10/2000 | Bruner | 455/558 |
| 6,208,996 B1* | 3/2001 | Ben-Shachar et al. | 1/1 |
| 6,269,254 B1 | 7/2001 | Mathis | 455/557 |
| 6,279,069 B1 | 8/2001 | Robinson | 711/103 |
| 6,347,051 B2 | 2/2002 | Yanagami | 365/185.09 |
| 6,393,485 B1* | 5/2002 | Chao et al. | 709/231 |
| 6,405,218 B1 | 6/2002 | Boothby | 1/1 |
| 6,584,185 B1 | 6/2003 | Nixom | 379/201.01 |
| 6,678,830 B1* | 1/2004 | Mustafa et al. | 713/310 |
| 6,741,994 B1 | 5/2004 | Kang | 1/1 |
| 6,874,094 B2* | 3/2005 | Parker | 713/310 |
| 6,915,457 B1* | 7/2005 | Miller | 714/43 |
| 6,922,708 B1* | 7/2005 | Sedlar | 1/1 |
| 6,928,300 B1* | 8/2005 | Skinner et al. | 455/556.2 |
| 7,030,837 B1* | 4/2006 | Vong et al. | 345/1.3 |
| 7,873,965 B2* | 1/2011 | Hayton et al. | 719/315 |
| 7,950,017 B1* | 5/2011 | Cain et al. | 719/310 |
| 2002/0046299 A1* | 4/2002 | Lefeber et al. | 709/318 |
| 2002/0052968 A1 | 5/2002 | Bonefas | 709/231 |
| 2002/0120679 A1* | 8/2002 | Hayton et al. | 709/203 |
| 2002/0143876 A1* | 10/2002 | Boyer et al. | 709/205 |
| 2002/0178077 A1* | 11/2002 | Katz et al. | 705/26 |
| 2002/0184407 A1 | 12/2002 | Shell | 719/328 |
| 2002/0194287 A1* | 12/2002 | Tyra et al. | 709/206 |
| 2003/0028602 A1* | 2/2003 | Bhattacharya | 709/206 |
| 2003/0083046 A1 | 5/2003 | Mathis | 455/412.1 |
| 2003/0148790 A1 | 8/2003 | Pappalardo | 455/558 |
| 2003/0159074 A1* | 8/2003 | Oar et al. | 713/300 |
| 2004/0066920 A1 | 4/2004 | Vandermeijden | 379/88.19 |
| 2004/0109436 A1* | 6/2004 | Vargas et al. | 370/350 |
| 2004/0204085 A1* | 10/2004 | Vargas et al. | 455/557 |

(56) References Cited

U.S. PATENT DOCUMENTS

| | | | | |
|---|---|---|---|---|
| 2004/0225901 | A1* | 11/2004 | Bear et al. | 713/300 |
| 2004/0243860 | A1* | 12/2004 | Green et al. | 713/300 |
| 2005/0091219 | A1 | 4/2005 | Karachale | 1/1 |

FOREIGN PATENT DOCUMENTS

| | | | |
|---|---|---|---|
| EP | 0462587 | 12/1996 | |
| EP | 0578205 | 3/2000 | |
| EP | 0994614 | 4/2000 | |
| EP | 0618540 | 12/2001 | |
| JP | 6441039 | 2/1989 | |
| JP | 1315843 | 12/1989 | |
| JP | 2148341 | 6/1990 | |
| JP | 4297934 | 10/1992 | |
| JP | 6019763 | 1/1994 | |
| JP | 08-129536 | 5/1996 | |
| JP | HEI 08-129536 | 5/1996 | G06F 15/16 |
| JP | 2003-44320 | 2/2003 | |
| JP | 2003-044320 | 2/2003 | G06F 11/30 |
| JP | 2003-337710 | 11/2003 | |
| WO | WO96/06393 | 2/1996 | |

OTHER PUBLICATIONS

Complaint for Patent Infringment, filed Nov. 10, 2010, in U.S. Dist. Court for the Southern District of Florida, CA 1:10-cv-24063-FAM, 15 pgs.

Defendant Microsoft Corporation's Answer and Counterclaims to Plaintiff's First Amended Complaint for Patent Infringement, filed Jan. 15, 2011, in U.S. Dist. Court for the Western District of Wisconsin, CA No. 3:10-cv-699, 39 pgs.

Defendant Microsoft Corporation's Answer and Counterclaims to Plaintiff's Complaint for Patent Infringement, filed Dec. 23, 2010, in U.S. Dist. Court for the Southern District of Florida, 21 pgs.

First Amended Complaint for Patent Infringement, filed Jan. 11, 2011, in U.S. Dist. Court for the Western District of Wisconsin, CA No. 3:10-cv-699, 13 pgs.

ITC Investigation No. 337-744, captioned: "*Certain Mobile Devices, Associated Software, and Components Thereof*" Doc. No. 583928-434900_1 "*Appendix B Index*".

ITC Investigation No. 337-744, captioned: "*Certain Mobile Devices, Associated Software, and Components Thereof*" Doc. No. 583929-434900_2 "*O'Malley Fetch Desk 1993*".

ITC Investigation No. 337-744, captioned: "*Certain Mobile Devices, Associated Software, and Components Thereof*" Doc. No. 583930-434900_3 "*Rohan Golden Retriever 1992*".

ITC Investigation No. 337-744, captioned: "*Certain Mobile Devices, Associated Software, and Components Thereof*" Doc. No. 583931-434900_4 "*Trivette Utility 60 Char 1988*".

ITC Investigation No. 337-744, captioned: "*Certain Mobile Devices, Associated Software, and Components Thereof*" Doc. No. 583932-434900_5 "*Wang Universal File 1990*".

ITC Investigation No. 337-744, captioned: "*Certain Mobile Devices, Associated Software, and Components Thereof*" Doc. No. 583933-434900_6 "*Tech Refs Cited*".

ITC Investigation No. 337-744, captioned: "*Certain Mobile Devices, Associated Software, and Components Thereof*" Doc. No. 583978-434901_1 "*Appendix B Index*".

ITC Investigation No. 337-744, captioned: "*Certain Mobile Devices, Associated Software, and Components Thereof*" Doc. No. 583990-434901_13 "*Software Sherlock 2.0, 1998*".

ITC Investigation No. 337-744, captioned: "*Certain Mobile Devices, Associated Software, and Components Thereof*" Doc. No. 583991-434901_14 "*Acerson WordPerfect 5.1 1990*".

ITC Investigation No. 337-744, captioned: "*Certain Mobile Devices, Associated Software, and Components Thereof*" Doc. No. 583992-434901_15 "*Allen Vices and Virtues 1993*".

ITC Investigation No. 337-744, captioned: "*Certain Mobile Devices, Associated Software, and Components Thereof*" Doc. No. 583993-434901_16 "*Almax Software Longer Filenames for DOS 1993*".

ITC Investigation No. 337-744, captioned: "*Certain Mobile Devices, Associated Software, and Components Thereof*" Doc. No. 583994-434901_17 "*Baird Benefits 4DOS 1993*".

ITC Investigation No. 337-744, captioned: "*Certain Mobile Devices, Associated Software, and Components Thereof*" Doc. No. 583995-434901_18 "*Berst Come Closer 1993*".

ITC Investigation No. 337-744, captioned: "*Certain Mobile Devices, Associated Software, and Components Thereof*" Doc. No. 583996-434901_19 "*Beta Systems DOS History 2003*".

ITC Investigation No. 337-744, captioned: "*Certain Mobile Devices, Associated Software, and Components Thereof*" Doc. No. 583997-434901_20 "*Blackwell WSC Launches Extend 199*".

ITC Investigation No. 337-744, captioned: "*Certain Mobile Devices, Associated Software, and Components Thereof*" Doc. No. 583998-434901_21 "*Bonner Build a Doc 1992*".

ITC Investigation No. 337-744, captioned: "*Certain Mobile Devices, Associated Software, and Components Thereof*" Doc. No. 583999-434901_22 "*Bonner GeoWorks 1990*".

ITC Investigation No. 337-744, captioned: "*Certain Mobile Devices, Associated Software, and Components Thereof*" Doc. No. 584000-434901_23 "*Bonner Whats in 1988*".

ITC Investigation No. 337-744, captioned: "*Certain Mobile Devices, Associated Software, and Components Thereof*" Doc. No. 584001-434901_24 "*Bonner Windows 3.1 1992*".

ITC Investigation No. 337-744, captioned: "*Certain Mobile Devices, Associated Software, and Components Thereof*" Doc. No. 584002-434901_25 "*Busch 4DOS 1992*".

ITC Investigation No. 337-744, captioned: "*Certain Mobile Devices, Associated Software, and Components Thereof*" Doc. No. 584003-434901_26 "*Capen Ultimate File Manager 1993*".

ITC Investigation No. 337-744, captioned: "*Certain Mobile Devices, Associated Software, and Components Thereof*" Doc. No. 584004-434901_27 "*Chin Using Unused Bytes 1991*".

ITC Investigation No. 337-744, captioned: "*Certain Mobile Devices, Associated Software, and Components Thereof*" Doc. No. 584005-434901_28 "*Clark Proposed DOS 1993*".

ITC Investigation No. 337-744, captioned: "*Certain Mobile Devices, Associated Software, and Components Thereof*" Doc. No. 584006-434901_29 "*Cluts Making Room 1996*".

ITC Investigation No. 337-744, captioned: "*Certain Mobile Devices, Associated Software, and Components Thereof*" Doc. No. 584007-434901_30 "*Comer The Tilde 1986*".

ITC Investigation No. 337-744, captioned: "*Certain Mobile Devices, Associated Software, and Components Thereof*" Doc. No. 584008-434901_31 "*Comm Rule 51(4) EPC 2000*".

ITC Investigation No. 337-744, captioned: "*Certain Mobile Devices, Associated Software, and Components Thereof*" Doc. No. 584009-434901_32 "*Crow Encapsulation of Applications 1989*".

ITC Investigation No. 337-744, captioned: "*Certain Mobile Devices, Associated Software, and Components Thereof*" Doc. No. 584010-434901_33 "*Dateline Gold Retr 2.0b 1993*".

ITC Investigation No. 337-744, captioned: "*Certain Mobile Devices, Associated Software, and Components Thereof*" Doc. No. 584011-434901_34 "*Dateline The Intell Way 1987*".

ITC Investigation No. 337-744, captioned: "*Certain Mobile Devices, Associated Software, and Components Thereof*" Doc. No. 584012-434901_35 "*Davis NT No Thanks 1993*".

ITC Investigation No. 337-744, captioned: "*Certain Mobile Devices, Associated Software, and Components Thereof*" Doc. No. 584013-434901_36 "*Derfler Build Workgroup Sol 1988*".

ITC Investigation No. 337-744, captioned: "*Certain Mobile Devices, Associated Software, and Components Thereof*" Doc. No. 584014-434901_37 "*DeVoney NT Has Arrived 1993*".

ITC Investigation No. 337-744, captioned: "*Certain Mobile Devices, Associated Software, and Components Thereof*" Doc. No. 584015-434902_38 "*Dig Res Intr ROM 1998*".

ITC Investigation No. 337-744, captioned: "*Certain Mobile Devices, Associated Software, and Components Thereof*" Doc. No. 584016-434901_39 "*Duncan Comparing DOS 1989*".

ITC Investigation No. 337-744, captioned: "*Certain Mobile Devices, Associated Software, and Components Thereof*" Doc. No. 584017-434901_40 "*Duncan Des Goals 1989*".

(56) References Cited

OTHER PUBLICATIONS

ITC Investigation No. 337-744, captioned: "*Certain Mobile Devices, Associated Software, and Components Thereof*" Doc. No. 584018-434901_41 "*Duncan Getting Acquainted Prt 1 1990*".
ITC Investigation No. 337-744, captioned: "*Certain Mobile Devices, Associated Software, and Components Thereof*" Doc. No. 584019-434901_42 "*Duncan Getting Acquainted Prt 2 1990*".
ITC Investigation No. 337-744, captioned: "*Certain Mobile Devices, Associated Software, and Components Thereof*" Doc. No. 584020-434901_43 "*Duncan Using Long File Names Prt 1 1990*".
ITC Investigation No. 337-744, captioned: "*Certain Mobile Devices, Associated Software, and Components Thereof*" Doc. No. 584021-434901_44 "*Duncan Using Long File Names Prt 2 1990*".
ITC Investigation No. 337-744, captioned: "*Certain Mobile Devices, Associated Software, and Components Thereof*" Doc. No. 584022-434901_45 "*CD-ROM Rock Ridge Group 1991*".
ITC Investigation No. 337-744, captioned: "*Certain Mobile Devices, Associated Software, and Components Thereof*" Doc. No. 584023-434901_46 "*Florida Sun Flash Rock Ridge Prel CD-ROM Specs 1991*".
ITC Investigation No. 337-744, captioned: "*Certain Mobile Devices, Associated Software, and Components Thereof*" Doc. No. 584024-434901_47 "*Fowler Cross Talking 1993*".
ITC Investigation No. 337-744, captioned: "*Certain Mobile Devices, Associated Software, and Components Thereof*" Doc. No. 584025-434901_48 "*Freed High End 1992*".
ITC Investigation No. 337-744, captioned: "*Certain Mobile Devices, Associated Software, and Components Thereof*" Doc. No. 584026-434901_49 "*Fuchs DOS FAQ 2004*".
ITC Investigation No. 337-744, captioned: "*Certain Mobile Devices, Associated Software, and Components Thereof*" Doc. No. 584027-434901_50 "*Giovetti Way You Work 1992*".
ITC Investigation No. 337-744, captioned: "Certain Mobile Devices, Associated Software, and Components Thereof" Doc. No. 583831-434896_1 "Appendix A Index—CD 2 of 5".
ITC Investigation No. 337-744, captioned: "Certain Mobile Devices, Associated Software, and Components Thereof" Doc. No. 583843-434896_13 "Appendix A4_013 Duncan Des Goals 1989".
ITC Investigation No. 337-744, captioned: "Certain Mobile Devices, Associated Software, and Components Thereof" Doc. No. 583844-434896_14 "Appendix A4_014 Duncan Using Long File Names Prt 1 1990".
ITC Investigation No. 337-744, captioned: "Certain Mobile Devices, Associated Software, and Components Thereof" Doc. No. 583845-434896_15 "Appendix A4_015.Duncan Using Long File Names Prt 2 1990".
ITC Investigation No. 337-744, captioned: "Certain Mobile Devices, Associated Software, and Components Thereof" Doc. No. 583846-434896_16 "Appendix A4_016 Leffler 4.3BSD Unix 1989".
ITC Investigation No. 337-744, captioned: "Certain Mobile Devices, Associated Software, and Components Thereof" Doc. No. 583847-434896_17 "Appendix A4_017 Wang Universal File 1990".
ITC Investigation No. 337-744, captioned: "Certain Mobile Devices, Associated Software, and Components Thereof" Doc. No. 583848-434896_18 "Appendix A4_018 WSC Extend-A-Name 1988".
ITC Investigation No. 337-744, captioned: "Certain Mobile Devices, Associated Software, and Components Thereof" Doc. No. 583849-434896_19 "Appendix A5 Tech Refs Cover".
ITC Investigation No. 337-744, captioned: "Certain Mobile Devices, Associated Software, and Components Thereof" Doc. No. 585091-434897_24 "Appendix A5_055 2010 Software Sherlock 2.0 1998".
ITC Investigation No. 337-744, captioned: "Certain Mobile Devices, Associated Software, and Components Thereof" Doc. No. 585092-434897_25 "Appendix A5_056 Acerson WordPerfect 5.1 1990".
ITC Investigation No. 337-744, captioned: "Certain Mobile Devices, Associated Software, and Components Thereof" Doc. No. 585093-434897_26 "Appendix A5_057 Allen Vices and Virtues 1993".
ITC Investigation No. 337-744, captioned: "Certain Mobile Devices, Associated Software, and Components Thereof" Doc. No. 585094-434897_27 "Appendix A5_058 Almax Sftwr Longer Filenames for DOS".
ITC Investigation No. 337-744, captioned: "Certain Mobile Devices, Associated Software, and Components Thereof" Doc. No. 585095-434897_28 "Appendix A5_059 Baird Benefits 4DOS".
ITC Investigation No. 337-744, captioned: "Certain Mobile Devices, Associated Software, and Components Thereof" Doc. No. 585096-434897_29 "Appendix A5_060 Berst Come Closer".
ITC Investigation No. 337-744, captioned: "Certain Mobile Devices, Associated Software, and Components Thereof" Doc. No. 585097-434897_30 "Appendix A5_061 Beta Systems DOS History".
ITC Investigation No. 337-744, captioned: "Certain Mobile Devices, Associated Software, and Components Thereof" Doc. No. 585098-434897_31 "Appendix A5_062 Blackwell WSC Launches Extend 1990".
ITC Investigation No. 337-744, captioned: "Certain Mobile Devices, Associated Software, and Components Thereof" Doc. No. 585099-434897_32 "Appendix A5_063 Bonner Build a Doc".
ITC Investigation No. 337-744, captioned: "Certain Mobile Devices, Associated Software, and Components Thereof" Doc. No. 585100-434897_33 "Appendix A5_064 Bonner GeoWorks".
ITC Investigation No. 337-744, captioned: "Certain Mobile Devices, Associated Software, and Components Thereof" Doc. No. 585101-434897_34 "Appendix A5_065 Bonner Whats in 1988".
ITC Investigation No. 337-744, captioned: "Certain Mobile Devices, Associated Software, and Components Thereof" Doc. No. 585102-434897_35 "Appendix A5_066 Bonner Windows 3.1".
ITC Investigation No. 337-744, captioned: "Certain Mobile Devices, Associated Software, and Components Thereof" Doc. No. 585103-434897_36 "Appendix A5_067 Busch 4DOS".
ITC Investigation No. 337-744, captioned: "Certain Mobile Devices, Associated Software, and Components Thereof" Doc. No. 585104-434897_37 "Appendix A5_068 Capen Ultimate File Manager".
ITC Investigation No. 337-744, captioned: "Certain Mobile Devices, Associated Software, and Components Thereof" Doc. No. 585105-434897_38 "Appendix A5_069 Chin Using Unused Bytes".
ITC Investigation No. 337-744, captioned: "Certain Mobile Devices, Associated Software, and Components Thereof" Doc. No. 585106-434897_39 "Appendix A5_070 Clark Proposed DOS".
ITC Investigation No. 337-744, captioned: "Certain Mobile Devices, Associated Software, and Components Thereof" Doc. No. 585107-434897_40 "Appendix A5_071 Cluts Making Room".
ITC Investigation No. 337-744, captioned: "Certain Mobile Devices, Associated Software, and Components Thereof" Doc. No. 585108-434897_41 "Appendix A5_072 Comer the Tilde".
ITC Investigation No. 337-744, captioned: "Certain Mobile Devices, Associated Software, and Components Thereof" Doc. No. 585109-434897_42 "Appendix A5_073 Comm Rule 51_4 EPC" (EP Appl. No. 94105169.0).
ITC Investigation No. 337-744, captioned: "Certain Mobile Devices, Associated Software, and Components Thereof" Doc. No. 585110-434897_43 "Appendix A5_074 Crow Encapsulation of Applications".
ITC Investigation No. 337-744, captioned: "Certain Mobile Devices, Associated Software, and Components Thereof" Doc. No. 585111-434897_44 "Appendix A5_075 Dateline Gold Retr 2.0b 1993".
ITC Investigation No. 337-744, captioned: "Certain Mobile Devices, Associated Software, and Components Thereof" Doc. No. 585112-434897_45 "Appendix A5_076 Dateline the Intell Way 1987".
ITC Investigation No. 337-744, captioned: "Certain Mobile Devices, Associated Software, and Components Thereof" Doc. No. 585113-434897_46 "Appendix A5_077 Davis NT No. Thanks 1993".
ITC Investigation No. 337-744, captioned: "Certain Mobile Devices, Associated Software, and Components Thereof" Doc. No. 585114-434897_47 "Appendix A5_078 Derfler Build Workgroup Sol 1988".
ITC Investigation No. 337-744, captioned: "Certain Mobile Devices, Associated Software, and Components Thereof" Doc. No. 585115-434897_48 "Appendix A5_079 DeVoney NT Has Arrived 1993".

(56) References Cited

OTHER PUBLICATIONS

ITC Investigation No. 337-744, captioned: "Certain Mobile Devices, Associated Software, and Components Thereof" Doc. No. 585116-434897_49 "Appendix A5_080 Dig Res Intr ROM 1988".
ITC Investigation No. 337-744, captioned: "Certain Mobile Devices, Associated Software, and Components Thereof" Doc. No. 583881-434899_1 "Appendix B Index-CD 1 of 5".
ITC Investigation No. 337-744, captioned: "Certain Mobile Devices, Associated Software, and Components Thereof" Doc. No. 583882-434899_2 "Appendix B1".
ITC Investigation No. 337-744, captioned: "Certain Mobile Devices, Associated Software, and Components Thereof" Doc. No. 583883-434899_3 "Appendix B1_Part 1".
ITC Investigation No. 337-744, captioned: "Certain Mobile Devices, Associated Software, and Components Thereof" Doc. No. 583884-434899_4 "Appendix B1_Part 2".
ITC Investigation No. 337-744, captioned: "Certain Mobile Devices, Associated Software, and Components Thereof" Doc. No. 583885-434899_5 "Appendix B1_Part 3".
ITC Investigation No. 337-744, captioned: "Certain Mobile Devices, Associated Software, and Components Thereof" Doc. No. 583886-434899_6 "Appendix B1_Part 4".
ITC Investigation No. 337-744, captioned: "Certain Mobile Devices, Associated Software, and Components Thereof" Doc. No. 583887-434899_7 "Appendix B2".
ITC Investigation No. 337-744, captioned: "Certain Mobile Devices, Associated Software, and Components Thereof" Doc. No. 583888-434899_8 "Appendix B2_Part 1".
ITC Investigation No. 337-744, captioned: "Certain Mobile Devices, Associated Software, and Components Thereof" Doc. No. 583889-434899_9 "Appendix B2_Part 2".
ITC Investigation No. 337-744, captioned: "Certain Mobile Devices, Associated Software, and Components Thereof" Doc. No. 583890-434899_10 "Appendix B2_Part 3".
ITC Investigation No. 337-744, captioned: "Certain Mobile Devices, Associated Software, and Components Thereof" Doc. No. 583891-434899_11 "Appendix B2_Part 4".
ITC Investigation No. 337-744, captioned: "Certain Mobile Devices, Associated Software, and Components Thereof" Doc. No. 583892-434899_12 "Appendix B3_000.Tech Refs Cited in 5758352".
ITC Investigation No. 337-744, captioned: "Certain Mobile Devices, Associated Software, and Components Thereof" Doc. No. 583913-434899_33 "Appendix B3_021 Blackwell WSC Launches Extend 1990".
ITC Investigation No. 337-744, captioned: "Certain Mobile Devices, Associated Software, and Components Thereof" Doc. No. 583914-434899_34 "Appendix B3_022 Bonner Build a Doc 1991".
ITC Investigation No. 337-744, captioned: "Certain Mobile Devices, Associated Software, and Components Thereof" Doc. No. 583915-434899_35 "Appendix B3-023 Bonner Whats in a Name".
ITC Investigation No. 337-744, captioned: "Certain Mobile Devices, Associated Software, and Components Thereof" Doc. No. 583916-434899_36 "Appendix B3_024 Dateline Gold Retr 2.0b 1993".
ITC Investigation No. 337-744, captioned: "Certain Mobile Devices, Associated Software, and Components Thereof" Doc. No. 583917-434899_37 "Appendix B3_025.Dateline the Intell Way 1987".
ITC Investigation No. 337-744, captioned: "Certain Mobile Devices, Associated Software, and Components Thereof" Doc. No. 583918-434899_38 "Appendix B3_026 duncan Des Goals 1989".
ITC Investigation No. 337-744, captioned: "Certain Mobile Devices, Associated Software, and Components Thereof" Doc. No. 583919-434899_39 "Appendix B3_027 Duncan Using Long File Names Prt 1 1990".
ITC Investigation No. 337-744, captioned: "Certain Mobile Devices, Associated Software, and Components Thereof" Doc. No. 583920-434899_40 "Appendix B3_028 Duncan Using Long File Names Prt 2 1990".
ITC Investigation No. 337-744, captioned: "Certain Mobile Devices, Associated Software, and Components Thereof" Doc. No. 583921-434899_41 "Appendix B3_029 Glass Create Own Env 1990".
ITC Investigation No. 337-744, captioned: "Certain Mobile Devices, Associated Software, and Components Thereof" Doc. No. 583922-434899_42 "Appendix B3_030 Hurwicz MS-DOS 3.1 1985".
ITC Investigation No. 337-744, captioned: "Certain Mobile Devices, Associated Software, and Components Thereof" Doc. No. 583923-434899_43 "Appendix B3_031 Leffler 4 3BSD Unix 1989".
ITC Investigation No. 337-744, captioned: "Certain Mobile Devices, Associated Software, and Components Thereof" Doc. No. 583924-434899_44 "Appendix B3_032 Lent New Improv Wind 1993".
ITC Investigation No. 337-744, captioned: "Certain Mobile Devices, Associated Software, and Components Thereof" Doc. No. 583925-434899_45 "Appendix B3_033 Mallory DOS Filename 1993".
ITC Investigation No. 337-744, captioned: "Certain Mobile Devices, Associated Software, and Components Thereof" Doc. No. 583926-434899_46 "Appendix B3_034 McCormick Present Mgr 1990".
ITC Investigation No. 337-744, captioned: "Certain Mobile Devices, Associated Software, and Components Thereof" Doc. No. 583927-434899_47 "Appendix B3_035 Microsoft File Sharing Protocol 1988".
ITC Investigation No. 337-744, captioned: "Certain Mobile Devices, Associated Software, and Components Thereof" Doc. No. 584029-434902_1 "Appendix B Index-CD 4 of 5".
ITC Investigation No. 337-744, captioned: "Certain Mobile Devices, Associated Software, and Components Thereof" Doc. No. 584030-434902_2 "Appendix B4_094 Glass Create Own PC Env 1990".
ITC Investigation No. 337-744, captioned: "Certain Mobile Devices, Associated Software, and Components Thereof" Doc. No. 584031-434902_3 "Appendix B4_095 Goh MS DOS 6.0 1993".
ITC Investigation No. 337-744, captioned: "Certain Mobile Devices, Associated Software, and Components Thereof" Doc. No. 584032-434902_4 "Appendix B4_096 Gralla Factors Impeding OS2 1989".
ITC Investigation No. 337-744, captioned: "Certain Mobile Devices, Associated Software, and Components Thereof" Doc. No. 584033-434902_5 "Appendix B4_097 Gralla Shareware 1992".
ITC Investigation No. 337-744, captioned: "Certain Mobile Devices, Associated Software, and Components Thereof" Doc. No. 584034-434902_6 "Appendix B4_098 Greenberg Compress and Exp 1989".
ITC Investigation No. 337-744, captioned: "Certain Mobile Devices, Associated Software, and Components Thereof" Doc. No. 584035-434902_7 "Appendix B4_099 Hall Overview of FreeDOS 2002".
ITC Investigation No. 337-744, captioned: "Certain Mobile Devices, Associated Software, and Components Thereof" Doc. No. 584036-434902_8 "Appendix B4_100 Hayes Making CD-ROM Usable 1991".
ITC Investigation No. 337-744, captioned: "Certain Mobile Devices, Associated Software, and Components Thereof" Doc. No. 584037-434902_9 "Appendix B4_101 Hotch Will This Be 1992".
ITC Investigation No. 337-744, captioned: "Certain Mobile Devices, Associated Software, and Components Thereof" Doc. No. 584038-434902_10 "Appendix B4_102 Hurwicz MS-DOS 3.1 1985".
ITC Investigation No. 337-744, captioned: "Certain Mobile Devices, Associated Software, and Components Thereof" Doc. No. 584039-434902_11 "Appendix B4_103 Idol Sherlock 193".
ITC Investigation No. 337-744, captioned: "Certain Mobile Devices, Associated Software, and Components Thereof" Doc. No. 584040-434902_12 "Appendix B4_104 Jackson Apple Talk 1990".
ITC Investigation No. 337-744, captioned: "Certain Mobile Devices, Associated Software, and Components Thereof" Doc. No. 584041-434902_13 "Appendix B4_105 Jeffries What's Ahead 1985".
ITC Investigation No. 337-744, captioned: "Certain Mobile Devices, Associated Software, and Components Thereof" Doc. No. 584042-434902_14 "Appendix B4_106 JH 20Years of DOS History 2005".
ITC Investigation No. 337-744, captioned: "Certain Mobile Devices, Associated Software, and Components Thereof" Doc. No. 584043-434902_15 "Appendix B4_107 Lang Translation of Pit's Boese Ltr 2004".
ITC Investigation No. 337-744, captioned: "Certain Mobile Devices, Associated Software, and Components Thereof" Doc. No. 584044-434902_16 "Appendix B4_108 Leffler 4.3BSD Unix 1989".
ITC Investigation No. 337-744, captioned: "Certain Mobile Devices, Associated Software, and Components Thereof" Doc. No. 584045-434902_17 "Appendix B4_109 Lent New Improv Wind 1993".

(56) References Cited

OTHER PUBLICATIONS

ITC Investigation No. 337-744, captioned: "Certain Mobile Devices, Associated Software, and Components Thereof" Doc. No. 584046-434902_18 "Appendix B4_110 Lewallen The NT Desktop 1993".

ITC Investigation No. 337-744, captioned: "Certain Mobile Devices, Associated Software, and Components Thereof" Doc. No. 584047-434902_19 "Appendix B4_111 Lincoln Death to 83 Filenames 1993".

ITC Investigation No. 337-744, captioned: "Certain Mobile Devices, Associated Software, and Components Thereof" Doc. No. 584048-434902_20 "Appendix B4_112 Mallory DOS filename 1993".

ITC Investigation No. 337-744, captioned: "Certain Mobile Devices, Associated Software, and Components Thereof" Doc. No. 584049-434902_21 "Appendix B4_113 Manes Taking a Gamble 1984".

ITC Investigation No. 337-744, captioned: "Certain Mobile Devices, Associated Software, and Components Thereof" Doc. No. 584050-434902_22 "Appendix B4_114 Mathisen Novell's DOS 7 1994".

ITC Investigation No. 337-744, captioned: "Certain Mobile Devices, Associated Software, and Components Thereof" Doc. No. 584051-434902_23 "Appendix B4_115 Matthias 25 Years of DOS 2000".

ITC Investigation No. 337-744, captioned: "Certain Mobile Devices, Associated Software, and Components Thereof" Doc. No. 584052-434902_24 "Appendix B4_116 McCormick Present Mgr 1990".

ITC Investigation No. 337-744, captioned: "Certain Mobile Devices, Associated Software, and Components Thereof" Doc. No. 584053-434902_25 "Appendix B4_117 Mefford Adding Notes 1987".

ITC Investigation No. 337-744, captioned: "Certain Mobile Devices, Associated Software, and Components Thereof" Doc. No. 584054-434902_26 "Appendix B4_118 Merkmal Ansp 1 Ex. 5 of Ref".

ITC Investigation No. 337-744, captioned: "Certain Mobile Devices, Associated Software, and Components Thereof" Doc. No. 584055-434902_27 "Appendix B4_119 Merkmal Ansp 12 Ex. 6 of Ref".

ITC Investigation No. 337-744, captioned: "Certain Mobile Devices, Associated Software, and Components Thereof" Doc. No. 584056-434902_28 Appendix B4_120 Microsoft App C—LAN Mgr Macintosh 1991 (Missing p. 122).

ITC Investigation No. 337-744, captioned: "Certain Mobile Devices, Associated Software, and Components Thereof" Doc. No. 584057-434902_29 "Appendix B4_122 Microsoft Common Name Ex. 15 1994".

ITC Investigation No. 337-744, captioned: "Certain Mobile Devices, Associated Software, and Components Thereof" Doc. No. 584058-434902_30 "Appendix B4_123 Microsoft File sharing Protocol 1988".

ITC Investigation No. 337-744, captioned: "Certain Mobile Devices, Associated Software, and Components Thereof" Doc. No. 584059-434902_31 "Appendix B4_125 Neuhaus Databases 1990".

ITC Investigation No. 337-744, captioned: "Certain Mobile Devices, Associated Software, and Components Thereof" Doc. No. 584060-434902_32 "Appendix B4_126 Newsgroups Ex. 7a of Ref 1992".

ITC Investigation No. 337-744, captioned: "Certain Mobile Devices, Associated Software, and Components Thereof" Doc. No. 584061-434902_33 "Appendix B4_127 Newsgroups Ex. 7b of Ref 1991".

ITC Investigation No. 337-744, captioned: "Certain Mobile Devices, Associated Software, and Components Thereof" Doc. No. 584062-434902_34 "Appendix B4_128 Newsgroups Ex. 7c of Ref 1991".

ITC Investigation No. 337-744, captioned: "Certain Mobile Devices, Associated Software, and Components Thereof" Doc. No. 584063-434902_35 "Appendix B4_129 Newsgroups Ex. 7d of Ref 1992".

ITC Investigation No. 337-744, captioned: "Certain Mobile Devices, Associated Software, and Components Thereof" Doc. No. 584064-434902_36 "Appendix B4_130 Nilsson Sherlock Solves 1993".

ITC Investigation No. 337-744, captioned: "Certain Mobile Devices, Associated Software, and Components Thereof" Doc. No. 584065-434902_37 "Appendix B4_131 Olson Student Writes Free ODS 1994".

ITC Investigation No. 337-744, captioned: "Certain Mobile Devices, Associated Software, and Components Thereof" Doc. No. 584066-434902_38 "Appendix B4_132 OMalley Fetch Desk 1993".

ITC Investigation No. 337-744, captioned: "Certain Mobile Devices, Associated Software, and Components Thereof" Doc. No. 584067-434902_39 "Appendix B4_133 PC Guide File Allocation Tables 2001".

ITC Investigation No. 337-744, captioned: "Certain Mobile Devices, Associated Software, and Components Thereof" Doc. No. 584068-434902_40 "Appendix B4_134 Petzold 1989 The Year in Oper Sys 1990".

ITC Investigation No. 337-744, captioned: "Certain Mobile Devices, Associated Software, and Components Thereof" Doc. No. 584069-434902_41 "Appendix B4_135 Petzold OS-2 A New Beg 1988".

ITC Investigation No. 337-744, captioned: "Certain Mobile Devices, Associated Software, and Components Thereof" Doc. No. 584070-434902_42 "Appendix B4_136 Prosise Retrofitting 1986".

ITC Investigation No. 337-744, captioned: "Certain Mobile Devices, Associated Software, and Components Thereof" Doc. No. 584071-434902_43 "Appendix B4_137 Prosise Tutor 1992".

ITC Investigation No. 337-744, captioned: "Certain Mobile Devices, Associated Software, and Components Thereof" Doc. No. 584072-434902_44 "Appendix B4_138 Proteo Master Their PCs 1991".

ITC Investigation No. 337-744, captioned: "Certain Mobile Devices, Associated Software, and Components Thereof" Doc. No. 584073-434902_45 "Appendix B4_139 Response to Office Comm. 2000".

ITC Investigation No. 337-744, captioned: "Certain Mobile Devices, Associated Software, and Components Thereof" Doc. No. 584074-434902_46 "Appendix B4_140 Rettig Custom Windows 1993".

ITC Investigation No. 337-744, captioned: "Certain Mobile Devices, Associated Software, and Components Thereof" Doc. No. 584075-434902_47 "Appendix B4_141 Rizzo Disks of Diff Color 1991".

ITC Investigation No. 337-744, captioned: "Certain Mobile Devices, Associated Software, and Components Thereof" Doc. No. 584076-434902_48 "Appendix B4_142 Rock Ridge Prot Vers. 1.09 1991".

ITC Investigation No. 337-744, captioned: "Certain Mobile Devices, Associated Software, and Components Thereof" Doc. No. 584077-434902_49 "Appendix B Index-CD 5 of 5".

ITC Investigation No. 337-744, captioned: "Certain Mobile Devices, Associated Software, and Components Thereof" Doc. No. 584078-434902_50 "Appendix B4_143 Rohan Golden Retriever 1992".

ITC Investigation No. 337-744, captioned: "Certain Mobile Devices, Associated Software, and Components Thereof" Doc. No. 584079-434902_51 "Appendix B4_144 Ruley Feature-Rich Beta 1992".

ITC Investigation No. 337-744, captioned: "Certain Mobile Devices, Associated Software, and Components Thereof" Doc. No. 584080-434902_52 "Appendix B4_145 Saiedian Frame for Assessment 1996".

ITC Investigation No. 337-744, captioned: "Certain Mobile Devices, Associated Software, and Components Thereof" Doc. No. 584081-434902_53 Appendix B4_146 Sanders the $RO 1987.

ITC Investigation No. 337-744, captioned: "Certain Mobile Devices, Associated Software, and Components Thereof" Doc. No. 584082-434902_54 "Appendix B4_147 Simon What You Can Do 1991".

ITC Investigation No. 337-744, captioned: "Certain Mobile Devices, Associated Software, and Components Thereof" Doc. No. 584083-434902_55 "Appendix B4_148 Smith OS-2 2.0 does the Job 1992".

ITC Investigation No. 337-744, captioned: "Certain Mobile Devices, Associated Software, and Components Thereof" Doc. No. 584084-434902_56 "Appendix B4_149 Sobell Practice Guide Unix 1989".

ITC Investigation No. 337-744, captioned: "Certain Mobile Devices, Associated Software, and Components Thereof" Doc. No. 584085-434902_57 "Appendix B4_150 Somerson DOS 5.0 1991".

ITC Investigation No. 337-744, captioned: "Certain Mobile Devices, Associated Software, and Components Thereof" Doc. No. 584086-434902_58 "Appendix B4_151 Somerson Spy-Proof 1992".

ITC Investigation No. 337-744, captioned: "Certain Mobile Devices, Associated Software, and Components Thereof" Doc. No. 584087-434902_59 "Appendix B4_152 Styer disks 1997".

ITC Investigation No. 337-744, captioned: "Certain Mobile Devices, Associated Software, and Components Thereof" Doc. No. 584088-434902_60 "Appendix B4_153 Tanenbaum Modern OS 2001".

ITC Investigation No. 337-744, captioned: "Certain Mobile Devices, Associated Software, and Components Thereof" Doc. No. 584089-434902_61 "Appendix B4_154 Trivette Utility 60 Char 1988".

(56) References Cited

OTHER PUBLICATIONS

ITC Investigation No. 337-744, captioned: "Certain Mobile Devices, Associated Software, and Components Thereof" Doc. No. 584090-434902_62 "Appendix B4_155 vinDaci Long Filename Spec 1998".

ITC Investigation No. 337-744, captioned: "Certain Mobile Devices, Associated Software, and Components Thereof" Doc. No. 584091-434902_63 "Appendix B4_156 Wagner Developers Tour of Chicago 1993".

ITC Investigation No. 337-744, captioned: "Certain Mobile Devices, Associated Software, and Components Thereof" Doc. No. 584092-434902_64 "Appendix B4_157 Wang Universal File 1990".

ITC Investigation No. 337-744, captioned: "Certain Mobile Devices, Associated Software, and Components Thereof" Doc. No. 584093-434902_65 "Appendix B4_158 Wendin Wendin DOS 1987".

ITC Investigation No. 337-744, captioned: "Certain Mobile Devices, Associated Software, and Components Thereof" Doc. No. 584094-434902_66 "Appendix B4_159 wikipedia Comparison of FS 2005".

ITC Investigation No. 337-744, captioned: "Certain Mobile Devices, Associated Software, and Components Thereof" Doc. No. 584095-434902_67 "Appendix B4_160 Wikipedia DOS 2005".

ITC Investigation No. 337-744, captioned: "Certain Mobile Devices, Associated Software, and Components Thereof" Doc. No. 584096-434902-68 "Appendix B4_162 Windows Mag Access Review 1993".

ITC Investigation No. 337-744, captioned: "Certain Mobile Devices, Associated Software, and Components Thereof" Doc. No. 584097-434902_69 "Appendix B4_163 Winship DOS Shells 1990".

ITC Investigation No. 337-744, captioned: "Certain Mobile Devices, Associated Software, and Components Thereof" Doc. No. 584098-434902_70 "Appendix B4_164 WSC Extend-A-Name 1988".

ITC Investigation No. 337-744, captioned: "Certain Mobile Devices, Associated Software, and Components Thereof" Doc. No. 584099-434902_71 "Appendix B4_165 Young CD-ROM Stand 1991".

ITC Investigation No. 337-744, captioned: "Certain Mobile Devices, Associated Software, and Components Thereof" Doc. No. 584100-434902_72 "Appendix B4_166 Zelnick Way You Work 1991".

ITC Investigation No. 337-744, captioned: "Certain Mobile Devices, Associated Software, and Components Thereof" Doc. No. 584483-434902_73 "434902 Appendix B4-124".

ITC Investigation No. 337-744, captioned: "Certain Mobile Devices, Associated Software, and Components Thereof" Doc. No. 584484-434902_74 "434902 Appendix B4-161".

ITC Investigation No. 337-744, captioned: "Certain Mobile Devices, Associated Software, and Components Thereof" Doc. No. 585120-434898_1 "Appendix A Index—CD 4 of 5".

ITC Investigation No. 337-744, captioned: "Certain Mobile Devices, Associated Software, and Components Thereof" Doc. No. 585121-434898_2 "Appendix A4_081 Duncan Comparing ODS 1989".

ITC Investigation No. 337-744, captioned: "Certain Mobile Devices, Associated Software, and Components Thereof" Doc. No. 585122-434898_3 "Appendix A4_082 Duncan Des goals 1989".

ITC Investigation No. 337-744, captioned: "Certain Mobile Devices, Associated Software, and Components Thereof" Doc. No. 585123-434898_4 "Appendix A4_083 Duncan Getting Acquainted Prt 1 1990".

ITC Investigation No. 337-744, captioned: "Certain Mobile Devices, Associated Software, and Components Thereof" Doc. No. 585124-434898_5 "Appendix A4_084 Duncan Getting Acquainted Prt 2 1990".

ITC Investigation No. 337-744, captioned: "Certain Mobile Devices, Associated Software, and Components Thereof" Doc. No. 585125-434898_6 "Appendix A4_085 Duncan Using Long File Names Prt 1 1990".

ITC Investigation No. 337-744, captioned: "Certain Mobile Devices, Associated Software, and Components Thereof" Doc. No. 585126-434898_7 "Appendix A4_086 Duncan Using Long File Names Prt 2 1990".

ITC Investigation No. 337-744, captioned: "Certain Mobile Devices, Associated Software, and Components Thereof" Doc. No. 585127-434898_8 "Appendix A4_087 Edge CD-ROM Rock Ridge Group 1991".

ITC Investigation No. 337-744, captioned: "Certain Mobile Devices, Associated Software, and Components Thereof" Doc. No. 585128-434898_9 "Appendix A4_088 Florida Sun Flash Rock Ridge Prel CD-ROM Specs 1991".

ITC Investigation No. 337-744, captioned: "Certain Mobile Devices, Associated Software, and Components Thereof" Doc. No. 585129-434898_10 "Appendix A4_089 Fowler Cross Talking 1993".

ITC Investigation No. 337-744, captioned: "Certain Mobile Devices, Associated Software, and Components Thereof" Doc. No. 585130-434898_11 "Appendix A4_090 Freed High End 1992".

ITC Investigation No. 337-744, captioned: "Certain Mobile Devices, Associated Software, and Components Thereof" Doc. No. 585131-434898_12 "Appendix A4_091 Fuchs DOS FAQ 2004".

ITC Investigation No. 337-744, captioned: "Certain Mobile Devices, Associated Software, and Components Thereof" Doc. No. 585132-434898_13 "Appendix A4_092 Giovetti Way You Work 1992".

ITC Investigation No. 337-744, captioned: "Certain Mobile Devices, Associated Software, and Components Thereof" Doc. No. 585133-434898_14 "Appendix A4_093 Glass Create Own PC Env 1990".

ITC Investigation No. 337-744, captioned: "Certain Mobile Devices, Associated Software, and Components Thereof" Doc. No. 585134-434898_15 "Appendix A4_094 Goh MS DOS 6.0 1993".

ITC Investigation No. 337-744, captioned: "Certain Mobile Devices, Associated Software, and Components Thereof" Doc. No. 585135-434898_16 "Appendix A4_095 Gralla Factors Impeding OS2 1989".

ITC Investigation No. 337-744, captioned: "Certain Mobile Devices, Associated Software, and Components Thereof" Doc. No. 585136-434898_17 "Appendix A4_096 Gralla Shareware 1992".

ITC Investigation No. 337-744, captioned: "Certain Mobile Devices, Associated Software, and Components Thereof" Doc. No. 585137-434898_18 "Appendix A4_097 Greenberg Compress and Exp 1989".

ITC Investigation No. 337-744, captioned: "Certain Mobile Devices, Associated Software, and Components Thereof" Doc. No. 585138-434898_19 "Appendix A4_098 Hall Overview of FreeDOS 2002".

ITC Investigation No. 337-744, captioned: "Certain Mobile Devices, Associated Software, and Components Thereof" Doc. No. 585139-434898_20 "Appendix A4_099 Hayes Making CD-ROM Usable 1991".

ITC Investigation No. 337-744, captioned: "Certain Mobile Devices, Associated Software, and Components Thereof" Doc. No. 585140-434898_21 "Appendix A4_100 Hotch Will This Be 1992".

ITC Investigation No. 337-744, captioned: "Certain Mobile Devices, Associated Software, and Components Thereof" Doc. No. 585141-434898_22 "Appendix A4_101 Hurwicz MS-DOS 3.1 1985".

ITC Investigation No. 337-744, captioned: "Certain Mobile Devices, Associated Software, and Components Thereof" Doc. No. 585142-43489823 "Appendix A4_102 Idol Sherlock 1993".

ITC Investigation No. 337-744, captioned: "Certain Mobile Devices, Associated Software, and Components Thereof" Doc. No. 585143-434898_24 "Appendix A4_103 Jackson Apple Talk 1990".

ITC Investigation No. 337-744, captioned: "Certain Mobile Devices, Associated Software, and Components Thereof" Doc. No. 585144-434898_25 "Appendix A4_104 Jeffries What's Ahead 1985".

ITC Investigation No. 337-744, captioned: "Certain Mobile Devices, Associated Software, and Components Thereof" Doc. No. 585145-434898_26 "Appendix A4_105 JH 20 Years of DOS History 2005".

ITC Investigation No. 337-744, captioned: "Certain Mobile Devices, Associated Software, and Components Thereof" Doc. No. 585146-434898_27 "Appendix A4_106 Lang Translation of Plts Boese Ltr 2004".

ITC Investigation No. 337-744, captioned: "Certain Mobile Devices, Associated Software, and Components Thereof" Doc. No. 585147-434898_28 "Appendix A4_107 Leffler 4.3BSD Unix 1989".

ITC Investigation No. 337-744, captioned: "Certain Mobile Devices, Associated Software, and Components Thereof" Doc. No. 585148-434898_29 "Appendix A4_108 Lent New Improv Wind 1993".

(56) References Cited

OTHER PUBLICATIONS

ITC Investigation No. 337-744, captioned: "Certain Mobile Devices, Associated Software, and Components Thereof" Doc. No. 585149-434898_30 "Appendix A4_109 Lewallen The NT Desktop 1993".
ITC Investigation No. 337-744, captioned: "Certain Mobile Devices, Associated Software, and Components Thereof" Doc. No. 585150-434898_31 "Appendix A4_110 Lincoln Death to Filenames 1993".
ITC Investigation No. 337-744, captioned: "Certain Mobile Devices, Associated Software, and Components Thereof" Doc. No. 585151-434898_32 "Appendix A4_111 Mallory Dos Filename 1993".
ITC Investigation No. 337-744, captioned: "Certain Mobile Devices, Associated Software, and Components Thereof" Doc. No. 585152-434898_33 "Appendix A4_112 Manes Taking a Gamble 1984".
ITC Investigation No. 337-744, captioned: "Certain Mobile Devices, Associated Software, and Components Thereof" Doc. No. 585153-434898_34 "Appendix A4_113 Mathisen Novelis DOS 7 1994".
ITC Investigation No. 337-744, captioned: "Certain Mobile Devices, Associated Software, and Components Thereof" Doc. No. 585154-434898_35 "Appendix A4_114 Matthias 25 Years of DOS 2000".
ITC Investigation No. 337-744, captioned: "Certain Mobile Devices, Associated Software, and Components Thereof" Doc. No. 585155-434898_36 "Appendix A4_115 McCormick Present Mgr 1990".
ITC Investigation No. 337-744, captioned: "Certain Mobile Devices, Associated Software, and Components Thereof" Doc. No. 585156-434898_37 "Appendix A4_116 Mefford Adding Notes 1987".
ITC Investigation No. 337-744, captioned: "Certain Mobile Devices, Associated Software, and Components Thereof" Doc. No. 585157-434898_38 "Appendix A4_117 Merkmal Ansp 1 Ex 5 of Ref".
ITC Investigation No. 337-744, captioned: "Certain Mobile Devices, Associated Software, and Components Thereof" Doc. No. 585158-434898_39 "Appendix A4_118 Merkmal Ansp 12 Ex 6 of Ref".
ITC Investigation No. 337-744, captioned: "Certain Mobile Devices, Associated Software, and Components Thereof" Doc. No. 585159-434898_40 "Appendix A4_119 Microsoft App C—LAN Mgr Macintosh".
ITC Investigation No. 337-744, captioned: "Certain Mobile Devices, Associated Software, and Components Thereof" Doc. No. 585160-434898_41 "Appendix A4_121 Microsoft Common Name Ex15 1994".
ITC Investigation No. 337-744, captioned: "Certain Mobile Devices, Associated Software, and Components Thereof" Doc. No. 585161-434898_42 "Appendix A4_122 Microsoft File sharing Protocol 1988".
ITC Investigation No. 337-744, captioned: "Certain Mobile Devices, Associated Software, and Components Thereof" Doc. No. 585162-434898_43 "Appendix A4_124 Neuhaus Databases 1990".
ITC Investigation No. 337-744, captioned: "Certain Mobile Devices, Associated Software, and Components Thereof" Doc. No. 585163-434898_44 "Appendix A4_125 Newsgroups Ex. 7a of Ref 1992".
ITC Investigation No. 337-744, captioned: "Certain Mobile Devices, Associated Software, and Components Thereof" Doc. No. 585164-434898_45 "Appendix A4_126 Newsgroups Ex. 7b of Ref 1991".
ITC Investigation No. 337-744, captioned: "Certain Mobile Devices, Associated Software, and Components Thereof" Doc. No. 585165-434898_46 "Appendix A4_127 Newsgroups Ex. 7c of Ref 1991".
ITC Investigation No. 337-744, captioned: "Certain Mobile Devices, Associated Software, and Components Thereof" Doc. No. 585166-434898_47 "Appendix A4_128 Newsgroups Ex. 7d of Ref 1992".
ITC Investigation No. 337-744, captioned: "Certain Mobile Devices, Associated Software, and Components Thereof" Doc. No. 585167-434898_48 "Appendix A4_129 Nilsson Sherlock Solves 1993".
ITC Investigation No. 337-744, captioned: "Certain Mobile Devices, Associated Software, and Components Thereof" Doc. No. 585168-434898_49 "Appendix A Index—CD 5 of 5".
ITC Investigation No. 337-744, captioned: "Certain Mobile Devices, Associated Software, and Components Thereof" Doc. No. 585169-434898_50 "Appendix A5_130 Olson Student Writes Free DOS 1994".
ITC Investigation No. 337-744, captioned: "Certain Mobile Devices, Associated Software, and Components Thereof" Doc. No. 585170-434898_51 "Appendix A5_131 OMalley Fetch Desk 1993".
ITC Investigation No. 337-744, captioned: "Certain Mobile Devices, Associated Software, and Components Thereof" Doc. No. 585171-434898_52 "Appendix A5_132 PC Guide File Allocation Tables 2001".
ITC Investigation No. 337-744, captioned: "Certain Mobile Devices, Associated Software, and Components Thereof" Doc. No. 585172-434898_53 "Appendix A5_133 Petzold 1989 The Year in Oper Sys 1990".
ITC Investigation No. 337-744, captioned: "Certain Mobile Devices, Associated Software, and Components Thereof" Doc. No. 585173-434898_54 "Appendix A5_134 Petzold OS-2 A New Beg 1988".
ITC Investigation No. 337-744, captioned: "Certain Mobile Devices, Associated Software, and Components Thereof" Doc. No. 585174-434898_55 "Appendix A5_135 Prosise Retrofitting 1986".
ITC Investigation No. 337-744, captioned: "Certain Mobile Devices, Associated Software, and Components Thereof" Doc. No. 585175-434898_56 "Appendix A5_136 Prosise Tutor 1992".
ITC Investigation No. 337-744, captioned: "Certain Mobile Devices, Associated Software, and Components Thereof" Doc. No. 585176-434898_57 "Appendix A5_137 Proteo Master Their PCs 1991".
ITC Investigation No. 337-744, captioned: "Certain Mobile Devices, Associated Software, and Components Thereof" Doc. No. 585177-434898_58 "Appendix A5_138 Response to Office Comm 2000".
ITC Investigation No. 337-744, captioned: "Certain Mobile Devices, Associated Software, and Components Thereof" Doc. No. 585178-434898_59 "Appendix A5_139 Rettig Custom Windowsw 1993".
ITC Investigation No. 337-744, captioned: "Certain Mobile Devices, Associated Software, and Components Thereof" Doc. No. 585179-434898_60 "Appendix A5_140 Rizzo Disks of Diff Color 1991".
ITC Investigation No. 337-744, captioned: "Certain Mobile Devices, Associated Software, and Components Thereof" Doc. No. 585180-434898_61 "Appendix A5_141 Rock Ridge Prot Vers 1.09 1991".
ITC Investigation No. 337-744, captioned: "Certain Mobile Devices, Associated Software, and Components Thereof" Doc. No. 585181-434898_62 "Appendix A5_142 Rohan Golden Retriever 1992".
ITC Investigation No. 337-744, captioned: "Certain Mobile Devices, Associated Software, and Components Thereof" Doc. No. 585182-434898_63 "Appendix A5_143 Ruley Feature-Rich Beta 1992".
ITC Investigation No. 337-744, captioned: "Certain Mobile Devices, Associated Software, and Components Thereof" Doc. No. 585183-434898_64 "Appendix A5_144 Saiedian Frame for Assessment 1996".
ITC Investigation No. 337-744, captioned: "Certain Mobile Devices, Associated Software, and Components Thereof" Doc. No. 585184-434898_65 "Appendix A5_145 Sanders The RO 1987".
ITC Investigation No. 337-744, captioned: "Certain Mobile Devices, Associated Software, and Components Thereof" Doc. No. 585185-434898_66 "Appendix A5_146 Simon What You Can Do 1991".
ITC Investigation No. 337-744, captioned: "Certain Mobile Devices, Associated Software, and Components Thereof" Doc. No. 585186-434898_67 "Appendix A5_147 Smith OS-2.2.0 Does the Job 1992".
ITC Investigation No. 337-744, captioned: "Certain Mobile Devices, Associated Software, and Components Thereof" Doc. No. 585187-434898_68 "Appendix A5_148 Sobell Practice Guide Unix 1989".
ITC Investigation No. 337-744, captioned: "Certain Mobile Devices, Associated Software, and Components Thereof" Doc. No. 585188-434898_69 "Appendix A5_149 Somerson DOS 5.0 1991".
ITC Investigation No. 337-744, captioned: "Certain Mobile Devices, Associated Software, and Components Thereof" Doc. No. 585189-434898_70 "Appendix A5_150 Somerson Spy-Proof 1992".
ITC Investigation No. 337-744, captioned: "Certain Mobile Devices, Associated Software, and Components Thereof" Doc. No. 585190-434898_71 "Appendix A5_151 Styer Disks 1997".
ITC Investigation No. 337-744, captioned: "Certain Mobile Devices, Associated Software, and Components Thereof" Doc. No. 585191-434898_72 "Appendix A5_152 Tanenbaum Modern OS 2001".
ITC Investigation No. 337-744, captioned: "Certain Mobile Devices, Associated Software, and Components Thereof" Doc. No. 585192-434898_73 "Appendix A5_153 Trivette Utility 60 Char 1988".

(56) References Cited

OTHER PUBLICATIONS

ITC Investigation No. 337-744, captioned: "Certain Mobile Devices, Associated Software, and Components Thereof" Doc. No. 585193-434898_74 "Appendix A5_154 vinDaci Long Filename Spec 1998".

ITC Investigation No. 337-744, captioned: "Certain Mobile Devices, Associated Software, and Components Thereof" Doc. No. 585194-434898_75 "Appendix A5_155 Wagner Developers Tour of Chicago 1993".

ITC Investigation No. 337-744, captioned: "Certain Mobile Devices, Associated Software, and Components Thereof" Doc. No. 585195-434898_76 "Appendix A5_156 Wang Universal File 1990".

ITC Investigation No. 337-744, captioned: "Certain Mobile Devices, Associated Software, and Components Thereof" Doc. No. 585196-434898_77 "Appendix A5_157 Wendin Wendin DOS 1987".

ITC Investigation No. 337-744, captioned: "Certain Mobile Devices, Associated Software, and Components Thereof" Doc. No. 585197-434898_78 "Appendix A5_158 Wikipedia Comparison of FS 2005".

ITC Investigation No. 337-744, captioned: "Certain Mobile Devices, Associated Software, and Components Thereof" Doc. No. 585198-434898_79 "Appendix A5_159 Wikipedia DOS 2005".

ITC Investigation No. 337-744, captioned: "Certain Mobile Devices, Associated Software, and Components Thereof" Doc. No. 585199-434898_80 "Appendix A5_161 Windows Mag Access Review 1993".

ITC Investigation No. 337-744, captioned: "Certain Mobile Devices, Associated Software, and Components Thereof" Doc. No. 585200-434898_81 "Appendix A5_162 Winship DOS Shells 1990".

ITC Investigation No. 337-744, captioned: "Certain Mobile Devices, Associated Software, and Components Thereof" Doc. No. 585201-434898_82 "Appendix A5_163 WSC Extend-A-Name 1988".

ITC Investigation No. 337-744, captioned: "Certain Mobile Devices, Associated Software, and Components Thereof" Doc. No. 585202-434898_83 "Appendix A5_164 Young CD-ROM Stand 1991".

ITC Investigation No. 337-744, captioned: "Certain Mobile Devices, Associated Software, and Components Thereof" Doc. No. 585203-434898_84 "Appendix A5_165 Zelnick Way You Work 1991".

ITC Investigation No. 337-744, captioned: "Certain Mobile Devices, Associated Software, and Components Thereof" Doc. No. 583650-434802_1 "Complaint".

ITC Investigation No. 337-744, captioned: "Certain Mobile Devices, Associated Software, and Components Thereof" Doc. No. 587482-434802_2 "434802 Publ Version of Conf Exhibits (9 thru 48)".

ITC Investigation No. 337-744, captioned: "Certain Mobile Devices, Associated Software, and Components Thereof" Doc. No. 583603-434802_3 "Exhibit 1".

ITC Investigation No. 337-744, captioned: "Certain Mobile Devices, Associated Software, and Components Thereof" Doc. No. 583611-434802_4 "Exhibit 2".

ITC Investigation No. 337-744, captioned: "Certain Mobile Devices, Associated Software, and Components Thereof" Doc. No. 583632-434802_7 "Exhibit 5".

ITC Investigation No. 337-744, captioned: "Certain Mobile Devices, Associated Software, and Components Thereof" Doc. No. 583643-434802_8 "Exhibit 6".

ITC Investigation No. 337-744, captioned: "Certain Mobile Devices, Associated Software, and Components Thereof" Doc. No. 5836443-434802_9 "Exhibit 7".

ITC Investigation No. 337-744, captioned: "Certain Mobile Devices, Associated Software, and Components Thereof" Doc. No. 583645-434802_10 "Exhibit 8".

ITC Investigation No. 337-744, captioned: "Certain Mobile Devices, Associated Software, and Components Thereof" Doc. No. 583605-434802_12 "Exhibit 12".

ITC Investigation No. 337-744, captioned: "Certain Mobile Devices, Associated Software, and Components Thereof" Doc. No. 583606-434802_13 "Exhibit 13".

ITC Investigation No. 337-744, captioned: "Certain Mobile Devices, Associated Software, and Components Thereof" Doc. No. 583608-434802_15 "Exhibit 16".

ITC Investigation No. 337-744, captioned: "Certain Mobile Devices, Associated Software, and Components Thereof" Doc. No. 583609-434802_16 "Exhibit 17".

ITC Investigation No. 337-744, captioned: "Certain Mobile Devices, Associated Software, and Components Thereof" Doc. No. 583612-434802_18 "Exhibit 20".

ITC Investigation No. 337-744, captioned: "Certain Mobile Devices, Associated Software, and Components Thereof" Doc. No. 583613-434802_19 "Exhibit 21".

ITC Investigation No. 337-744, captioned: "Certain Mobile Devices, Associated Software, and Components Thereof" Doc. No. 583615-434802_21 "Exhibit 24".

ITC Investigation No. 337-744, captioned: "Certain Mobile Devices, Associated Software, and Components Thereof" Doc. No. 583616-434802_22 "Exhibit 25".

ITC Investigation No. 337-744, captioned: "Certain Mobile Devices, Associated Software, and Components Thereof" Doc. No. 583618-434802_24 "Exhibit 28".

ITC Investigation No. 337-744, captioned: "Certain Mobile Devices, Associated Software, and Components Thereof" Doc. No. 583619-434802_25 "Exhibit 29".

ITC Investigation No. 337-744, captioned: "Certain Mobile Devices, Associated Software, and Components Thereof" Doc. No. 583622-434802_27 "Exhibit 32".

ITC Investigation No. 337-744, captioned: "Certain Mobile Devices, Associated Software, and Components Thereof" Doc. No. 583623-434802_28 "Exhibit 33".

ITC Investigation No. 337-744, captioned: "Certain Mobile Devices, Associated Software, and Components Thereof" Doc. No. 583625-434802_30 "Exhibit 36".

ITC Investigation No. 337-744, captioned: "Certain Mobile Devices, Associated Software, and Components Thereof" Doc. No. 583626-434802_31 "Exhibit 37".

ITC Investigation No. 337-744, captioned: "Certain Mobile Devices, Associated Software, and Components Thereof" Doc. No. 583648-434802_32 "434802 Exhibit 39".

ITC Investigation No. 337-744, captioned: "Certain Mobile Devices, Associated Software, and Components Thereof" Doc. No. 583651-434802_33 "434802 Exhibit 40".

ITC Investigation No. 337-744, captioned: "Certain Mobile Devices, Associated Software, and Components Thereof" Doc. No. 583652-434802_34 "434802 Exhibit 41".

ITC Investigation No. 337-744, captioned: "Certain Mobile Devices, Associated Software, and Components Thereof" Doc. No. 583628-434802_35 "Exhibit 42".

ITC Investigation No. 337-744, captioned: "Certain Mobile Devices, Associated Software, and Components Thereof" Doc. No. 583629-434802_36 "Exhibit 43".

ITC Investigation No. 337-744, captioned: "Certain Mobile Devices, Associated Software, and Components Thereof" Doc. No. 583653-434802_37 "434802 Exhibit 44".

ITC Investigation No. 337-744, captioned: "Certain Mobile Devices, Associated Software, and Components Thereof" Doc. No. 583630-434802_38 "Exhibit 45".

ITC Investigation No. 337-744, captioned: "Certain Mobile Devices, Associated Software, and Components Thereof" Doc. No. 583654-434802_39 "434802 Exhibit 46 pt 1".

ITC Investigation No. 337-744, captioned: "Certain Mobile Devices, Associated Software, and Components Thereof" Doc. No. 583649-434802_40 "434802 Exhibit 46 pt 2".

ITC Investigation No. 337-744, captioned: "Certain Mobile Devices, Associated Software, and Components Thereof" Doc. No. 583655-434802_41 "434802 Exhibit 47".

ITC Investigation No. 337-744, captioned: "Certain Mobile Devices, Associated Software, and Components Thereof" Doc. No. 583631-434802_42 "Exhibit 49".

ITC Investigation No. 337-744, captioned: "Certain Mobile Devices, Associated Software, and Components Thereof" Doc. No. 583633-434802_43 "Exhibit 50".

(56) References Cited

OTHER PUBLICATIONS

ITC Investigation No. 337-744, captioned: "Certain Mobile Devices, Associated Software, and Components Thereof" Doc. No. 583634-434802_44 "Exhibit 51".
ITC Investigation No. 337-744, captioned: "Certain Mobile Devices, Associated Software, and Components Thereof" Doc. No. 583635-434802_45 "Exhibit 52".
ITC Investigation No. 337-744, captioned: "Certain Mobile Devices, Associated Software, and Components Thereof" Doc. No. 583636-434802_46 "Exhibit 53".
ITC Investigation No. 337-744, captioned: "Certain Mobile Devices, Associated Software, and Components Thereof" Doc. No. 583637-434802_47 "Exhibit 54".
ITC Investigation No. 337-744, captioned: "Certain Mobile Devices, Associated Software, and Components Thereof" Doc. No. 583638-434802_48 "Exhibit 55".
ITC Investigation No. 337-744, captioned: "Certain Mobile Devices, Associated Software, and Components Thereof" Doc. No. 583639-434802_49 "Exhibit 56".
ITC Investigation No. 337-744, captioned: "Certain Mobile Devices, Associated Software, and Components Thereof" Doc. No. 583640-434802_50 "Exhibit 57".
ITC Investigation No. 337-744, captioned: "Certain Mobile Devices, Associated Software, and Components Thereof" Doc. No. 583641-434802_51 "Exhibit 58".
ITC Investigation No. 337-744, captioned: "Certain Mobile Devices, Associated Software, and Components Thereof" Doc. No. 583642-434802_52 "Exhibit 59".
ITC Investigation No. 337-744, captioned: "Certain Mobile Devices, Associated Software, and Components Thereof" Doc. No. 585380-435336_1 "435336—First Amended Verified Complaint".
ITC Investigation No. 337-744, captioned: "Certain Mobile Devices, Associated Software, and Components Thereof" Doc. No. 592791-438464_1 "592791—Respondents Motorola Response to the Amended Complaint".
ITC Investigation No. 337-744, captioned: "Certain Mobile Devices, Associated Software, and Components Thereof" Doc. No. 593100-438563_1 "438563—Original Verification to Motorola's Response to Amended Complaint".
ITC Investigation No. 337-744, captioned: "Certain Mobile Devices, Associated Software, and Components Thereof" Doc. No. 593120-438686_1 "593120—Discovery Statement of the Commission Investigative Staff".
ITC Investigation No. 337-744, captioned: "Certain Mobile Devices, Associated Software, and Components Thereof" Doc. No. 609645-445051_1 "Microsoft's Opening Claim Construction Brief".
ITC Investigation No. 337-744, captioned: "Certain Mobile Devices, Associated Software, and Components Thereof" Doc. No. 609646-445051_2 "Exhibit List".
ITC Investigation No. 337-744, captioned: "Certain Mobile Devices, Associated Software, and Components Thereof" Doc. No. 609648-445051_4 "Exhibit 102".
ITC Investigation No. 337-744, captioned: "Certain Mobile Devices, Associated Software, and Components Thereof" Doc. No. 609649-445051_5 "Exhibit 103".
ITC Investigation No. 337-744, captioned: "Certain Mobile Devices, Associated Software, and Components Thereof" Doc. No. 609650-445051_6 "Exhibit 104".
ITC Investigation No. 337-744, captioned: "Certain Mobile Devices, Associated Software, and Components Thereof" Doc. No. 609653-445051_9 "Exhibit 302".
ITC Investigation No. 337-744, captioned: "Certain Mobile Devices, Associated Software, and Components Thereof" Doc. No. 609654-445051_10 "Exhibit 303".
ITC Investigation No. 337-744, captioned: "Certain Mobile Devices, Associated Software, and Components Thereof" Doc. No. 609657-445051_12 "Exhibit 402 ptl".
ITC Investigation No. 337-744, captioned: "Certain Mobile Devices, Associated Software, and Components Thereof" Doc. No. 609661-445051_16 "Exhibit 503".
ITC Investigation No. 337-744, captioned: "Certain Mobile Devices, Associated Software, and Components Thereof" Doc. No. 609662-445051_17 "Exhibit 504".
ITC Investigation No. 337-744, captioned: "Certain Mobile Devices, Associated Software, and Components Thereof" Doc. No. 609663-445051_18 "Exhibit 505".
ITC Investigation No. 337-744, captioned: "Certain Mobile Devices, Associated Software, and Components Thereof" Doc. No. 609655-445051_20 "Exhibit 602".
ITC Investigation No. 337-744, captioned: "Certain Mobile Devices, Associated Software, and Components Thereof" Doc. No. 609670-445051_24 "Exhibit 703".
ITC Investigation No. 337-744, captioned: "Certain Mobile Devices, Associated Software, and Components Thereof" Doc. No. 609672-445051_26 "Exhibit 802 pt2".
ITC Investigation No. 337-744, captioned: "Certain Mobile Devices, Associated Software, and Components Thereof" Doc. No. 609673-445051_27 "Exhibit 802".
ITC Investigation No. 337-744, captioned: "Certain Mobile Devices, Associated Software, and Components Thereof" Doc. No. 609674-445051_28 "Exhibit 803".
ITC Investigation No. 337-744, captioned: "Certain Mobile Devices, Associated Software, and Components Thereof" Doc. No. 609666-445051_29 "Public Exhibit 804".
ITC Investigation No. 337-744, captioned: "Certain Mobile Devices, Associated Software, and Components Thereof" Doc. No. 610278-445051_31 "Exhibit 902—Part 1".
ITC Investigation No. 337-744, captioned: "Certain Mobile Devices, Associated Software, and Components Thereof" Doc. No. 609676-445051_32 "Exhibit 902 Prt2".
ITC Investigation No. 337-744, captioned: "Certain Mobile Devices, Associated Software, and Components Thereof" Doc. No. 609677-445051_33 "Exhibit 902 pt3".
ITC Investigation No. 337-744, captioned: "Certain Mobile Devices, Associated Software, and Components Thereof" Doc. No. 609675-445051_34 "Exhibit 903".
ITC Investigation No. 337-744, captioned: "Certain Mobile Devices, Associated Software, and Components Thereof" Doc. No. 611060-445200_1 "611060".
ITC Investigation No. 337-744, captioned: "Certain Mobile Devices, Associated Software, and Components Thereof" Doc. No. 611061-445200_2 "611061".
ITC Investigation No. 337-744, captioned: "Certain Mobile Devices, Associated Software, and Components Thereof" Doc. No. 611062-445200_3 "611062".
ITC Investigation No. 337-744, captioned: "Certain Mobile Devices, Associated Software, and Components Thereof" Doc. No. 611063-445200_4 "611063".
ITC Investigation No. 337-744, captioned: "Certain Mobile Devices, Associated Software, and Components Thereof" Doc. No. 611064-445200_5 "611064".
ITC Investigation No. 337-744, captioned: "Certain Mobile Devices, Associated Software, and Components Thereof" Doc. No. 611065-445200_6 "611065".
ITC Investigation No. 337-744, captioned: "Certain Mobile Devices, Associated Software, and Components Thereof" Doc. No. 611066-445200_7 "611066".
ITC Investigation No. 337-744, captioned: "Certain Mobile Devices, Associated Software, and Components Thereof" Doc. No. 611067-445200_8 "611067".
ITC Investigation No. 337-744, captioned: "Certain Mobile Devices, Associated Software, and Components Thereof" Doc. No. 611068-445200_9 "611068".
ITC Investigation No. 337-744, captioned: "Certain Mobile Devices, Associated Software, and Components Thereof" Doc. No. 611069-445200_10 "611069".
ITC Investigation No. 337-744, captioned: "Certain Mobile Devices, Associated Software, and Components Thereof" Doc. No. 611070-445200_11 "611070".
ITC Investigation No. 337-744, captioned: "Certain Mobile Devices, Associated Software, and Components Thereof" Doc. No. 611071-445200_12 "611071".

(56) References Cited

OTHER PUBLICATIONS

ITC Investigation No. 337-744, captioned: "Certain Mobile Devices, Associated Software, and Components Thereof" Doc. No. 611072-445200_13 "611072".
ITC Investigation No. 337-744, captioned: "Certain Mobile Devices, Associated Software, and Components Thereof" Doc. No. 611073-445200_14 "611073".
ITC Investigation No. 337-744, captioned: "Certain Mobile Devices, Associated Software, and Components Thereof" Doc. No. 611074-445200_15 "611074".
ITC Investigation No. 337-744, captioned: "Certain Mobile Devices, Associated Software, and Components Thereof" Doc. No. 611075-445200_16 "611075".
ITC Investigation No. 337-744, captioned: "Certain Mobile Devices, Associated Software, and Components Thereof" Doc. No. 611076-445200_17 "611076".
ITC Investigation No. 337-744, captioned: "Certain Mobile Devices, Associated Software, and Components Thereof" Doc. No. 611077-445200_18 "611077".
ITC Investigation No. 337-744, captioned: "Certain Mobile Devices, Associated Software, and Components Thereof" Doc. No. 611078-445200_19 "611078".
ITC Investigation No. 337-744, captioned: "Certain Mobile Devices, Associated Software, and Components Thereof" Doc. No. 611079-445200_20 "611079".
ITC Investigation No. 337-744, captioned: "Certain Mobile Devices, Associated Software, and Components Thereof" Doc. No. 611080-445200_21 "611080".
ITC Investigation No. 337-744, captioned: "Certain Mobile Devices, Associated Software, and Components Thereof" Doc. No. 611081-445200_22 "611081".
ITC Investigation No. 337-744, captioned: "Certain Mobile Devices, Associated Software, and Components Thereof" Doc. No. 611082-445200_23 "611082".
ITC Investigation No. 337-744, captioned: "Certain Mobile Devices, Associated Software, and Components Thereof" Doc. No. 611083-445200_24 "611083".
ITC Investigation No. 337-744, captioned: "Certain Mobile Devices, Associated Software, and Components Thereof" Doc. No. 611093-445200_34 "611093".
ITC Investigation No. 337-744, captioned: "Certain Mobile Devices, Associated Software, and Components Thereof" Doc. No. 611094-445200_35 "611094".
ITC Investigation No. 337-744, captioned: "Certain Mobile Devices, Associated Software, and Components Thereof" Doc. No. 611095-445200_36 "611095".
ITC Investigation No. 337-744, captioned: "Certain Mobile Devices, Associated Software, and Components Thereof" Doc. No. 611096-445200_37 "611096".
ITC Investigation No. 337-744, captioned: "Certain Mobile Devices, Associated Software, and Components Thereof" Doc. No. 611097-445200_38 "611097".
ITC Investigation No. 337-744, captioned: "Certain Mobile Devices, Associated Software, and Components Thereof" Doc. No. 611098-445200_39 "611098".
ITC Investigation No. 337-744, captioned: "Certain Mobile Devices, Associated Software, and Components Thereof" Doc. No. 611099-445200_40 "611099".
ITC Investigation No. 337-744, captioned: "Certain Mobile Devices, Associated Software, and Components Thereof" Doc. No. 611100-445200_41 "611100".
ITC Investigation No. 337-744, captioned: "Certain Mobile Devices, Associated Software, and Components Thereof" Doc. No. 611101-445200_42 "611101".
ITC Investigation No. 337-744, captioned: "Certain Mobile Devices, Associated Software, and Components Thereof" Doc. No. 611102-445200_43 "611102".
ITC Investigation No. 337-744, captioned: "Certain Mobile Devices, Associated Software, and Components Thereof" Doc. No. 611103-445200_44 "611103".
ITC Investigation No. 337-744, captioned: "Certain Mobile Devices, Associated Software, and Components Thereof" Doc. No. 611104-445200_45 "611104".
ITC Investigation No. 337-744, captioned: "Certain Mobile Devices, Associated Software, and Components Thereof" Doc. No. 611105-445200_46 "611105".
ITC Investigation No. 337-744, captioned: "Certain Mobile Devices, Associated Software, and Components Thereof" Doc. No. 611108-445200_49 "611108".
ITC Investigation No. 337-744, captioned: "Certain Mobile Devices, Associated Software, and Components Thereof" Doc. No. 611109-445200_50 "611109".
ITC Investigation No. 337-744, captioned: "Certain Mobile Devices, Associated Software, and Components Thereof" Doc. No. 611110-445200_51 "611110".
ITC Investigation No. 337-744, captioned: "Certain Mobile Devices, Associated Software, and Components Thereof" Doc. No. 611111-445200_52 "611111".
ITC Investigation No. 337-744, captioned: "Certain Mobile Devices, Associated Software, and Components Thereof" Doc. No. 611112-445200_53 "611112".
ITC Investigation No. 337-744, captioned: "Certain Mobile Devices, Associated Software, and Components Thereof" Doc. No. 611113-445200_54 "611113".
ITC Investigation No. 337-744, captioned: "Certain Mobile Devices, Associated Software, and Components Thereof" Doc. No. 611114-445200_55 "611114".
ITC Investigation No. 337-744, captioned: "Certain Mobile Devices, Associated Software, and Components Thereof" Doc. No. 611115-445200_56 "611115".
ITC Investigation No. 337-744, captioned: "Certain Mobile Devices, Associated Software, and Components Thereof" Doc. No. 584101-434903_1 "Appendix C Index".
ITC Investigation No. 337-744, captioned: "Certain Mobile Devices, Associated Software, and Components Thereof" Doc. No. 584102-434903_2 "Appendix C1".
ITC Investigation No. 337-744, captioned: "Certain Mobile Devices, Associated Software, and Components Thereof" Doc. No. 584120-434903_20 "Appendix C2_Tech Refs Cited in 6621746".
ITC Investigation No. 337-744, captioned: "Certain Mobile Devices, Associated Software, and Components Thereof" Doc. No. 584121-434903_21 "Appendix D Index-CD 1 of 1".
ITC Investigation No. 337-744, captioned: "Certain Mobile Devices, Associated Software, and Components Thereof" Doc. No. 584122-434903_22 "Appendix D".
ITC Investigation No. 337-744, captioned: "Certain Mobile Devices, Associated Software, and Components Thereof" Doc. No. 584123-434903_23 "Appendix D1_part 1".
ITC Investigation No. 337-744, captioned: "Certain Mobile Devices, Associated Software, and Components Thereof" Doc. No. 584124-434903_24 "Appendix D1_part 2".
ITC Investigation No. 337-744, captioned: "Certain Mobile Devices, Associated Software, and Components Thereof" Doc. No. 584125-434903_25 "Appendix D2_000 Tech Refs Cited in 6826762".
ITC Investigation No. 337-744, captioned: "Certain Mobile Devices, Associated Software, and Components Thereof" Doc. No. 584134-434903_34 "Appendix D2_009 Cappelletti Mobile Computing Beyond Laptops 1997".
ITC Investigation No. 337-744, captioned: "Certain Mobile Devices, Associated Software, and Components Thereof" Doc. No. 584135-434903_35 "Appendix D2_010 Darby Bridging Wireless and Wired Networks 1999".
ITC Investigation No. 337-744, captioned: "Certain Mobile Devices, Associated Software, and Components Thereof" Doc. No. 584136-434903_36 "Appendix D2_011 Davies L2imbo A Distributed Systems Platform 1998".
ITC Investigation No. 337-744, captioned: "Certain Mobile Devices, Associated Software, and Components Thereof" Doc. No. 584137-434903_37 "Appendix D2_012 Kristoffersen Making Place to Make IT Work 1999".

(56) References Cited

OTHER PUBLICATIONS

ITC Investigation No. 337-744, captioned: "Certain Mobile Devices, Associated Software, and Components Thereof" Doc. No. 584138-434903_38 "Appendix D2_013 Mattila Design Designing Mobile Phones 1999".

ITC Investigation No. 337-744, captioned: "Certain Mobile Devices, Associated Software, and Components Thereof" Doc. No. 584139-434903_39 "Appendix D2_014 Steeman Wireless Application Protocol (WAP) 2000".

ITC Investigation No. 337-744, captioned: "Certain Mobile Devices, Associated Software, and Components Thereof" Doc. No. 584140-434903_40 "Appendix D2_015 Tso Always on Always Connected 1996".

ITC Investigation No. 337-744, captioned: "Certain Mobile Devices, Associated Software, and Components Thereof" Doc. No. 583732-434904_1 "Appendix E Index-CD 1 of 1".

ITC Investigation No. 337-744, captioned: "Certain Mobile Devices, Associated Software, and Components Thereof" Doc. No. 583733-434904_2 "Appendix E".

ITC Investigation No. 337-744, captioned: "Certain Mobile Devices, Associated Software, and Components Thereof" Doc. No. 583734-434904_3 "Appendix E1 6909910_Certified FH".

ITC Investigation No. 337-744, captioned: "Certain Mobile Devices, Associated Software, and Components Thereof" Doc. No. 583735-434904_4 "Appendix E2_000 Tech Refs Cited in 6909910".

ITC Investigation No. 337-744, captioned: "Certain Mobile Devices, Associated Software, and Components Thereof" Doc. No. 583746-434904_10 "Appendix F Index-CD 1 of 1".

ITC Investigation No. 337-744, captioned: "Certain Mobile Devices, Associated Software, and Components Thereof" Doc. No. 583747-434904_11 "Appendix F".

ITC Investigation No. 337-744, captioned: "Certain Mobile Devices, Associated Software, and Components Thereof" Doc. No. 583748-434904_12 "Appendix F1 7644376_Certified FH".

ITC Investigation No. 337-744, captioned: "Certain Mobile Devices, Associated Software, and Components Thereof" Doc. No. 583749-434904_13 "Appendix F2_000.Tech Refs Cited in 7644376".

ITC Investigation No. 337-744, captioned: "Certain Mobile Devices, Associated Software, and Components Thereof" Doc. No. 583756-434904_20 "Appendix F2_008.Inouye Dyami . . . rk Reconfiguration (2007)".

ITC Investigation No. 337-744, captioned: "Certain Mobile Devices, Associated Software, and Components Thereof" Doc. No. 583757-434904_21 "Appendix F2_009 US Prov. App. 60-513723".

ITC Investigation No. 337-744, captioned: "Certain Mobile Devices, Associated Software, and Components Thereof" Doc. No. 583758-434904_22 "Appendix G Index-CD 1 of 1".

ITC Investigation No. 337-744, captioned: "Certain Mobile Devices, Associated Software, and Components Thereof" Doc. No. 583761-434904_25 "Appendix G2_000 Tech Refs Cited in 5664133".

ITC Investigation No. 337-744, captioned: "Certain Mobile Devices, Associated Software, and Components Thereof" Doc. No. 584994-434905_1 "Appendix I Index-CD 1 of 1".

ITC Investigation No. 337-744, captioned: "Certain Mobile Devices, Associated Software, and Components Thereof" Doc. No. 584995-534905_2 "Appendix I2_000.Tech Refs Cited in 6370566".

ITC Investigation No. 337-744, captioned: "Certain Mobile Devices, Associated Software, and Components Thereof" Doc. No. 585029-534905_36 "Appendix I2_034.Byrne_The MS Outlook 97 Automation Model".

ITC Investigation No. 337-744, captioned: "Certain Mobile Devices, Associated Software, and Components Thereof" Doc. No. 585030-534905_37 "Appendix I2_035.IBM Tech Discl Method for PDA Calendar".

ITC Investigation No. 337-744, captioned: "Certain Mobile Devices, Associated Software, and Components Thereof" Doc. No. 585031-534905_38 "Appendix I2_036.MS Apptitem Object".

ITC Investigation No. 337-744, captioned: "Certain Mobile Devices, Associated Software, and Components Thereof" Doc. No. 585032-534905_39 "Appendix I2_037.MS RecurrencePattern Object".

ITC Investigation No. 337-744, captioned: "Certain Mobile Devices, Associated Software, and Components Thereof" Doc. No. 585033-534905_40 "Appendix I2_038.MS RecurringEvent Object".

ITC Investigation No. 337-744, captioned: "Certain Mobile Devices, Associated Software, and Components Thereof" Doc. No. 585034-534905_41 "Appedix I2_039.MSOffice 97 Guide_Chp 5 MS Outlook Objects".

ITC Investigation No. 337-744, captioned: "Certain Mobile Devices, Associated Software, and Components Thereof" Doc. No. 585035-534905_42 "Appendix I2_040.OConnor_Managing Contacts in Windows 95".

ITC Investigation No. 337-744, captioned: "Certain Mobile Devices, Associated Software, and Components Thereof" Doc. No. 585036-534905_43 "Appendix I2_041.Pepper_The CallManager System".

ITC Investigation No. 337-744, captioned: "Certain Mobile Devices, Associated Software, and Components Thereof" Doc. No. 585204-534905_44 "Appendix H Index-CD 1 of 1".

ITC Investigation No. 337-744, captioned: "Certain Mobile Devices, Associated Software, and Components Thereof" Doc. No. 585205-534905_45 "Appendix H1_Part 2".

ITC Investigation No. 337-744, captioned: "Certain Mobile Devices, Associated Software, and Components Thereof" Doc. No. 585206-534905_46 "Appendix H2_000.Tech Refs Cited in 6578054".

ITC Investigation No. 337-744, captioned: "Certain Mobile Devices, Associated Software, and Components Thereof" Doc. No. 585219-534905_59 "Appendix H2_013.Borenstein MIME Part One_1993".

ITC Investigation No. 337-744, captioned: "Certain Mobile Devices, Associated Software, and Components Thereof" Doc. No. 585220-534905_60 "Appendix H2_014.Fielding Hypertext Trnsfer Protocol".

ITC Investigation No. 337-744, captioned: "Certain Mobile Devices, Associated Software, and Components Thereof" Doc. No. 585221-534905_61 "Appendix H2_015.Fielding Hypertext Transfr Protocol".

ITC Investigation No. 337-744, captioned: "Certain Mobile Devices, Associated Software, and Components Thereof" Doc. No. 585222-53490562 "Appendix H2_016.Goland HTTP Exts for Distrib Authoring".

ITC Investigation No. 337-744, captioned: "Certain Mobile Devices, Associated Software, and Components Thereof" Doc. No. 585223-53490563 "Appendix H2_017.Martin Strategy for Distrib DP".

ITC Investigation No. 337-744, captioned: "Certain Mobile Devices, Associated Software, and Components Thereof" Doc. No. 585224-534905_64 "Appendix H2_018.Slein Reqmnts for a Dist Authoring".

ITC Investigation No. 337-744, captioned: "Certain Mobile Devices, Associated Software, and Components Thereof" Doc. No. 585225-534905_65 "Appendix H2_019.Yavin Republication Fact Track".

ITC Investigation No. 337-744, captioned: "Certain Mobile Devices, Associated Software, and Components Thereof" Doc. No. 611575-445623_1 "Microsoft's Reply Claim Construction Brief".

ITC Investigation No. 337-744, captioned: "Certain Mobile Devices, Associated Software, and Components Thereof" Doc. No. 611576-445623_2 "Exhibit 105".

ITC Investigation No. 337-744, captioned: "Certain Mobile Devices, Associated Software, and Components Thereof" Doc. No. 611577-445623_"Exhibit 106".

ITC Investigation No. 337-744, captioned: "Certain Mobile Devices, Associated Software, and Components Thereof" Doc. No. 611578-445623_"Exhibit 304".

ITC Investigation No. 337-744, captioned: "Certain Mobile Devices, Associated Software, and Components Thereof" Doc. No. 611579-445623_5 "Exhibit 305".

ITC Investigation No. 337-744, captioned: "Certain Mobile Devices, Associated Software, and Components Thereof" Doc. No. 611580-445623_6 "Exhibit 306".

ITC Investigation No. 337-744, captioned: "Certain Mobile Devices, Associated Software, and Components Thereof" Doc. No. 611581-445623_7 "Exhibit 704".

ITC Investigation No. 337-744, captioned: "Certain Mobile Devices, Associated Software, and Components Thereof" Doc. No. 611583-445623_9 "Exhibit List".

(56) References Cited

OTHER PUBLICATIONS

ITC Investigation No. 337-744, captioned: "Certain Mobile Devices, Associated Software, and Components Thereof" Doc. No. 611594-445626_ "611594".
ITC Investigation No. 337-744, captioned: "Certain Mobile Devices, Associated Software, and Components Thereof" Doc. No. 611604-445626_ "611604".
ITC Investigation No. 337-744, captioned: "Certain Mobile Devices, Associated Software, and Components Thereof" Doc. No. 611605-445626_12 "611605".
ITC Investigation No. 337-744, captioned: "Certain Mobile Devices, Associated Software, and Components Thereof" Doc. No. 611606-445626_13 "611606".
ITC Investigation No. 337-744, captioned: "Certain Mobile Devices, Associated Software, and Components Thereof" Doc. No. 611607-445626_14 "611607".
ITC Investigation No. 337-744, captioned: "Certain Mobile Devices, Associated Software, and Components Thereof" Doc. No. 611608-445626_15 "611608".
ITC Investigation No. 337-744, captioned: "Certain Mobile Devices, Associated Software, and Components Thereof" Doc. No. 611609-445626_16 "611609".
ITC Investigation No. 337-744, captioned: "Certain Mobile Devices, Associated Software, and Components Thereof" Doc. No. 611610-445626_17 "611610".
ITC Investigation No. 337-744, captioned: "Certain Mobile Devices, Associated Software, and Components Thereof" Doc. No. 611611-445626_18 "611611".
ITC Investigation No. 337-744, captioned: "Certain Mobile Devices, Associated Software, and Components Thereof" Doc. No. 611612-445626_19 "611612".
ITC Investigation No. 337-744, captioned: "Certain Mobile Devices, Associated Software, and Components Thereof" Doc. No. 611613-445626_20 "611613".
ITC Investigation No. 337-744, captioned: "Certain Mobile Devices, Associated Software, and Components Thereof" Doc. No. 611614-445626_21 "611614".
ITC Investigation No. 337-744, captioned: "Certain Mobile Devices, Associated Software, and Components Thereof" Doc. No. 611615-445626_22 "611615".
ITC Investigation No. 337-744, captioned: "Certain Mobile Devices, Associated Software, and Components Thereof" Doc. No. 611616-445626_23 "611616".
ITC Investigation No. 337-744, captioned: "Certain Mobile Devices, Associated Software, and Components Thereof" Doc. No. 611619-445626_26 "611619".
ITC Investigation No. 337-744, captioned: "Certain Mobile Devices, Associated Software, and Components Thereof" Doc. No. 611620-445626_27 "611620".
ITC Investigation No. 337-744, captioned: "Certain Mobile Devices, Associated Software, and Components Thereof" Doc. No. 611621-445626_28 "611621".
ITC Investigation No. 337-744, captioned: "Certain Mobile Devices, Associated Software, and Components Thereof" Doc. No. 611622-445626_29 "611622".
ITC Investigation No. 337-744, captioned: "Certain Mobile Devices, Associated Software, and Components Thereof" Doc. No. 611694-445691_1 "Respondents Motorola, Inc. And Motorola Mobility Inc. And Complainant Microsoft Corporation's Joint Claim Chart".
ITC Investigation No. 337-744, captioned: "Certain Mobile Devices, Associated Software, and Components Thereof" Doc. No. 613968-446856_1 "613968".
ITC Investigation No. 337-744, captioned: "Certain Mobile Devices, Associated Software, and Components Thereof" Doc. No. 623287-449708_1 "Notice of Prior Art".
ITC Investigation No. 337-744, captioned: "Certain Mobile Devices, Associated Software, and Components Thereof" Doc. No. 583786-434895_1 "A1 Photocopy of CD of 5579517".
ITC Investigation No. 337-744, captioned: "Certain Mobile Devices, Associated Software, and Components Thereof" Doc. No. 583787-434895_2 "A2 Photocopy of CD 90-007007_Reexam 517".
ITC Investigation No. 337-744, captioned: "Certain Mobile Devices, Associated Software, and Components Thereof" Doc. No. 583788-434895_3 "A3 Photocopy of CD 90-007371_Reexam 517".
ITC Investigation No. 337-744, captioned: "Certain Mobile Devices, Associated Software, and Components Thereof" Doc. No. 583789-434895_4 "Appendix A Index—CD 1 of 5".
ITC Investigation No. 337-744, captioned: "Certain Mobile Devices, Associated Software, and Components Thereof" Doc. No. 583790-434895_5 "Appendix A1_Part 1".
ITC Investigation No. 337-744, captioned: "Certain Mobile Devices, Associated Software, and Components Thereof" Doc. No. 583791-434895_6 "Appendix A1_Part 2".
ITC Investigation No. 337-744, captioned: "Certain Mobile Devices, Associated Software, and Components Thereof" Doc. No. 583792-434895_7 "Appendix A1_Part 3".
ITC Investigation No. 337-744, captioned: "Certain Mobile Devices, Associated Software, and Components Thereof" Doc. No. 583793-434895_8 "Appendix A1_Part 4".
ITC Investigation No. 337-744, captioned: "Certain Mobile Devices, Associated Software, and Components Thereof" Doc. No. 583794-434895_9 "Appendix A2_Part 1".
ITC Investigation No. 337-744, captioned: "Certain Mobile Devices, Associated Software, and Components Thereof" Doc. No. 583795-434895_10 "Appendix A2_Part 10".
ITC Investigation No. 337-744, captioned: "Certain Mobile Devices, Associated Software, and Components Thereof" Doc. No. 583796-434896_11 "Appendix A2_Part 11".
ITC Investigation No. 337-744, captioned: "Certain Mobile Devices, Associated Software, and Components Thereof" Doc. No. 583797-434895_12 "Appendix A2_Part 12".
ITC Investigation No. 337-744, captioned: "Certain Mobile Devices, Associated Software, and Components Thereof" Doc. No. 583798-434895_13 "Appendix A2_Part 13".
ITC Investigation No. 337-744, captioned: "Certain Mobile Devices, Associated Software, and Components Thereof" Doc. No. 583799-434895_14 "Appendix A2_Part 14".
ITC Investigation No. 337-744, captioned: "Certain Mobile Devices, Associated Software, and Components Thereof" Doc. No. 583800-434895_15 "Appendix A2_Part 15".
ITC Investigation No. 337-744, captioned: "Certain Mobile Devices, Associated Software, and Components Thereof" Doc. No. 583801-434895_16 "Appendix A2_Part 16".
ITC Investigation No. 337-744, captioned: "Certain Mobile Devices, Associated Software, and Components Thereof" Doc. No. 583802-434895_17 "Appendix A2_Part 17".
ITC Investigation No. 337-744, captioned: "Certain Mobile Devices, Associated Software, and Components Thereof" Doc. No. 583803-434895_18 "Appendix A2_Part 18".
ITC Investigation No. 337-744, captioned: "Certain Mobile Devices, Associated Software, and Components Thereof" Doc. No. 583804-434895_19 "Appendix A2_Part 2".
ITC Investigation No. 337-744, captioned: "Certain Mobile Devices, Associated Software, and Components Thereof" Doc. No. 583805-434895_20 "Appendix A2_Part 3".
ITC Investigation No. 337-744, captioned: "Certain Mobile Devices, Associated Software, and Components Thereof" Doc. No. 583806-434895_21 "Appendix A2_Part 4".
ITC Investigation No. 337-744, captioned: "Certain Mobile Devices, Associated Software, and Components Thereof" Doc. No. 583807-434895_22 "Appendix A2_Part 5".
ITC Investigation No. 337-744, captioned: "Certain Mobile Devices, Associated Software, and Components Thereof" Doc. No. 583808-434895_23 "Appendix A2_Part 6".
ITC Investigation No. 337-744, captioned: "Certain Mobile Devices, Associated Software, and Components Thereof" Doc. No. 583809-434895_24 "Appendix A2_Part 7".
ITC Investigation No. 337-744, captioned: "Certain Mobile Devices, Associated Software, and Components Thereof" Doc. No. 583810-434895_25 "Appendix A2_Part 8".

(56) References Cited

OTHER PUBLICATIONS

ITC Investigation No. 337-744, captioned: "Certain Mobile Devices, Associated Software, and Components Thereof" Doc. No. 583811-434895_26 "Appendix A2_Part 9".
ITC Investigation No. 337-744, captioned: "Certain Mobile Devices, Associated Software, and Components Thereof" Doc. No. 583812-434895_27 "Appendix A3_Part 1".
ITC Investigation No. 337-744, captioned: "Certain Mobile Devices, Associated Software, and Components Thereof" Doc. No. 583813-434895_28 "Appendix A3_Part 10".
ITC Investigation No. 337-744, captioned: "Certain Mobile Devices, Associated Software, and Components Thereof" Doc. No. 583814-434895_29 "Appendix A3_Part 11".
ITC Investigation No. 337-744, captioned: "Certain Mobile Devices, Associated Software, and Components Thereof" Doc. No. 583815-434895_30 "Appendix A3_Part 12".
ITC Investigation No. 337-744, captioned: "Certain Mobile Devices, Associated Software, and Components Thereof" Doc. No. 583816-434895_31 "Appendix A3_Part 13".
ITC Investigation No. 337-744, captioned: "Certain Mobile Devices, Associated Software, and Components Thereof" Doc. No. 583817-434895_32 "Appendix A3_Part 14".
ITC Investigation No. 337-744, captioned: "Certain Mobile Devices, Associated Software, and Components Thereof" Doc. No. 583818-434895_33 "Appendix A3_Part 15".
ITC Investigation No. 337-744, captioned: "Certain Mobile Devices, Associated Software, and Components Thereof" Doc. No. 583819-434895_34 "Appendix A3_Part 16".
ITC Investigation No. 337-744, captioned: "Certain Mobile Devices, Associated Software, and Components Thereof" Doc. No. 583820-434895_35 "Appendix A3_Part 17".
ITC Investigation No. 337-744, captioned: "Certain Mobile Devices, Associated Software, and Components Thereof" Doc. No. 583821-434895_36 "Appendix A3_Part 2".
ITC Investigation No. 337-744, captioned: "Certain Mobile Devices, Associated Software, and Components Thereof" Doc. No. 583822-434895_37 "Appendix A3_Part 3".
ITC Investigation No. 337-744, captioned: "Certain Mobile Devices, Associated Software, and Components Thereof" Doc. No. 583823-434895_38 "Appendix A3_4".
ITC Investigation No. 337-744, captioned: "Certain Mobile Devices, Associated Software, and Components Thereof" Doc. No. 583824-434895_39 "Appendix A3_Part 5".
ITC Investigation No. 337-744, captioned: "Certain Mobile Devices, Associated Software, and Components Thereof" Doc. No. 583825-434895_40 "Appendix A3_Part 6".
ITC Investigation No. 337-744, captioned: "Certain Mobile Devices, Associated Software, and Components Thereof" Doc. No. 583826-434895_41 "Appendix A3_Part 7".
ITC Investigation No. 337-744, captioned: "Certain Mobile Devices, Associated Software, and Components Thereof" Doc. No. 583827-434895_42 "Appendix A3_Part 8".
ITC Investigation No. 337-744, captioned: "Certain Mobile Devices, Associated Software, and Components Thereof" Doc. No. 583828-434895_43 "Appendix A3_Part 9".
ITC Investigation No. 337-744, captioned: "Certain Mobile Devices, Associated Software, and Components Thereof" Doc. No. 583829-434895_44 "Appendix A4_000 Tech Refs Cited in 5579517".
ITC Investigation No. 337-744, captioned: "Certain Mobile Devices, Associated Software, and Components Thereof" Doc. No. 713750-470025_1 "Complainant Microsoft Corporation's Response to Respondent Motorola Mobility, Inc. 's Petition and Contingent Petition for Review" Jan. 26, 2012.
ITC Investigation No. 337-744, captioned: "Certain Mobile Devices, Associated Software, and Components Thereof" Doc. No. 713748-470024_1 "Summary of Complainant Microsoft Corporation's Response to Respondent Motorola Mobility, Inc. 's Petition and Contingent Petition for Review" Jan. 26, 2012.
ITC Investigation No. 337-744, captioned: "Certain Mobile Devices, Associated Software, and Components Thereof" Doc. No. 469387-711302_1 "Public Version of Respondent Motorola Mobility Inc. 's Summary of response to Complainant Microsoft Corporation's Petition for Review" Jan. 23, 2012.
ITC Investigation No. 337-744, captioned: "Certain Mobile Devices, Associated Software, and Components Thereof" Doc. No. 469359-711253_1 "Jan. 20, 2012[Public] Public Version of Motorola Mobility Inc. 's Response to Petition for Review" Jan. 20, 2012.
ITC Investigation No. 337-744, captioned: "Certain Mobile Devices, Associated Software, and Components Thereof" Doc. No. 469354-711246_1 "Public Version of Respondent Motorola Mobility Inc. 's Summary of Petition and Contingent Petition for Review" Jan. 2012.
ITC Investigation No. 337-744, captioned: "Certain Mobile Devices, Associated Software, and Components Thereof" Doc. No. 469352-711241_1 "Public Version of Respondent Motorola Mobility Inc. 's Petition and Contingent Petition for Review" Jan. 20, 2012.
ITC Investigation No. 337-744, captioned: "Certain Mobile Devices, Associated Software, and Components Thereof" Doc. No. 468894-708680_1 "Microsoft Corporation's Petition for Review of Initial Determination" Jan. 18, 2012.
ITC Investigation No. 337-744, captioned: "Certain Mobile Devices, Associated Software, and Components Thereof" Doc. No. 468883-708670_1 "Public Version of Microsoft Summary of Petition for Review" Jan. 17, 2012.
ITC Investigation No. 337-744, captioned: "Certain Mobile Devices, Associated Software, and Components Thereof" Doc. No. 467464-705702_1 "467464" Dec. 29, 2011.
ITC Investigation No. 337-744, captioned: "Certain Mobile Devices, Associated Software, and Components Thereof" Doc. No. 480750-748295_1 "748295" May 21, 2012.
ITC Investigation No. 337-744, captioned: "Certain Mobile Devices, Associated Software, and Components Thereof" Doc. No. 480752-748264_1 "748264" May 18, 2012.
ITC Investigation No. 337-744, captioned: "Certain Mobile Devices, Associated Software, and Components Thereof" Doc. No. 480668-748147_1 "748147" May 18, 2012.
ITC Investigation No. 337-744, captioned: "Certain Mobile Devices, Associated Software, and Components Thereof" Doc. No. 476982-735467_1 "Complainant Microsoft Corporation's Response to Motorola Mobility's Written Submission in Response to Notice of a Commission Determination to Review a Final Initial Determination in Part" Apr. 6, 2012.
ITC Investigation No. 337-744, captioned: "Certain Mobile Devices, Associated Software, and Components Thereof" Doc. No. 476447-732456_1 "732456" Mar. 27, 2012.
ITC Investigation No. 337-744, captioned: "Certain Mobile Devices, Associated Software, and Components Thereof" Doc. No. 476443-732448_1 "Mar. 30, 2012 (Public) Respondent Motorola Mobility Inc's Opening Brief on Commission Review.pdf" Mar. 19, 2012.
ITC Investigation No. 337-744, captioned: "Certain Mobile Devices, Associated Software, and Components Thereof" Doc. No. 476312-732171_1 "Complainant Microsoft Corporation's Written Submission in Response to Notice of Commission Determination to Review a Final Initial Determaion in Part (1 of 2)" Mar. 19, 2012.
ITC Investigation No. 337-744, captioned: "Certain Mobile Devices, Associated Software, and Components Thereof" Doc. No. 476312-732170_2 "Complainant Microsoft Corporation's Written Submission in Response to Notice of Commission Determination to Review a Final Initial Determaion in Part (2 of 2)" Mar. 19, 2012.
ITC Investigation No. 337-744, captioned: "Certain Mobile Devices, Associated Software, and Components Thereof" Doc. No. 476085_731229_1 "Microsoft's Response to Public Interest Statement of Non-Party Google, Inc. " Mar. 27, 2012.
ITC Investigation No. 337-744, captioned: "Certain Mobile Devices, Associated Software, and Components Thereof" Doc. No. 476085_731230_2 "Exhibit A" Jun. 13, 2011.
ITC Investigation No. 337-744, captioned: "Certain Mobile Devices, Associated Software, and Components Thereof" Doc. No. 476085_731231_3 "Exhibit B" Aug. 22, 2011.
ITC Investigation No. 337-744, captioned: "Certain Mobile Devices, Associated Software, and Components Thereof" Doc. No. 476085_731232_4 "Exhibit C" Dec. 22, 2011.

(56) References Cited

OTHER PUBLICATIONS

ITC Investigation No. 337-744, captioned: "*Certain Mobile Devices, Associated Software, and Components Thereof*" Doc. No. 476085_731233_5 "*Exhibit D*" Feb. 27, 2012.
ITC Investigation No. 337-744, captioned: "*Certain Mobile Devices, Associated Software, and Components Thereof*" Doc. No. 476085_731234_6 "*Exhibit E*" Nov. 15, 2011.
ITC Investigation No. 337-744, captioned: "*Certain Mobile Devices, Associated Software, and Components Thereof*" Doc. No. 476085_731235_7 "*Exhibit F*" Mar. 27, 2012.
ITC Investigation No. 337-744, captioned: "*Certain Mobile Devices, Associated Software, and Components Thereof*" Doc. No. 476085_731236_8 "*Exhibit G*" Mar. 27, 2012.
ITC Investigation No. 337-744, captioned: "*Certain Mobile Devices, Associated Software, and Components Thereof*" Doc. No. 476085_731237_9 "*Exhibit H*" 2010.
ITC Investigation No. 337-744, captioned: "*Certain Mobile Devices, Associated Software, and Components Thereof*" Doc. No. 476085_731238_10 "*Exhibit I*" Sep. 15, 2010.
ITC Investigation No. 337-744, captioned: "*Certain Mobile Devices, Associated Software, and Components Thereof*" Doc. No. 476085_731240_11 "*Exhibit J*" May 5, 2011.
ITC Investigation No. 337-744, captioned: "*Certain Mobile Devices, Associated Software, and Components Thereof*" Doc. No. 476085_731241_12 "*Exhibit K*" May 8, 2011.
ITC Investigation No. 337-744, captioned: "*Certain Mobile Devices, Associated Software, and Components Thereof*" Doc. No. 476085_731242_13 "*Exhibit L*" Aug. 6, 2010.
ITC Investigation No. 337-744, captioned: "*Certain Mobile Devices, Associated Software, and Components Thereof*" Doc. No. 476085_731243_14 "*Exhibit M*" May 9, 2011.
ITC Investigation No. 337-744, captioned: "*Certain Mobile Devices, Associated Software, and Components Thereof*" Doc. No. 476085_731244_15 "*Exhibit N*" Aug. 16, 2011.
ITC Investigation No. 337-744, captioned: "*Certain Mobile Devices, Associated Software, and Components Thereof*" Doc. No. 476085_731245_16 "*Exhibit O*" Jul. 22, 2010.
ITC Investigation No. 337-744, captioned: "*Certain Mobile Devices, Associated Software, and Components Thereof*" Doc. No. 476085_731246_17 "*Exhibit P*" Jul. 2011.
ITC Investigation No. 337-744, captioned: "*Certain Mobile Devices, Associated Software, and Components Thereof*" Doc. No. 476085_731247_18 "*Exhibit Q*" Feb. 16, 2012.
ITC Investigation No. 337-744, captioned: "*Certain Mobile Devices, Associated Software, and Components Thereof*" Doc. No. 482094_751737_1 "*482094*" Jun. 5, 2012.
ITC Investigation No. 337-744, captioned: "*Certain Mobile Devices, Associated Software, and Components Thereof*" Docket Report retrieved Jun. 8, 2012.
Ethier, S.; "Application-driven Power Management: A Framework for Achieving Fine-Granted Control Over the Power Consumption of Purpose-Specific Mobile Devices"; QNX Software Systems, Ltd., pp. 3-15.
Inouye, J., et al.; "Dynamic Network Reconfiguration Support for Mobile Computers"; MOBICOM 97, pp. 13-22, 1997.
Office Action dated Dec. 19, 2008, issued in CN Appl. No. 200410087701.X, w/translation .
Office Action dated Mar. 2, 2010, issued in CN Appl. No. 200410087701.X, w/translation .
Office Action dated Apr. 25, 2008, issued in EP Appl. No. 04023852.9.
Office Action dated Jun. 29, 2010, issued in EP Appl. No. 04023852.9.
Office Action dated Dec. 15, 2009, issued in JP Appl. No. 2004-310058, w/translation .
Office Action dated Dec. 14, 2010, issued in JP Appl. No. 2004-310058, w/translation .
Office Action dated Dec. 19, 2008, issued in KR Appl. No. 10-2004-84927, w/translation .
ITC Investigation No. 337-744, captioned: "Certain Mobile Devices, Associated Software, and Components Thereof" Docket Report retrieved Jun. 27, 2013.
ITC Investigation No. 337-744, captioned: "Certain Mobile Devices, Associated Software, and Components Thereof" Doc. No. 482881_755061_1, Jun. 13, 2012 (2 pages).
ITC Investigation No. 337-744, captioned: "Certain Mobile Devices, Associated Software, and Components Thereof" Doc. No. 483744_756513_1, Jun. 25, 2012 (4 pages).
ITC Investigation No. 337-744, captioned: "Certain Mobile Devices, Associated Software, and Components Thereof" Doc. No. 485881_761536_1, Jul. 19, 2012 (84 pages.).
ITC Investigation No. 337-744, captioned: "Certain Mobile Devices, Associated Software, and Components Thereof" Doc. No. 487409_768216_1, Aug. 6, 2012 (1 page).
ITC Investigation No. 337-744, captioned: "Certain Mobile Devices, Associated Software, and Components Thereof" Doc. No. 489451_776795_1, Aug. 27, 2012 (89 pages).
ITC Investigation No. 337-744, captioned: "Certain Mobile Devices, Associated Software, and Components Thereof" Doc. No. 489808_777712_1, Aug. 29, 2012 (3 pages).
ITC Investigation No. 337-744, captioned: "Certain Mobile Devices, Associated Software, and Components Thereof" Doc. No. 491009_783036_1, Sep. 14, 2012 (8 pages).
ITC Investigation No. 337-744, captioned: "Certain Mobile Devices, Associated Software, and Components Thereof" Doc. No. 491009_783034_2, Sep. 14, 2012 (14 pages).
ITC Investigation No. 337-744, captioned: "Certain Mobile Devices, Associated Software, and Components Thereof" Doc. No. 491009_783035_3, Sep. 14, 2012 (2 pages).
ITC Investigation No. 337-744, captioned: "Certain Mobile Devices, Associated Software, and Components Thereof" Doc. No. 492412_787901_1, Oct. 4, 2012 (3 pages).
ITC Investigation No. 337-744, captioned: "Certain Mobile Devices, Associated Software, and Components Thereof" Doc. No. 493680_791927_1, Oct. 16, 2012 (5 pages).
ITC Investigation No. 337-744, captioned: "Certain Mobile Devices, Associated Software, and Components Thereof" Doc. No. 493681_791928_1, Oct. 16, 2012 (9 pages).
ITC Investigation No. 337-744, captioned: "Certain Mobile Devices, Associated Software, and Components Thereof" Doc. No. 493815_792094_1, Oct. 17, 2012 (pp. 12).
ITC Investigation No. 337-744, captioned: "Certain Mobile Devices, Associated Software, and Components Thereof" Doc. No. 496503_798287_1, Nov. 7, 2012 (4 pages).
ITC Investigation No. 337-744, captioned: "Certain Mobile Devices, Associated Software, and Components Thereof" Doc. No. 502131_814080_1, Jan. 25, 2013 (3 pages).
ITC Investigation No. 337-744, captioned: "Certain Mobile Devices, Associated Software, and Components Thereof" Doc. No. 502410_814465, Jan. 30, 2013 (1 page).
ITC Investigation No. 337-744, captioned: "Certain Mobile Devices, Associated Software, and Components Thereof" Doc. No. 505434_828065_1, Mar. 8, 2013 (142 pages).
ITC Investigation No. 337-744, captioned: "Certain Mobile Devices, Associated Software, and Components Thereof" Doc. No. 505434_828066_2, Mar. 8, 2013 (142 pages).
ITC Investigation No. 337-744, captioned: "Certain Mobile Devices, Associated Software, and Components Thereof" Doc. No. 507079_838104_1, Apr. 5, 2013 (2 pages).
ITC Investigation No. 337-744, captioned: "Certain Mobile Devices, Associated Software, and Components Thereof" Doc. No. 508408_840335_1, Apr. 30, 2013 (3 pages).
ITC Investigation No. 337-744, captioned: "Certain Mobile Devices, Associated Software, and Components Thereof" Doc. No. 508522_840479_1, May 1, 2013 (3 pages).
ITC Investigation No. 337-744, captioned: "Certain Mobile Devices, Associated Software, and Components Thereof" Doc. No. 509069_842167_1, May 13, 2013 (3 pages).

(56) References Cited

OTHER PUBLICATIONS

ITC Investigation No. 337-744, captioned: "Certain Mobile Devices, Associated Software, and Components Thereof" Doc. No. 509954_849809_1, May 28, 2013 (3 pages).
ITC Investigation No. 337-744, captioned: "Certain Mobile Devices, Associated Software, and Components Thereof" Doc. No. 510948_851243_1, Jun. 10, 2013 (3 pages).
ITC Investigation No. 337-744, captioned: "Certain Mobile Devices, Associated Software, and Components Thereof" Doc. No. 510950_851245_1, Jun. 10, 2013 (3 pages).
ITC Investigation No. 337-744, captioned: "Certain Mobile Devices, Associated Software, and Components Thereof" Doc. No. 513896_860777_1, Jul. 18, 2013 (3 pages).
ITC Investigation No. 337-744, captioned: "Certain Mobile Devices, Associated Software, and Components Thereof" Doc. No. 513940_860844_1, Jul. 18, 2013 (2 pages).
Office Action mailed Jul. 2, 2013, in CN Appl. No. 201110222798.0, with translation; 15 pgs.
European Application 04023852.9, Communication mailed Apr. 25, 2008, 6 pages.
European Application 04023852.9, Communication mailed Jun. 29, 2010, 7 pages.
European Application 04023852.9, Communication Search Report mailed Jul. 25, 2007, 5 pages.
Gamma, Design Patterns, 2000, Addison-Weslty, XP002441855, pp. 293-304.
European Application 04023852.9, Summons to Attend Oral Proceedings mailed Aug. 9, 2011, 10 pages.
European Application 04023852.9, Decision to Refuese a European Patent Application mailed Dec. 6, 2011, 53 pages.
European Application 04023852.9, Commencement of Proceedings before the Board of Appeal mailed Apr. 30, 2012, 3 pages.
Japanese Application 2004-310058, Notice of Rejection mailed Dec. 15, 2009, 6 pages.
Japanese Application 2004-310058, Notice of Rejection Final mailed Dec. 14, 2010, 4 pages.
Japanese Application 2004-310058, Notice of Allowance mailed Jul. 1, 2011, 6 pages.
China Application 200410087701.x, Notice on First Office Action mailed Dec. 19, 2008, 15 pages.
China Application 200410087701.x, The Second Office Action mailed Mar. 2, 2010, 10 pages.
China Application 200410087701.x, Notice on Grant of Patent Right for Invention mailed Jun. 24, 2011, 4 pages.
China Application 201110222798.0, Notice on the First Office Action mailed Jul. 2, 2013, 15 pages.
ITC Investigation No. 337-744, captioned: "Certain Mobile Devices, Associated Software, and Components Thereof" Doc. No. 476085_731229_1 "Microsoft's Response to Public Interest Statement of Non-Party Google, Inc." Mar. 27, 2012.
ITC Investigation No. 337-744, captioned: "Certain Mobile Devices, Associated Software, and Components Thereof" Doc. No. 583604-434802_11 "Exhibit 11", Oct. 4, 2010, 30 pages.
ITC Investigation No. 337-744, captioned: "Certain Mobile Devices, Associated Software, and Components Thereof" Doc. No. 583607-434802_14 "Exhibit 15", Oct. 4, 2010, 23 pages.
ITC Investigation No. 337-744, captioned: "Certain Mobile Devices, Associated Software, and Components Thereof" Doc. No. 583610-434802_17 "Exhibit 19", Oct. 4, 2010, 18 pages.
ITC Investigation No. 337-744, captioned: "Certain Mobile Devices, Associated Software, and Components Thereof" Doc. No. 583614-434802_20 "Exhibit 23", Oct. 4, 2010, 22 pages.
ITC Investigation No. 337-744, captioned: "Certain Mobile Devices, Associated Software, and Components Thereof" Doc. No. 583617-434802_23 "Exhibit 27", Oct. 4, 2010, 10 pages.
ITC Investigation No. 337-744, captioned: "Certain Mobile Devices, Associated Software, and Components Thereof" Doc. No. 583620-434802_5 "Exhibit 3", Oct. 4, 2010, 26 pages.
ITC Investigation No. 337-744, captioned: "Certain Mobile Devices, Associated Software, and Components Thereof" Doc. No. 583621-434802_26 "Exhibit 31", Oct. 4, 2010, 23 pages.
ITC Investigation No. 337-744, captioned: "Certain Mobile Devices, Associated Software, and Components Thereof" Doc. No. 583624-434802_29 "Exhibit 35", Oct. 4, 2010, 38 pages.
ITC Investigation No. 337-744, captioned: "Certain Mobile Devices, Associated Software, and Components Thereof" Doc. No. 583627-434802_6 "Exhibit 4", Oct. 4, 2010, 28 pages.
ITC Investigation No. 337-744, captioned: "Certain Mobile Devices, Associated Software, and Components Thereof" Doc. No. 609647-445051_3 "Exhibit 101", Feb. 24, 2011, 23 pages.
ITC Investigation No. 337-744, captioned: "Certain Mobile Devices, Associated Software, and Components Thereof" Doc. No. 609651-445051_7 "Exhibit 201", Feb. 24, 2011, 25 pages.
ITC Investigation No. 337-744, captioned: "Certain Mobile Devices, Associated Software, and Components Thereof" Doc. No. 609652-445051_8 "Exhibit 301", Feb. 24, 2011, 27 pages.
ITC Investigation No. 337-744, captioned: "Certain Mobile Devices, Associated Software, and Components Thereof" Doc. No. 609656-445051_11 "Exhibit 401", Feb. 24, 2011, 23 pages.
ITC Investigation No. 337-744, captioned: "Certain Mobile Devices, Associated Software, and Components Thereof" Doc. No. 609658-445051_13 "Exhibit 402 pt2", Feb. 24, 2011, 360 pages.
ITC Investigation No. 337-744, captioned: "Certain Mobile Devices, Associated Software, and Components Thereof" Doc. No. 609659-445051_14 "Exhibit 501", Feb. 24, 2011, 18 pages.
ITC Investigation No. 337-744, captioned: "Certain Mobile Devices, Associated Software, and Components Thereof" Doc. No. 609660-445051_15 "Exhibit 502", Feb. 24, 2011, 139 pages.
ITC Investigation No. 337-744, captioned: "Certain Mobile Devices, Associated Software, and Components Thereof" Doc. No. 609664-445051_19 "Exhibit 601", Feb. 24, 2011, 51 pages.
ITC Investigation No. 337-744, captioned: "Certain Mobile Devices, Associated Software, and Components Thereof" Doc. No. 609665-445051_30 "Exhibit 901", Feb. 24, 2011, 38 pages.
ITC Investigation No. 337-744, captioned: "Certain Mobile Devices, Associated Software, and Components Thereof" Doc. No. 609667-445051_21 "Exhibit 701", Feb. 24, 2011, 22 pages.
ITC Investigation No. 337-744, captioned: "Certain Mobile Devices, Associated Software, and Components Thereof" Doc. No. 609668-445051_22 "Exhibit 702 pt1", Feb. 24, 2011, 246 pages.
ITC Investigation No. 337-744, captioned: "Certain Mobile Devices, Associated Software, and Components Thereof" Doc. No. 609669-445051_23 "Exhibit 702 pt2", Feb. 24, 2011, 245 pages.
ITC Investigation No. 337-744, captioned: "Certain Mobile Devices, Associated Software, and Components Thereof" Doc. No. 609671-445051_25 "Exhibit 801", Feb. 24, 2011, 23 pages.
ITC Investigation No. 337-744, captioned: "Certain Mobile Devices, Associated Software, and Components Thereof" Doc. No. 611084-445200_25 "611084", Feb. 25, 2011, 23 pages.
ITC Investigation No. 337-744, captioned: "Certain Mobile Devices, Associated Software, and Components Thereof" Doc. No. 611085-445200_26 "611085", Feb. 25, 2011, 25 pages.
ITC Investigation No. 337-744, captioned: "Certain Mobile Devices, Associated Software, and Components Thereof" Doc. No. 611086-445200_27 "611086", Feb. 25, 2011, 19 pages.
ITC Investigation No. 337-744, captioned: "Certain Mobile Devices, Associated Software, and Components Thereof" Doc. No. 611087-445200_28 "611087", Feb. 25, 2011, 36 pages.
ITC Investigation No. 337-744, captioned: "Certain Mobile Devices, Associated Software, and Components Thereof" Doc. No. 611088-445200_29 "611088", Feb. 25, 2011, 21 pages.
ITC Investigation No. 337-744, captioned: "Certain Mobile Devices, Associated Software, and Components Thereof" Doc. No. 611089-445200_30 "611089", Feb. 25, 2011, 27 pages.
ITC Investigation No. 337-744, captioned: "Certain Mobile Devices, Associated Software, and Components Thereof" Doc. No. 611090-445200_31 "611090", Feb. 25, 2011, 20 pages.

(56) References Cited

OTHER PUBLICATIONS

ITC Investigation No. 337-744, captioned: "Certain Mobile Devices, Associated Software, and Components Thereof" Doc. No. 611091-445200_32 "611091", Feb. 25, 2011, 15 pages.

ITC Investigation No. 337-744, captioned: "Certain Mobile Devices, Associated Software, and Components Thereof" Doc. No. 611092-445200_33 "611092", Feb. 25, 2011, 48 pages.

ITC Investigation No. 337-744, captioned: "Certain Mobile Devices, Associated Software, and Components Thereof" Doc. No. 611106-445200_47 "611106", Feb. 25, 2011, 18 pages.

ITC Investigation No. 337-744, captioned: "Certain Mobile Devices, Associated Software, and Components Thereof" Doc. No. 611107-445200_48 "611107", Feb. 25, 2011, 43 pages.

ITC Investigation No. 337-744, captioned: "Certain Mobile Devices, Associated Software, and Components Thereof" Doc. No. 611582-445623_8 "Exhibit 705", Mar. 3, 2011, 9 pages.

ITC Investigation No. 337-744, captioned: "Certain Mobile Devices, Associated Software, and Components Thereof" Doc. No. 611595-445626_2 "611595", Mar. 3, 2011, 23 pages.

ITC Investigation No. 337-744, captioned: "Certain Mobile Devices, Associated Software, and Components Thereof" Doc. No. 611596-445626_3 "611596", Mar. 3, 2011, 25 pages.

ITC Investigation No. 337-744, captioned: "Certain Mobile Devices, Associated Software, and Components Thereof" Doc. No. 611597-445626_4 "611597", Mar. 3, 2011, 19 pages.

ITC Investigation No. 337-744, captioned: "Certain Mobile Devices, Associated Software, and Components Thereof" Doc. No. 611598-445626_5 "611598", Mar. 3, 2011, 36 pages.

ITC Investigation No. 337-744, captioned: "Certain Mobile Devices, Associated Software, and Components Thereof" Doc. No. 611599-445626_6 "611599", Mar. 3, 2011, 21 pages.

ITC Investigation No. 337-744, captioned: "Certain Mobile Devices, Associated Software, and Components Thereof" Doc. No. 611600-445626_7 "611600", Mar. 3, 2011, 27 pages.

ITC Investigation No. 337-744, captioned: "Certain Mobile Devices, Associated Software, and Components Thereof" Doc. No. 611601-445626_8 "611601", Mar. 3, 2011, 20 pages.

ITC Investigation No. 337-744, captioned: "Certain Mobile Devices, Associated Software, and Components Thereof" Doc. No. 611602-445626_9 "611602", Mar. 3, 2011, 15 pages.

ITC Investigation No. 337-744, captioned: "Certain Mobile Devices, Associated Software, and Components Thereof" Doc. No. 611603-445626_10 "611603", Mar. 3, 2011, 48 pages.

ITC Investigation No. 337-744, captioned: "Certain Mobile Devices, Associated Software, and Components Thereof" Doc. No. 611617-445626_24 "611617", Mar. 3, 2011, 43 pages.

ITC Investigation No. 337-744, captioned: "Certain Mobile Devices, Associated Software, and Components Thereof" Doc. No. 611618-445626_25 "611618", Mar. 3, 2011, 18 pages.

ITC Investigation No. 337-744, captioned: "Certain Mobile Devices, Associated Software, and Components Thereof" Doc. No. 626074-450925_1 "450925", May 17, 2011.

ITC Investigation No. 337-744, captioned: "Certain Mobile Devices, Associated Software, and Components Thereof" Doc. No. 655427-457422_1 "655427", Aug. 22, 2011.

ITC Investigation No. 337-744, captioned: "Certain Mobile Devices, Associated Software, and Components Thereof" Doc. No. 655428-457423_"655428", Aug. 22, 2011.

ITC Investigation No. 337-744, captioned: "Certain Mobile Devices, Associated Software, and Components Thereof" Doc. No. 655660-457613_1 "655660", Aug. 24, 2011.

ITC Investigation No. 337-744, captioned: "Certain Mobile Devices, Associated Software, and Components Thereof" Docket Report retrieved Sep. 1, 2011.

ITC Investigation No. 337-744, captioned: "Certain Mobile Devices, Associated Software, and Components Thereof" Docket Report retrieved Nov. 4, 2013.

ITC Investigation No. 337-744, captioned: "Certain Mobile Devices, Associated Software, and Components Thereof" Doc. No. 872165-518592_1 "518592", Sep. 19, 2013 (3 pages).

"Second Office Action Issued in Chinese Patent Application No. 201110222798.0", Mailed Date: Jan. 24, 2014, Filed Date: Oct. 22, 2004, 9 Pages.

Notice of Allowance Issued in Chinese Patent Application No. 201110222798.0, Mailed date: Aug. 1, 2014, 6 Pages.

ITC Investigation No. 337-744, captioned: "Certain Mobile Devices, Associated Software, and Components Thereof" Docket Report retrieved Jul. 14, 2014.

ITC Investigation No. 377-744, captioned: "Certain Mobile Devices, Associated Software, and Components Thereof" Doc. No. 530132-907407_ "907407", Mar. 19, 2014.

ITC Investigation No. 377-744, captioned: "Certain Mobile Devices, Associated Software, and Components Thereof" Doc. No. 531057-910294_ "910294", Apr. 3, 2014.

ITC Investigation No. 377-744, captioned: "Certain Mobile Devices, Associated Software, and Components Thereof" Doc. No. 531103-910345_ "910345", Apr. 3, 2014.

ITC Investigation No. 377-744, captioned: "Certain Mobile Devices, Associated Software, and Components Thereof" Doc. No. 531141-910505_ "910505", Apr. 4, 2014.

ITC Investigation No. 377-744, captioned: "Certain Mobile Devices, Associated Software, and Components Thereof" Doc. No. 531468-910957_ "910957", Apr. 9, 2014.

ITC Investigation No. 377-744, captioned: "Certain Mobile Devices, Associated Software, and Components Thereof" Doc. No. 531919-911772_ "911772", Apr. 15, 2014.

ITC Investigation No. 377-744, captioned: "Certain Mobile Devices, Associated Software, and Components Thereof" Doc. No.532361-912722_ "912722", Apr. 21, 2014.

ITC Investigation No. 377-744, captioned: "Certain Mobile Devices, Associated Software, and Components Thereof" Doc. No. 532362-912725_ "912725", Apr. 21, 2014.

ITC Investigation No. 377-744, captioned: "Certain Mobile Devices, Associated Software, and Components Thereof" Doc. No. 532824-915990_ "915990", Apr. 29, 2014.

ITC Investigation No. 377-744, captioned: "Certain Mobile Devices, Associated Software, and Components Thereof" Doc. No. 532909-916227_ "916227", Apr. 30, 2014.

ITC Investigation No. 377-744, captioned: "Certain Mobile Devices, Associated Software, and Components Thereof" Doc. No. 533183-916956_ "916956", May 5, 2014.

ITC Investigation No. 377-744, captioned: "Certain Mobile Devices, Associated Software, and Components Thereof" Doc. No. 533639-919787_ "919787", May 12, 2014.

ITC Investigation No. 337-744, captioned: "Certain Mobile Devices, Associated Software, and Components Thereof" Doc. No. 536016-934991_ "934991", Jun. 17, 2014.

ITC Investigation No. 337-744, captioned: "Certain Mobile Devices, Associated Software, and Components Thereof" Doc. No. 536017-934994_ "934994", Jun. 17, 2014.

ITC Investigation No. 337-744, captioned: "Certain Mobile Devices, Associated Software, and Components Thereof" Doc. No. 536018-934997_ "934997", Jun. 17, 2014.

ITC Investigation No. 337-744, captioned: "Certain Mobile Devices, Associated Software, and Components Thereof" Doc. No. 536102-935206_ "935206", Jun. 18, 2014.

ITC Investigation No. 337-744, captioned: "Certain Mobile Devices, Associated Software, and Components Thereof" Doc. No. 536147-935173_ "935173", Jun. 18, 2014.

ITC Investigation No. 337-744, captioned: "Certain Mobile Devices, Associated Software, and Components Thereof" Docket Report retrieved Nov. 4, 2014.

ITC Investigation No. 337-744, captioned: "Certain Mobile Devices, Associated Software, and Components Thereof" Doc. No. 544241-957405_ "957405", Oct. 15, 2014.

ITC Investigation No. 337-744, captioned: "Certain Mobile Devices, Associated Software, and Components Thereof" Doc. No. 544300-957405_ "958091", Oct. 16, 2014.

(56) References Cited

OTHER PUBLICATIONS

India Application No. 1980/DEL/2004, First Examination Report mailed Oct. 21, 2014, 2 pages.

ITC Investigation No. 337-744, captioned: "Certain Mobile Devices, Associated Software, and Components Thereof" Doc. No. 965692-546521_ "546521", Nov. 20, 2014.

ITC Investigation No. 337-744, captioned: "Certain Mobile Devices, Associated Software, and Components Thereof" Doc. No. 974921-547238_ "547238", Dec. 3, 2014.

ITC Investigation No. 337-744, captioned: "Certain Mobile Devices, Associated Software, and Components Thereof" Docket Report retrieved Jan. 9, 2015.

* cited by examiner

FLEXIBLE ARCHITECTURE FOR NOTIFYING APPLICATIONS OF STATE CHANGES

RELATED APPLICATIONS

This application is a continuation of and claims priority to application Ser. No. 10/873,881, filed Jun. 22, 2004, entitled FLEXIBLE ARCHITECTURE FOR NOTIFYING APPLICATIONS OF STATE CHANGES, granted as U.S. Pat. No. 7,644,376, on Jan. 5, 2010, which claims benefit of priority under 35 U.S.C. §119(e) of U.S. Provisional Application No. 60/513,723, filed Oct. 23, 2003.

BACKGROUND OF THE INVENTION

Today, mobile devices are designed to run a variety of applications and keep a user updated with current information. Some of these devices include personal digital assistants, wireless phones, and email devices. Mobile devices are now capable of connecting to the Internet and other networks thorough various means and thus exchange information over the networks. These mobile devices may update applications and send and receive information, such as emails, attachments to emails, and web page content. Providing all of this functionality requires applications on the mobile device to be notified of various events, such as when a new email is available, when a screen of the device is activated, when a phone call is received, and the like. It is difficult, however, to access all of the different state changes associated with the device.

SUMMARY OF THE INVENTION

Briefly described, the present invention is directed at unifying state and notification architecture across devices.

According to one aspect of the invention, clients register with a notification broker to receive notifications for changes to state properties. When a registered state property changes, a notification broker determines which clients to notify of the state change and provides the client with a notification regarding the change. For example, a client may register to receive notifications regarding changes to battery strength, network connectivity, memory usage, and the like. Whenever one of these registered state properties changes, the notification broker sends the client a notification message.

According to another aspect of the invention, clients may be notified whenever a state changes, when a state change meets a predetermined condition, or based on a schedule.

According to yet another aspect of the invention, an application may be launched in response to a state change or a schedule. For example, a client may register to have an application started when a certain event occurs, such as the mobile device receiving a message directed toward the application to be launched. The application may also be started based on a schedule configured by the client.

According to yet another aspect of the invention, an application programming interface (API) is provided that is directed to providing a unified way of accessing state change information across different components within the device. For example, an application may use the same function call to access state properties set by different components within the device.

According to still yet another aspect of the invention, the registered state properties may persist across device reboots.

DETAILED DESCRIPTION OF THE PREFERRED EMBODIMENT

Briefly described, the present invention is directed to providing a method and system a unified mechanism for storing device, application, and service state, as well as a rich notification brokerage architecture. Generally, clients register with a notification broker to receive notifications when certain state properties change. When a registered state property changes, the notification broker determines which clients to notify of the state change and provides the client with a notification regarding the change. Clients may be notified whenever a state changes, when a state change meets a predetermined condition, or based on a schedule. An application may also be launched in response to a state change or a schedule. An application programming interface (API) is also provided that is directed at providing a unified way of accessing state change information across different components within the device.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on."

The term "state property" refers to a "status" variable registered and stored with the notification system for maintenance and change-notifications.

The term "notification request" refers to a request from a client to be notified of a state change.

The term "notification list" refers to a collection of clients which have registered for state property change notifications.

The term "notification broker" refers to an underlying driver responsible for adding, updating, and removing data from a data store.

The term "state change component" refers to any component which adds, updates, or generally maintains State Properties in the data store.

The term "client" refers to any component which registers for state property change notifications. A client may be a state change component as well as a state change component being a client.

The term "state property identifier" refers to a "friendly" string (name) representation of the State Property. This identifier may be hierarchical and is unique.

The term "conditional notification" refers to a notification that is sent when a state property changes and the new value of the state property meets the condition that was specified in the notification request.

Illustrative Operating Environment

Figure 1:
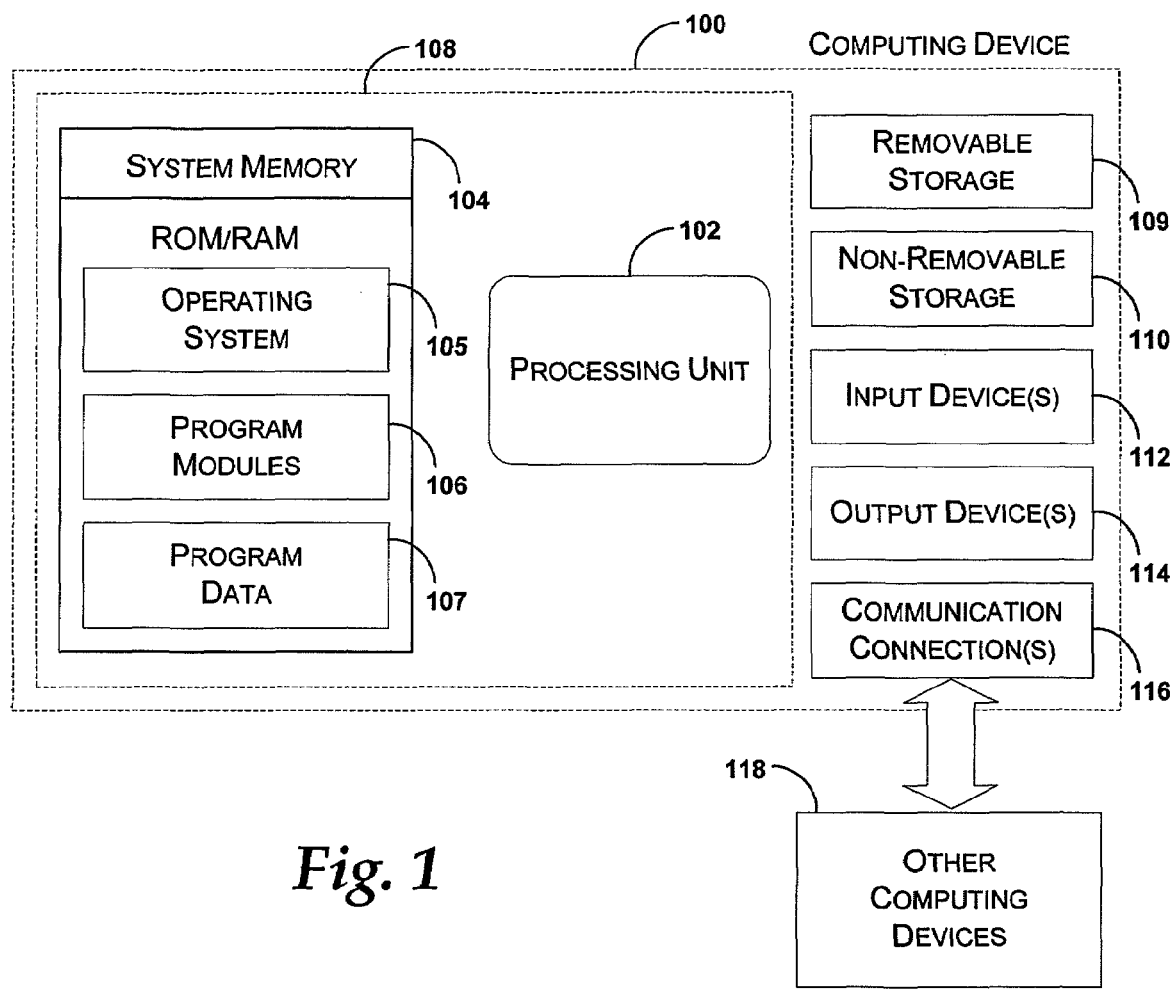
FIG. 1 illustrates an exemplary computing device.

With reference to FIG. 1, an exemplary system for implementing the invention includes a computing device, such as computing device 100. Computing device 100 may be configured as a client or a server. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two.

System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
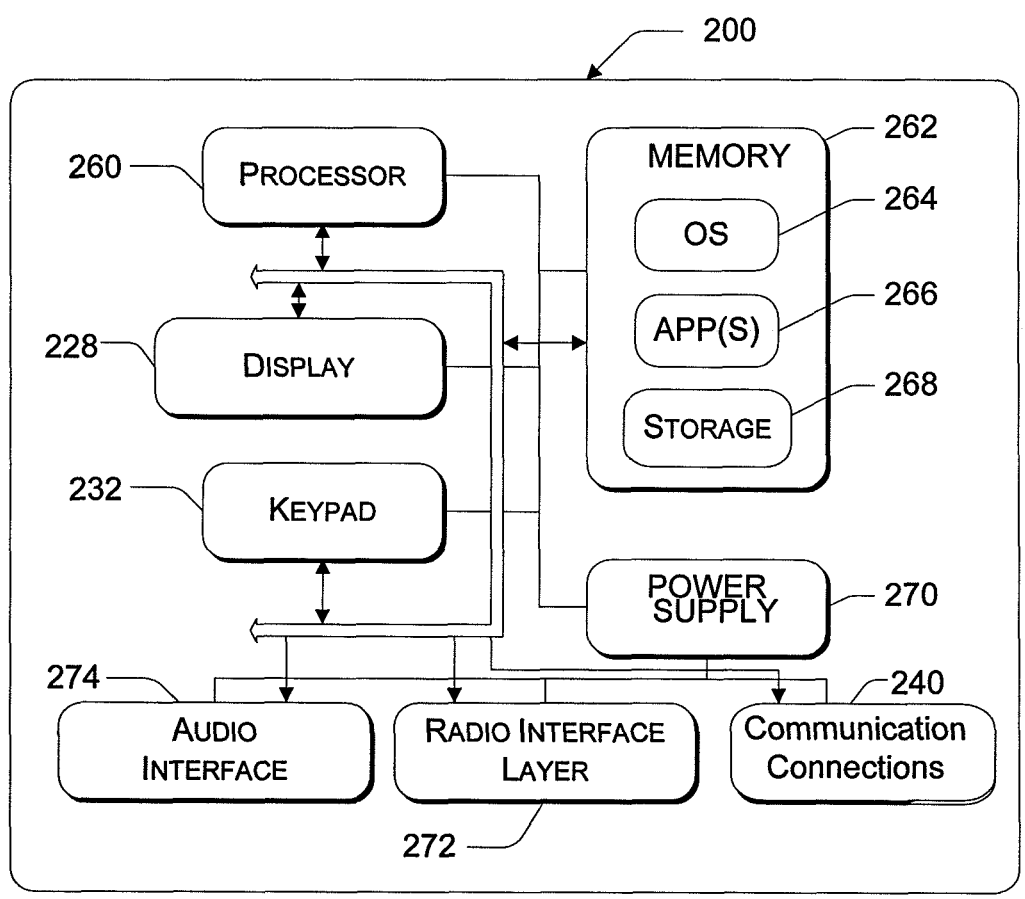
FIG. 2 shows an exemplary mobile device.

With reference to FIG. 2, one exemplary system for implementing the invention includes a mobile device, such as mobile device 200. The mobile device 200 has a processor 260, a memory 262, a display 228, and a keypad 232. The memory 262 generally includes both volatile memory (e.g., RAM) and non-volatile memory (e.g., ROM, Flash Memory, or the like). The mobile device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile devices. The display 228 may be touch-sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. Application programs 266 may use a common API to perform actions on state properties associated with the device. For example, a phone dialer program may register with a notification system to receive notifications regarding changes to signal strength, phone state, battery strength, and the like. The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing program, and the like.

The mobile computing device 200 has a power supply 270, which may be implemented as one or more batteries. The power supply 270 might further include an external power source, such as an AC adapter or a powered docking cradle that supplements or recharges the batteries.

The mobile computing device 200 may also include external notification mechanisms, such as an LED (not shown) and an audio interface 274. These devices may be directly coupled to the power supply 270 so that when activated, they remain on for a duration dictated by the notification mechanism even though the processor 260 and other components might shut down to conserve battery power. The audio interface 274 is used to provide audible signals to and receive audible signals from the user. For example, the audio interface 274 may be coupled to a speaker for providing audible output and to a microphone for receiving audible input, such as to facilitate a telephone conversation.

Mobile computing device 200 may also contain communication connections 240 that allow the device to communicate with other computing devices, such as over a wireless network. The mobile computing device 200 also includes a radio interface layer 272 that performs the function of transmitting and receiving radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 and communication connections 240 may be disseminated to application programs 266 via the operating system 264, and vice versa.

Illustrative State Change Notification System

Figure 3:
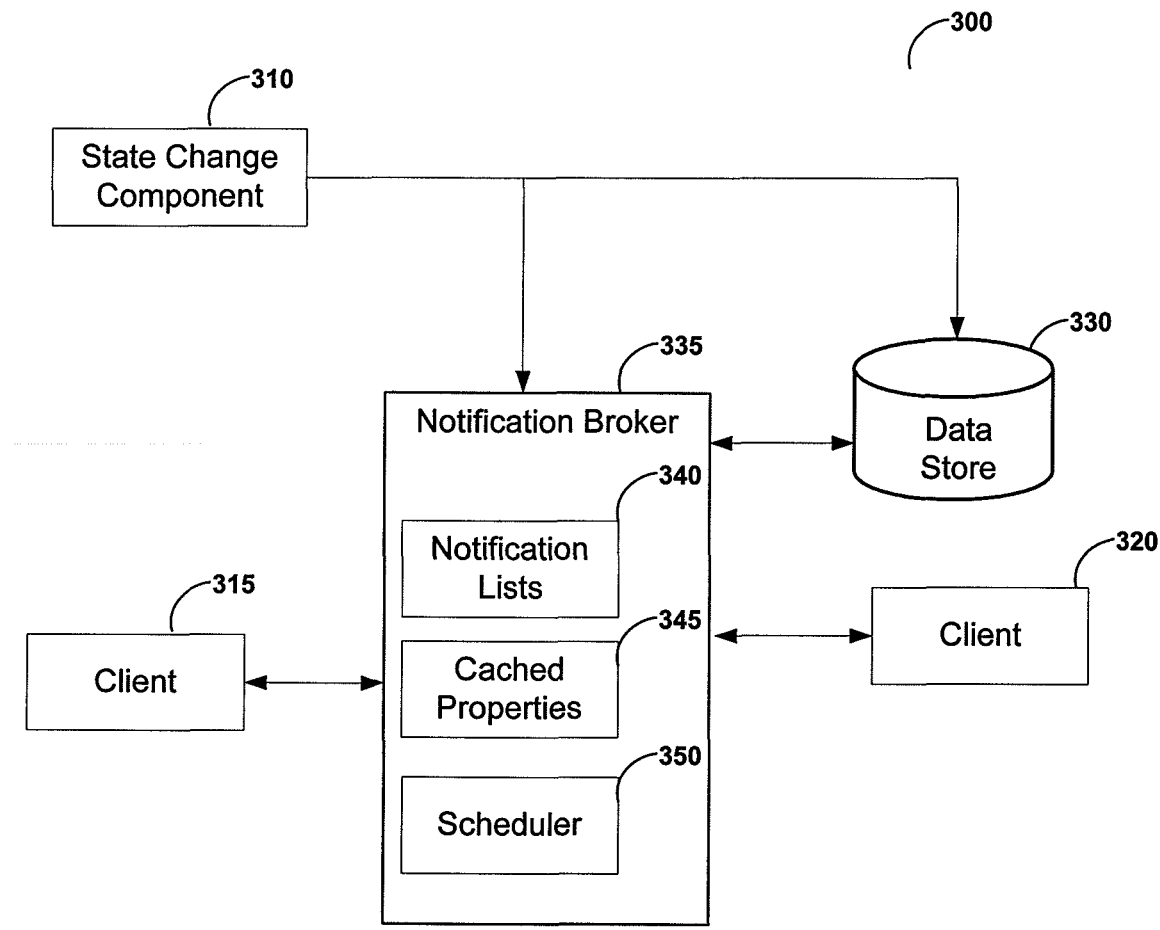
FIG. 3 illustrates an exemplary state management and notification system.

FIG. 3 illustrates an exemplary state management and notification system, in accordance with aspects of the invention. Notification system 300 includes state change component 310, clients 315 and 320, notification broker 335, and data store 330. According to one embodiment, notification broker 335 also maintains notification lists 340, cached properties 345 and scheduler 350.

Clients, such as client 315 or 320, register to receive notifications regarding changes to a state property with notification broker 335. Generally, a client may make a notification request with notification broker 335 that registers the client to receive notifications whenever a state property changes, when the change meets a conditional, or based upon a schedule. The notifications may be permanent or transient notifications.

Permanent notifications are kept in a data store (320). According to one embodiment, the permanent notifications are maintained in a back-end data store, such as the registry, and hence are "persisted" across reboots. As these notifications are persisted, these types of state properties have the same value before a soft-reset (or shutdown) as they do upon a restart (or boot). According to one embodiment, state properties are persistent by default.

Transient notifications are not permanent and are, therefore, not persisted across reboots. In other words, if a device is soft-reset (or rebooted) the notification request is deleted from notification list 340. In order to restore a transient notification, a client re-registers (sends another notification request to broker 335) to receive notifications regarding changes to the state property.

A client may also register to have an application launched upon the occurrence of a state change and/or according to a schedule. Generally, notification broker 335 issues a command to start an application specified by the client if the application is not already running when the state change or the scheduled time occurs. According to one embodiment, the client can specify command-line parameters to be passed into the application when it is launched. If the launched process creates a window then a message is sent to the window indicating the notification. If the target process is already running on the client, then the client simply receives the notification message.

Notifications sent to clients may also be batched. Batched state properties are intended for use by state properties which may undergo frequent value changes. A predetermined period of time is set that allows the state property value to "stabilize." According to one embodiment, the predetermined period is set to 200 ms. If no changes are made to the state property value during the predetermined period, the notification is delivered to the registered clients. The batching predetermined period is configurable and is stored in data store 330.

Data store 330 is configured to store registered state properties, as well as other information. According to one embodiment, data store 330 is the registry provided with an operating system, such as the registry provided with the Windows XP operating system provided by Microsoft Corporation. Data store 330 may also be any other type of data store in which information may be set and accessed. Data store 330 may also comprise one or more data stores maintained at various locations within notification system 300.

Data store 330 may also be pre-loaded with a default set of state property data that may be accessed by clients 315 and 320. Pre-loading the state property data makes many of state properties available without the client having to add a state property. For example, according to one embodiment, the following states are available to clients without registering the state: Display Orientation (Resolution, Brightness); Undismissed reminders (Count, Subject, Date, Time; Location); Undismissed alarms (Count, Description, Date, Time); Battery (% remaining, State); Backup battery (% remaining, State); Memory (Program memory free, Program memory used, Storage memory free, Storage memory used); Storage card (Total memory free, Total memory used); Hardware (Flip-phone state (open/closed), Keyboard enabled, Wifi enabled, Bluetooth enabled, Headphones present, Camera present); Messaging (Unread count, Total count, Drafts count, Outbox count); Tasks (High priority count, Due today count, Overdue count); Calendar (Next appointment, Name, Location, Date, Time, POOM ID); All day appointment (Name, Location, Date, Time, POOM ID); Current appointment (Name, Location, Date Time, POOM ID); Current free/busy status; Instant Messenger (Status, Online contacts count; Offline contacts count); Connectivity (Speed, Wifi, Access point, Signal strength, Connection name, Connects to (work, internet), Status); Media player (Status, Playlist (Name, Mode (repeat, shuffle), Track count, Total duration), Track (Type (audio, video), Name, Album, Artists, Track #, Genre, Year, Duration, Play position, Filename, Bit rate)); Sync status; Telephony (Operator, Signal strength, Phone state, Profile, Roaming, Radio state, Active call (Caller name, Caller number), Missed call count, SIM toolkit message. As can be seen, the states span across many different applications.

According to one embodiment, the state property data is organized into a hierarchy. The hierarchy allows a client to specify a group of state properties by referencing the parent. The state property may be set to a data type, such as string, integer, float, and the like.

The client may identify the state property by a "friendly" string (name) representation of the state property. For example, "battery\a" references the state property "a" under the parent "battery", and likewise there could be a "battery\b" which would be the state property "b" under the same parent. When referring to a group of state properties under a common parent, then the parent identifier may be used. For example to receive notifications based on changes to all of the battery states, then "battery" would be provided in the registration, thereby referencing all of the battery state properties using a single name.

Broker 335 may be configured to control access to setting/adjusting/removing state property types within data store 330. For example, a restriction could be placed on a state property limiting the deletion of the property from the notification system to a predetermined list of clients. When a state property is deleted, clients that have registered for notifications relating to the property are notified of its deletion.

As discussed above, clients 315 and 320 register for the state properties they are interested in receiving notifications about when the state property changes. Clients may register to receive a notification whenever the state they registered changes, when a conditional applied to the state value meets a condition, or upon a predetermined schedule. A conditional notification may be based upon many different conditions. According to one embodiment, the conditionals include: all, equal, not equal, greater than, greater or equal than, less than or equal, less than, contains, starts with, and ends with. For example, client 315 may register with notification broker 335 to receive a notification when the missed call count state property is Greater than fifteen and when the caller name Contains "Ja." Conditionals allow a client to receive the state change information they are interested in without having to process state change information they do not care about.

The clients registered to receive notifications regarding changes to state properties are maintained in notification lists 340. Notification broker 335 accesses notification lists 340 to determine the clients that should receive notifications when a registered state property has changed.

Scheduler 350 may be configured to notify and/or activate a client based on a schedule. The scheduled activation notification mode allows a client to receive a notification based on a simplified recurring schedule registered with notification broker 335. Schedules may be configured to occur at any interval, such as on the scale of seconds, minutes, hours, days, weeks, or months. According to one embodiment, schedules are defined by the date/time of the first occurrence and the amount of time between occurrences. Additionally, schedules may be defined without a recurrence interval. When no recurrence interval is provided, the notification is only sent once and then the registration is removed from the notifications list. Additionally, when a notification arrives, if the specified application path (provided during the notification request) cannot be found, the scheduled notification registration is removed from the notification list 340.

State change component 310 updates the value of the state property within data store 330 when the state changes. State change component 310 may update the state directly in data store 330 or through notification broker 335. When the state is updated through data store 330, data store 330 communicates the change to notification broker 335. When the state is updated through notification broker 335 then notification broker 335 updates the state in data store 330. In either case, notification broker 335 determines which clients should be notified based on the state change. Notification broker 335 parses notification lists 340 and determines the clients that have registered for notifications regarding the state change. Notification broker 335 applies any conditionals to the value of the state property that has changed and notifies the client when the conditional is met. When there is not a conditional associated with the state change, the client is notified of the state change.

When a client, such as client 315 and client 320, receives a notification from notification broker 335, the client may call a function within a common API (see discussion below) to retrieve the new state of the state property. Alternatively, the property information may be directly delivered to the client along with the notification. When the client is no longer interested in receiving notifications relating to a particular state property, the client may un-register itself from receiving change notifications relating to the state property. Clients 315 and 320 may also directly query broker 335 at any time to find the state of a state property using the common API.

State property values may also be cached by notification broker 335 in cached properties 345. A state property value may be cached for many different reasons. For example, a state property value may be cached such that a previous value of the state property may be compared with a current value of the state property. Additionally, the cache may help to facilitate quick repeated lookups requesting the value of the state property.

According to one embodiment, notification system 300 supports .NET (managed) clients for both additions to the store, as well as change notification registrations.

The following are some exemplary scenarios to further clarify state management notification system 300.

EXAMPLE 1

ISV Services

Norm the Newbie has built a C# application which keeps a complete database of the current season's Baseball statistics (e.g., teams, players, scores, stats, etc.). He has also built a simple XML web-services client which can connect to a sports website and pull-down updated daily statistics. Since the amount of data the application stores is relatively large, Norm only wants his application to sync data when a "fat pipe" (e.g., 802.1x) is available on the device (e.g., PPC). Norm then registers his application by sending a notification request to notification broker 335 for notifications when a high-bandwidth connection is available. Norm additionally specifies in the notification request to launch his application when the high-bandwidth connection is available. When the state change component associated with the connection updates the state of the connection, notification broker 335 activates Norm's app when the state indicates that it is a high-speed connection.

EXAMPLE 2

Corporate LOB (Line of Business) Applications

Elph the Enterprise developer has built a field-service form-based VB.Net application for insurance adjuster usage. The application allows an insurance adjuster to look-up part #s and costs, make notes, retrieve car schematics, and the like. Each day, the insurance adjuster takes his mobile computing device out in the field to service customers. The application persists all of its data for today's operation locally in a data store. Elph would like the application to synchronize the offline store with the company's main servers each time the device is cradled. Therefore, Elph registers his application for notifications on synchronization cradle events. Whenever the device is cradled, the application is notified and the application synchronizes its data.

EXAMPLE 3

Phone Game

Golem the phone game developer is building a next-generation multi-player RPG for a phone. He anticipates the game will be so very popular that it will last for weeks and months at a time. One of Golem's key concerns is the persistence of game state without user intervention. One of the game's neat features is the ability to save current state right before the phone runs out of batteries and ensure the user never loses any data. Golem registers his application to receive low battery notifications to ensure that the game information will be saved before the device runs out of batteries.

EXAMPLE 4

Device Management Client

Eric the emerging Enterprise Management Client developer is looking to create the next generation mobile computing device and phone management client; able to handle client updates, virus scanning, policy enforcement, and more. Using C# he has built a power device-side client which can handle requests based on server-driven commands. Each night at 3 am, Eric would like his application "woken up" so he can contact the server for updated policies, virus scanner signatures, and the like. In order to achieve this, he simply registers his application with notification broker 335 for a scheduled notification (each day at 3 am). Eric is now assured his app will run at the specified time.

Figure 4:
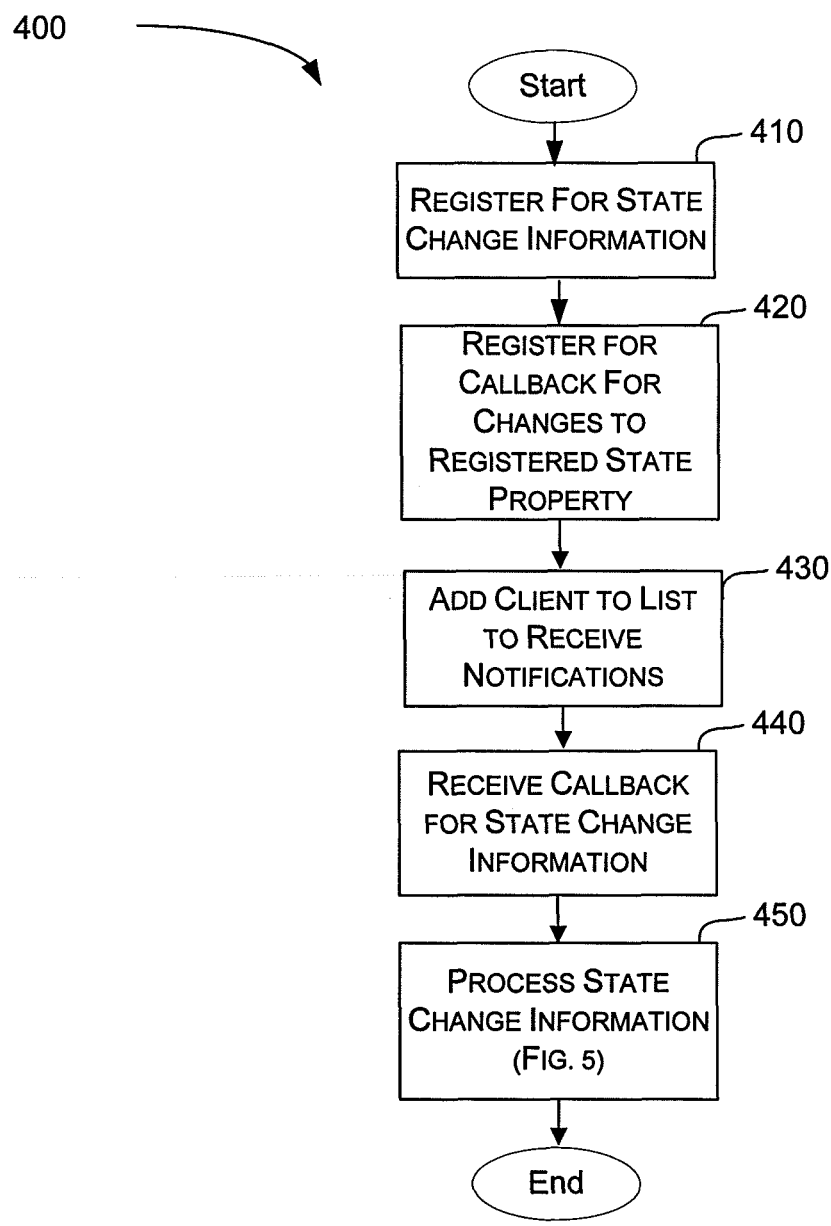
FIG. 4 illustrates a process for a state change notification system.

FIG. 4 illustrates a process for a state change notification system, in accordance with aspects of the invention. After a start block, process 400 flows to block 410, where a client registers to be notified of changes to at least one state property. If the state property is not already being monitored by another client, the state property is added to the list of available state properties. As discussed above, a list of available properties is pre-loaded into the notification system. The client may register to receive notification on all changes made to the property, changes that meet a condition, as well being notified according to a schedule.

Moving to block 420, a callback is registered with the notification system such that when a change is made to a registered state property, the notification system is made aware of the change. According to one embodiment, a notification broker registers a callback with the operating system registry for changes made to the state property value.

Flowing to block, 430, the client is added to a notification list to receive notification messages relating to the state property. Clients included in the notification list receive notifications regarding changes to the registered state property.

Transitioning to block 440, a callback is received when a change is made to any of the registered state properties. According to one embodiment, the callback includes an identifier identifying the state property changes, as well as the current value of the state property.

Moving to block 450, the state change information is processed. Generally, processing the state change information includes determining if any conditionals, schedules, batches, or application launching conditions, apply to each of the registered clients for the changed state property (See FIG. 5 and related discussion).

Figure 5:
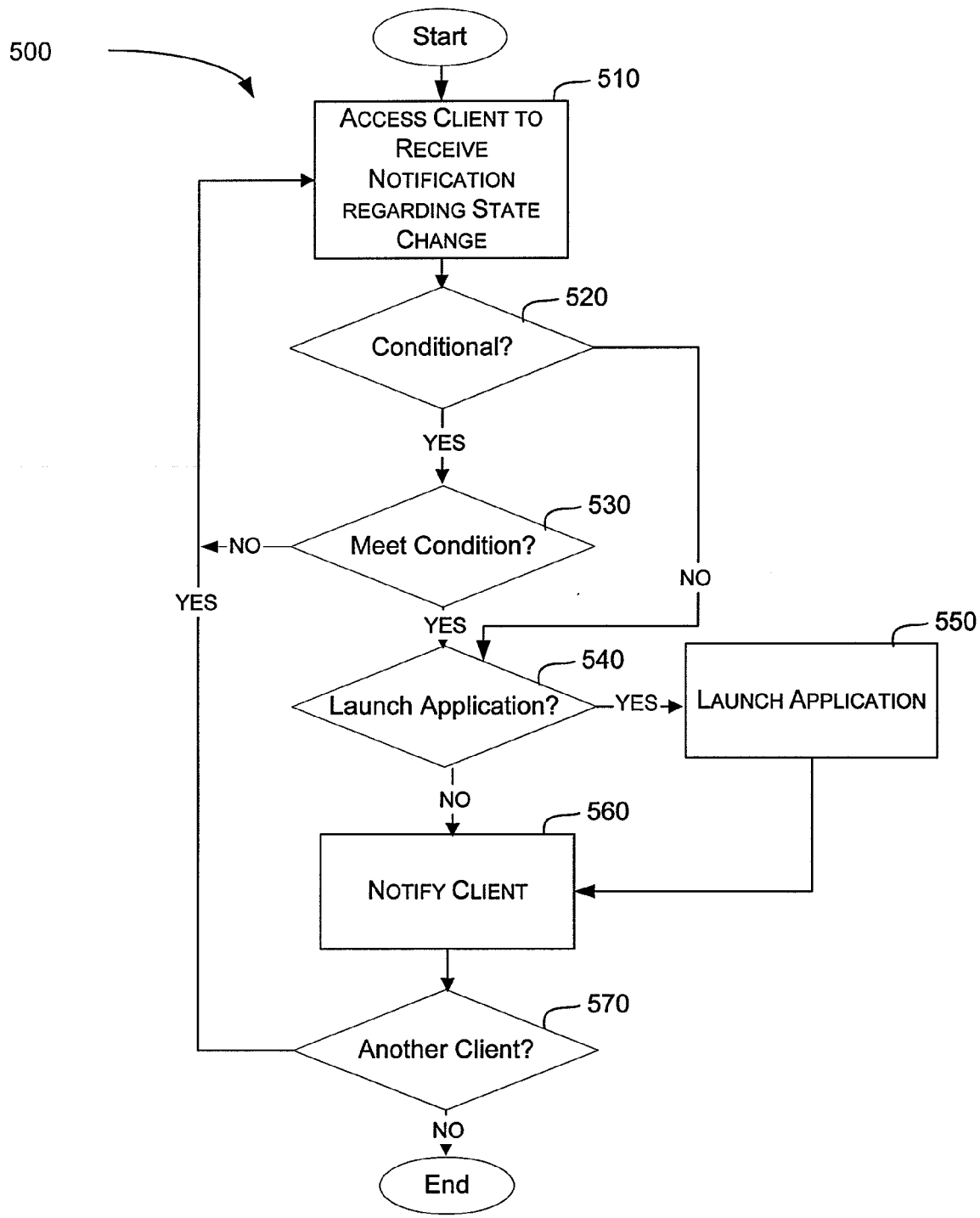
FIG. 5 shows a process for processing state change information, in accordance with aspects of the invention.

FIG. 5 shows a process for processing state change information, in accordance with aspects of the invention. After a start block, process 500 flows to block 510 where a client registered for receiving notifications regarding a state change for the changed state property is accessed. According to one embodiment, a notification list is accessed to determine the registered clients for the state property that has changed.

Moving to decision block 520, a determination is made as to whether the client has specified any conditionals that are to be applied to the state property before notifying the client.

When a conditional expression is associated with the notification request, the process flows to decision block 530 where a determination is made as to whether the condition is met. When the condition is met, or when the client has not specified any conditionals, the process moves to decision block 540, where a determination is made as to whether the client has specified to launch an application in response to a change to the state property. When the client has specified to launch the application, the process moves to block 550 where the application is launched if it is not already running. When the client has not specified to launch the application, or the application has been launched at block 550, the process moves to block 560 where the client is notified of the state change.

The process then flows to decision block 570, where a determination is made as to whether there are more clients registered to receive a notification regarding a change to the state property. When there is another client, the process returns to block 510. When there are no other clients, the process then moves to an end block and returns to processing other actions.

State Property Types and Modes

According to one embodiment of the invention, two APIs may be used to access the state information in the notification system. A native, or underlying API is provided and a managed API is provided to clients. The managed API accesses the native API to perform its operations.

The following is an exemplary native API, in accordance with aspects of the invention:

```
#define E_ALREADY_REGISTERED      ERROR_ALREADY_REGISTERED
#define E_DATATYPE_MISMATCH       ERROR_DATATYPE_MISMATCH
#define E_INSUFFICIENT_BUFFER     ERROR_INSUFFICIENT_BUFFER
#define E_INVALID_HANDLE          ERROR_INVALID_HANDLE
#define E_NOT_FOUND               ERROR_NOT_FOUND
define E_NOT_READY               ERROR_NOT_READY DECLARE_HANDLE(HREGNOTIFY); // transient notification handle // ***************************************************************
// Enumeration Name: REG_COMPARISONTYPE // Purpose: used to define how state property values should be compared to
```

```
//      target values for conditional change notifications. When executing
//      the REG_COMPARISONTYPE, the changed value is used as the
//      l-value, that is, REG_CT_LESS would mean fire the notification if
//      the changed value is less than the target value.
//
// Description:
//   the following shows what statements will be true when the comparison is
//   done. A case insensitive CompareString is
//   used to compare the strings, the following information is used to clarify
//   the intent of the REG_COMPARISONTYPE values.
//   Let "cv" represent the changed value and "psz" or "dw" represent the
//   TargetValue specified in the NOTIFICATIONCONDITION structure. Let "l"
//   represent the length of the string specified in psz (wcslen(psz)) and
//   "cvl" represents the string length of the changed value (wcslen(cv)).
//                                    REG_SZ                      REG_DWORD
//  REG_CT_EQUAL               | (0 == strcmp(cv, psz))       | (cv == dw) |
//  REG_CT_NOT_EQUAL           | (0 != strcmp(cv, psz))       | (cv != dw) |
//  REG_CT_GREATER             | (0 <  strcmp(cv, psz))       | (cv >  dw) |
//  REG_CT_GREATER_OR_EQUAL    | (0 <= strcmp(cv, psz))       | (cv >= dw) |
//  REG_CT_LESS                | (0 >  strcmp(cv, psz))       | (cv <  dw) |
//  REG_CT_LESS_OR_EQUAL       | (0 >= strcmp(cv, psz))       | (cv <= dw) |
//  REG_CT_CONTAINS            | (0 != strstr(cv, psz))       |    N/A     |
//  REG_CT_STARTS_WITH         | (0 == strncmp(cv, psz, l))   |    N/A     |
//  REG_CT_ENDS_WITH           | (0 == strcmp(cv+cvl-l, psz)) |    N/A     |
// *********************************************
typedef enum tagREG_COMPARISONTYPE
{
  REG_CT_EQUAL,
  REG_CT_NOT_EQUAL,
  REG_CT_GREATER,
```

```
        REG_CT_GREATER_OR_EQUAL,
        REG_CT_LESS,
        REG_CT_LESS_OR_EQUAL,
        REG_CT_CONTAINS,
        REG_CT_STARTS_WITH,
        REG_CT_ENDS_WITH
} REG_COMPARISONTYPE;

// ***********************************************************
// Structure Name: NOTIFICATIONCONDITION
//
// Purpose: used to define a condition under which property state change
//          notifications should be fired
//
// Description:
//    REG_COMPARSIONTYPE ctComparisonType - how to compare the changed
// value with the value specified in TargetValue
//    DWORD dwMask - If this value is not set to 0 then TargetValue is
//                   interpreted as a DWORD. This mask is applied to the changed
//                   DWORD value before the comparison is done, the mask is
//                   not applied to TargetValue. If this value is set to 0 then
//                   TargetValue is interpreted as a string.
//    union TargetValue - if dwMask is set to 0 then the comparison is done
//                        between psz and the changed value. If dwMask is set
//                        to any value other than 0 then the comparison is done
//                        between dw and the masked (see dwMask) changed value.
//                        If the changed value is not of type REG_SZ nor
//                        REG_DWORD or if the changed value is of type REG_DWORD
//                        and dwMask is set to 0 or if the changed value is of
//                        type REG_SZ and dwMask is not set to 0, then the
```

```
//              notification is ignored. If the changed value is
//              deleted and the comparison is to be done against dw,
//              0 is used as the changed value and the comparison
//              proceeds as usual. If the value is deleted and the
//              comparison is to be done against psz, NULL is used as
//              the changed value and only REG_CT_EQUAL and
//              REG_CT_NOT_EQUAL are processed by the comparison, the
//              deletion notification is ignored if any other
//              ctComparisonType is used.
//
// ******************************************************
typedef struct tagNOTIFICATIONCONDITION
{
   REG_COMPARISONTYPE ctComparisonType;
   DWORD dwMask;
   union
   {
      LPCTSTR psz;
      DWORD dw;
   } TargetValue;
} NOTIFICATIONCONDITION;

// // Function Prototype: REGISTRYNOTIFYCALLBACK
//
// Purpose: defines the protoype of the callback used by RegisterNotifyCallback
//
// Arguments:
//    IN HREGNOTIFY hNotify - the handle to a valid HREGNOTIFY, this is the
//                 same handle returned from RegistryNotifyCallback
```

```
//    IN DWORD dwUserData - user data that was passed to RegistryNotifyCallback
//    IN const PBYTE pData - a pointer to the new value for the value, this
//                  is set to NULL if the value was deleted
//    IN const UINT cbData - the number of bytes to pointed to by pData, this
//                  value will be set to 0 if the value was deleted
//
// Description:
//    this callback used to notify clients that registered for notifications
//    using RegistryNotifyCallback. It is safe to call RegistryCloseNotification
//    from within the callback if no further notification are required.
//
// ****************************************************
typedef void (*REGISTRYNOTIFYCALLBACK)(HREGNOTIFY hNotify,
                DWORD dwUserData,
                const PBYTE pData,
                const UINT cbData);

// ********************************************************
// Function Name: RegistryGetDWORD
//
// Purpose: used to read a REG_DWORD registry value
//
// Arguments:
//    IN HKEY hKey - handle to a currently open key, or a predefined root value
//    IN LPCTSTR pszSubKey - the key under which the value is stored (if this
//                  value is null pszValueName is assumed to be under
//                  hKey)
//    IN LPCTSTR pszValueName - the name of the value to retrieve (may be NULL
//                  to retrieve the default value)
//    OUT DWORD * pdwData - a pointer to the buffer which will receive the
```

```
//                      data associated with the value
//
// Return Values:
//    HRESULT
//    S_OK - the data was copied to the buffer
//    E_INVALIDARG - hKey or pdwData is invalid
//    E_DATATYPE_MISMATCH - the value is not of type REG_DWORD
//    An error value returned from RegOpenKeyEx or RegQueryValueEx wrapped as
//    a FACILITY_WIN32 HRESULT
//
// Results:
//    SUCCEEDED - pData points to the data associated with the value
//    FAILED - no change.
//
// Description:
//    the DWORD associated with the value is copied to the buffer pointed to
//    by pData. If the key pointed to by hKey+pszSubKey does not exist,
//    RegistryGetDWORD will fail since it uses RegOpenKey to access the key
//
// *****************************************************
HRESULT WINAPI RegistryGetDWORD(HKEY hKey,
            LPCTSTR pszSubKey,
            LPCTSTR pszValueName,
            DWORD * pdwData);

// *****************************************************
// Function Name: RegistryGetString
//
// Purpose: used to read a REG_SZ registry value
```

```
//
// Arguments:
//   IN HKEY hKey - handle to a currently open key, or a predefined root value
//   IN LPCTSTR pszSubKey - the key under which the value is stored (if this
//                 value is null pszValueName is assumed to be under
//                 hKey)
//   IN LPCTSTR pszValueName - the name of the value to retrieve (may be NULL
//                  to retrieve the default value)
//   OUT LPTSTR pszData - a pointer to the buffer which will receive the
//                data associated with the value
//   IN UINT cchData - a pointer to the variable which is length in characters
//             of the buffer pointed to by pData
//
// Return Values:
//   HRESULT
//   S_OK - the data was copied to the buffer
//   E_INVALIDARG - hKey or pszData is invalid
//   E_DATATYPE_MISMATCH - the value is not of type REG_SZ
//   E_INSUFFICIENT_BUFFER - the size of the buffer pointed to by pszData, as
//                  determined by cchData is not large enough to hold
//                  the string
//   An error value returned from RegOpenKeyEx or RegQueryValueEx wrapped as
//   a FACILITY_WIN32 HRESULT
//
// Results:
//   SUCCEEDED - pData points to the data associated with the value
//   FAILED - no change.
//
// Description:
//   the string associated with the value is copied to the buffer pointed to
```

```
// by pData. If the key pointed to by hKey+pszSubKey does not exist,
// RegistryGetString will fail since it uses RegOpenKey to access the key
//
// ****************************************************************
HRESULT WINAPI RegistryGetString(HKEY hKey,
                LPCTSTR pszSubKey,
                LPCTSTR pszValueName,
                LPTSTR pszData,
                UINT cchData);

// ****************************************************************
// Function Name: RegistrySetDWORD
//
// Purpose: used to set a REG_DWORD registry value
//
// Arguments:
//    IN HKEY hKey - handle to a currently open key, or a predefined root value
//    IN LPCTSTR pszSubKey - the key under which the value is stored (if this
//                 value is null pszValueName is assumed to be under
//                 hKey)
//    IN LPCTSTR pszValueName - the name of the value to set (may be NULL
//                 to set the default value)
//    IN DWORD dwData - the new value
//
// Return Values:
//    HRESULT
//    S_OK - the data value for pszValueName was changed to the data in dwData
//    E_INVALIDARG - hKey is invalid
//    E_DATATYPE_MISMATCH - the value is not of type REG_DWORD
```

```
//    An error value returned from RegOpenKeyEx or RegQueryValueEx wrapped as
//    a FACILITY_WIN32 HRESULT
//
// Results:
//    SUCCEEDED - the data associated with the value was changed
//    FAILED - no change
//
// Description:
//    the data associated with the value is changed to the new value. If the
//    key pointed to by hKey+pszSubKey does not exist, RegistrySetDWORD will
//    fail since it uses RegOpenKey to access the key
//
// *********************************************************
HRESULT WINAPI RegistrySetDWORD(HKEY hKey,
            LPCTSTR pszSubKey,
            LPCTSTR pszValueName,
            DWORD dwData);

// *********************************************************
// Function Name: RegistrySetString
//
// Purpose: used to set a REG_SZ registry value
//
// Arguments:
//    IN HKEY hKey - handle to a currently open key, or a predefined root value
//    IN LPCTSTR pszSubKey - the key under which the value is stored (if this
//                  value is null pszValueName is assumed to be under
//                  hKey)
//    IN LPCTSTR pszValueName - the name of the value to set (may be NULL
```

```
//                      for to set the default value)
//    IN LPCTSTR pszData - the new value. This string is null terminated.
//
// Return Values:
//    HRESULT
//    S_OK - the data value for pszValueName was changed to the data in pszData
//    E_INVALIDARG - hKey or pszData is invalid
//    E_DATATYPE_MISMATCH - the value is not of type REG_SZ
//    An error value returned from RegOpenKeyEx or RegQueryValueEx wrapped as
//    a FACILITY_WIN32 HRESULT
//    An error HRESULT returned from StringCbLength
//
// Results:
//    SUCCEEDED - the data associated with the value was changed
//    FAILED - no change
//
// Description:
//    the data associated with the value is changed to the new value. If the
//    key pointed to by hKey+pszSubKey does not exist, RegistrySetString will
//    fail since it uses RegOpenKey to access the key
//
// ***************************************************************
HRESULT WINAPI RegistrySetString(HKEY hKey,
                LPCTSTR pszSubKey,
                LPCTSTR pszValueName,
                LPCTSTR pszData);

// ***************************************************************
// Function Name: RegistryTestExchangeDWORD
```

```
//
// Purpose: used to atomically set a value based on a condition
//
// Arguments:
//    IN HKEY hKey - handle to a currently open key, or a predefined root value
//    IN LPCTSTR pszSubKey - the key under which the value is stored (if this
//                   value is null pszValueName is assumed to be under
//                   hKey)
//    IN LPCTSTR pszValueName - the name of the value to set (may be NULL
//                   to set the default value)
//    IN DWORD dwOldValue - the value to check against
//    IN DWORD dwNewValue - the value to set conditionally
//
// Return Values:
//    HRESULT
//    S_OK - the data value was changed to dwNewValue
//    S_FALSE - the target value was not set to dwNewValue because the DWORD
//          value assocated with pszValueName was not equal to dwOldValue
//    E_INVALIDARG - the handle or one of the pointers passed in was invalid
//    E_DATATYPE_MISMATCH - the value is not of type REG_DWORD
//    E_NOT_FOUND - the value could not be found under the specified key
//    An error value wrapped as a FACILITY_WIN32 HRESULT
//
// Results:
//    SUCCEEDED - the data value associated with pszData was dwOldValue and is
//          now dwNewValue
//    FAILED - no change
//
// Description:
//    This function is an interlocked function — in other words, it can be
```

```
// considered atomic. It checks to see if the DWORD value associated with
// pszValueName is equal to OldValue. If so, it sets the target to NewValue,
// otherwise, it fails.
//
// ********************************************************
HRESULT WINAPI RegistryTestExchangeDWORD(HKEY hKey,
                LPCTSTR pszSubKey,
                LPCTSTR pszValueName,
                DWORD dwOldValue,
                DWORD dwNewValue);

// ****************************************************
// Function Name: RegistryNotifyApp
//
// Purpose: used to request that an app be launched or notified when a
//          specified value has been changed
//
// Arguments:
//   IN HKEY hKey - handle to a currently open key, or a predefined root value
//   IN LPCTSTR pszSubKey - the key under which the value is stored (if this
//                          value is null pszValueName is assumed to be under
//                          hKey)
//   IN LPCTSTR pszValueName - the name of the value on which change
//                             notifications are requested (may be NULL to
//                             indicate the default value)
//   IN LPCTSTR pszName - a user defined string representing this
//                        notification request, the string should be passed
//                        to RegistryStopNotification when notifications
//                        are no longer needed
```

```
//    IN LPCTSTR pszApp - pointer to string that is the path to the executable
//                to launch
//    IN LPCTSTR pszClass  - once the executable is launched, or if it is
//    IN LPCTSTR pszWindow   already running, a window with this window name and
//                    class type is located in the process and the
//                    notification is passed to it. If both of these
//                    parameter are null this function will only launch
//                    the application.
//    IN UINT msg - the message that will be passed to the window
//    IN NOTIFICATIONCONDITION * pCondition - the condition under which change
//                        notifications should be sent when
//                        a comparison of it to the new
//                        registry value is TRUE (may be
//                        NULL to indicate that any change
//                        should result in a notification)
//
// Return Values:
//    HRESULT
//    S_OK - the request for notification has been added to the notification
//        list
//    E_INVALIDARG - hKey, pszApp, or pszName is invalid
//    E_ALREADY_REGISTERED - a notification with a name equal to that specified
//                by pszName already exists
//    An error value wrapped as a FACILITY_WIN32 HRESULT
//
// Results:
//    SUCCEEDED - the caller will now be notified every time a change to this
//          value is made.
//    FAILED - no change
//
```

```
// Description:
//   The notification request is added to the notification list. The caller
//   calls RegistryStopNotification to stop further notifications. This
//   type of notification request is permanent, that is, the notification
//   request will be active even if the device is reset. On notification, this
//   function determines if an executable with the name specified in pszApp
//   is already running by doing a FindWindow on the class name and window name
//   specified by pszClass and pszWindow, if not it launches the app. The
//   command line passed to the application should be specified in the pszApp
//   string, in addition to any command line specified by the user, the
//   following is appended:
//       /notify "pszName"
//       pszName - the handle string passed to the function in the pszName
//           parameter
//   After the app is launched a FindWindow is done looking for a window with
//   the class name and window name specified in pszClass and pszWindow. If the
//   window is found, the message specified by msg is posted as in
//   RegistryNotifyWindow, via PostMessage. The parameters to the PostMessage
//   are as follows:
//       WPARAM - for values of type REG_DWORD this is the new value or 0
//           if the value was deleted; for all other types this value
//           is 0
//       LPARAM - 0
//   The msg parameter should be unique for each call to RegistryNotifyApp
//   so that the client can differentiate between the multiple notifications.
//   The client will be notified when the value is added as well as on changes.
//   When a notification arrives, if the application pointed to by pszApp can
//   not be launched or a window with a class of type pszClass can not be found
//   or the PostMessage fails, the notification will be removed from the
//   notification list.
```

```
//
// *****************************************************************
HRESULT WINAPI RegistryNotifyApp(HKEY hKey,
            LPCTSTR pszSubKey,
            LPCTSTR pszValueName,
            LPCTSTR pszName,
            LPCTSTR pszApp,
            LPCTSTR pszClass,
            LPCTSTR pszWindow,
            UINT msg,
            NOTIFICATIONCONDITION * pCondition);

// *****************************************************************
// Function Name: RegistryNotifyWindow
//
// Purpose: used to request that a window be notified when a specified value
//      has been changed
//
// Arguments:
//   IN HKEY hKey - handle to a currently open key, or a predefined root value
//   IN LPCTSTR pszSubKey - the key under which the value is stored (if this
//               value is null pszValueName is assumed to be under
//               hKey)
//   IN LPCTSTR pszValueName - the name of the value on which change
//                 notifications are requested (may be NULL to
//                 indicate the default value)
//   IN HWND hWnd - the handle of the window to which the message will be sent
//   IN UINT msg - the message that will be passed to the window
//   IN DWORD dwUserData - user data that will be passed back to the user
```

```
//                      with the notification
// IN NOTIFICATIONCONDITION * pCondition - the condition under which change
//                      notifications should be sent when
//                      a comparison of it to the new
//                      registry value is TRUE (may be
//                      NULL to indicate that any change
//                      should result in a notification)
// OUT HREGNOTIFY * phNotify - receives the handle to the notification
//                      request. This handle should be closed using
//                      RegistryCloseNotification when notifications
//                      on this key are no longer needed.
//
// Return Values:
//   HRESULT
//   S_OK - the request for notification has been added to the notification
//          list
//   E_INVALIDARG - hKey, phNotify or hWnd is invalid
//   An error value wrapped as a FACILITY_WIN32 HRESULT
//
// Results:
//   SUCCEEDED - the caller will now be notified every time a change to this
//               value is made.
//   FAILED - no change
//
// Description:
//   The msg parameter should be unique for each call to RegistryNotifyWindow
//   so that the client can differentiate between the multiple notifications.
//   The notification request is added to the notification list. The caller
//   calls RegistryCloseNotification to stop further notifications and to
//   close the notification handle. This type of notification request is
```

// transient, that is, if the device is reset the notification request will
// no longer exist. When the value specified by pszValueName is changed, the
// client is notified via a PostMessage. If the PostMessage fails or the
// window specified by hWnd is no longer valid the notification request is
// removed from the notification queue and the handle returned in phNotify
// is closed.
// The parameters passed on the PostMessage are as follows:
//   WPARAM - for values of type REG_DWORD this is the new value or 0
//       if the value was deleted; for all other types this value is 0
//   LPARAM - the value passed in on dwUserData
// If the value does not exist at the time of the call to
// RegistryNotifyWindow, the client will be notified when the value is added.
//
// ************************************************************
HRESULT WINAPI RegistryNotifyWindow(HKEY hKey,
            LPCTSTR pszSubKey,
            LPCTSTR pszValueName,
            HWND hWnd,
            UINT msg,
            DWORD dwUserData,
            NOTIFICATIONCONDITION * pCondition,
            HREGNOTIFY * phNotify);

// ************************************************************
// Function Name: RegistryNotifyMsgQueue
//
// Purpose: used to request that a message queue be notified when a specified
//     value has been changed
//

```
// Arguments:
//   IN HKEY hKey - handle to a currently open key, or a predefined root value
//   IN LPCTSTR pszSubKey - the key under which the value is stored (if this
//                   value is null pszValueName is assumed to be under
//                   hKey)
//   IN LPCTSTR pszValueName - the name of the value on which change
//                   notifications are requested (may be NULL to
//                   indicate the default value)
//   IN LPCTSTR pszMsgQueue - A pointer to a string that is the name of the
//                   message queue to notify. If this message queue
//                   has not yet been created, RegistryNotifyMsgQueue
//                   will create it.
//   IN DWORD dwUserData - user data that will be passed back to the user
//                   with the notification
//   IN NOTIFICATIONCONDITION * pCondition - the condition under which change
//                   notifications should be sent when
//                   a comparison of it to the new
//                   registry value is TRUE (may be
//                   NULL to indicate that any change
//                   should result in a notification)
//   OUT HREGNOTIFY * phNotify - receives the handle to the notification
//                   request. This handle should be closed using
//                   RegistryCloseNotification when notifications
//                   on this key are no longer needed.
//
// Return Values:
//   HRESULT
//   S_OK - the request for notification has been added to the notification
//       list
//   E_INVALIDARG - hKey, phNotify, or pszMsgQueue is invalid
```

```
//    An error value wrapped as a FACILITY_WIN32 HRESULT
//
// Results:
//    SUCCEEDED - the caller will now be notified every time a change to this
//        value is made.
//    FAILED - no change
//
// Description:
//    The notification request is added to the notification list. The caller
//    calls RegistryCloseNotification to stop further notifications and
//    close the notification handle. This type of notification request is
//    transient, that is, if the device is reset the notification request will
//    no longer exist. The client will be notified of changes via the message
//    queue. Once the client is notified, information about the changed key can
//    be retrieved using the ReadMsgQueue function. The data returned is in the
//    following format:
//       | HREGNOTIFY hNotify | DWORD dwUserData | UINT byte count | BYTE[] new value |
//       hNotify - the same hNotify as returned in phNotify
//       dwUserData - the user data passed as dwUserData
//       byte count - the number of bytes to follow (for deletes this value is 0)
//       new value - the new value for pszValueName
//    If the value does not exist at the time of the call to
//    RegistryNotifyMsgQueue, the client will be notified when the value is
//    added.
//
// *************************************************************
HRESULT WINAPI RegistryNotifyMsgQueue(HKEY hKey,
                LPCTSTR pszSubKey,
                LPCTSTR pszValueName,
```

```
            LPCTSTR pszMsgQueue,
            DWORD dwUserData,
            NOTIFICATIONCONDITION * pCondition,
            HREGNOTIFY * phNotify);

// ***********************************************************
// Function Name: RegistryNotifyCallback
//
// Purpose: used to request that a callback be notified when a specified
//          value has been changed
//
// Arguments:
//    IN HKEY hKey - handle to a currently open key, or a predefined root value
//    IN LPCTSTR pszSubKey - the key under which the value is stored (if this
//                           value is null pszValueName is assumed to be under
//                           hKey)
//    IN LPCTSTR pszValueName - the name of the value on which change
//                              notifications are requested (may be NULL to
//                              indicate the default value)
//    IN REGISTRYNOTIFYCALLBACK pfnRegistryNotifyCallback - A pointer to a
//                                  function that will
//                                  be called back when
//                                  a notification
//                                  arrives
//    IN DWORD dwUserData - user data that will be passed back to the user
//                          with the notification
//    IN NOTIFICATIONCONDITION * pCondition - the condition under which change
//                                    notifications should be sent when
//                                    a comparison of it to the new
```

```
//                          registry value is TRUE (may be
//                          NULL to indicate that any change
//                          should result in a notification)
//   OUT HREGNOTIFY * phNotify - receives the handle to the notification
//                          request. This handle should be closed using
//                          RegistryCloseNotification when notifications
//                          on this key are no longer needed.
//
// Return Values:
//   HRESULT
//   S_OK - the request for notification has been added to the notification
//          list
//   E_INVALIDARG - hKey, phNotify, or pfnRegistryNotifyCallback is invalid
//   An error value wrapped as a FACILITY_WIN32 HRESULT
//
// Results:
//   SUCCEEDED - the caller will now be notified every time a change to this
//          value is made.
//   FAILED - no change
//
// Description:
//   The notification request is added to the notification list. The caller
//   calls RegistryCloseNotification to stop further notifications and
//   close the notification handle. This type of notification request is
//   transient, that is, if the device is reset the notification request will
//   no longer exist. The client will be notified of changes via the callback.
//   If the value does not exist at the time of the call to
//   RegistryNotifyCallback, the client will be notified when the value is
//   added.
//
```

```
//
//******************************************************************
//****
HRESULT WINAPI RegistryNotifyCallback(HKEY hKey,
                LPCTSTR pszSubKey,
                LPCTSTR pszValueName,
                REGISTRYNOTIFYCALLBACK pfnRegistryNotifyCallback,
                DWORD dwUserData,
                NOTIFICATIONCONDITION * pCondition,
                HREGNOTIFY * phNotify);

// ****************************************************************
// Function Name: RegistryCloseNotification
//
// Purpose: used remove a request for notifications from the notification list
//          and close the notification handle
//
// Arguments:
//    IN HREGNOTIFY hNotify - the handle to a valid HREGNOTIFY, must have been
//                   returned one of the RegistryNotify* functions
//
// Return Values:
//    HRESULT
//    S_OK - the notification request was removed from the list
//    E_INVALID_HANDLE - hNotify is invalid
//    An error value wrapped as a FACILITY_WIN32 HRESULT
//
// Results:
//    SUCCEEDED - the notification request has been removed, hNotify is now
```

```
//            an invalid handle
// FAILED - no change
//
// Description:
//   the notification list is searched for references to hNotify, if found
//   they are removed the queue and the memory associated with hNotify is
//   freed. Any notifications that have not yet been dispatched to the client
//   will be lost.
//
// *************************************************************
HRESULT WINAPI RegistryCloseNotification(HREGNOTIFY hNotify);

// *************************************************************
// Function Name: RegistryStopNotification
//
// Purpose: used to remove a request for a permanent notification from
//          the notification list
//
// Arguments:
//   IN LPCTSTR pszName - a string representing a permanent notification
//                        that has already been registered
//
// Return Values:
//   HRESULT
//   S_OK - the notification request was removed from the list
//   E_INVALIDARG - pszName is invalid
//   An error value wrapped as a FACILITY_WIN32 HRESULT
//
// Results:
```

```
//    SUCCEEDED - the notification request has been removed
//    FAILED - no change
//
// Description:
//    The notification list is searched for references to the notification,
//    if found they are removed the queue. Any notifications that have not
//    yet been dispatched to the client are lost.
//
// *************************************************************

HRESULT WINAPI RegistryStopNotification(LPCTSTR pszName);

// *************************************************************
// Function Name: RegistryBatchNotification
//
// Purpose: used to batch frequently occurring notifications
//
// Arguments:
//    IN HREGNOTIFY hNotify - the handle to a valid HREGNOTIFY, has been
//                            returned one of the RegistryNotify* functions
//    IN DWORD dwMillisecondsIdle - the number of milliseconds the value should
//                                  be constant before the notification is fired
//    IN DWORD dwMillisecondsMax - the maximum number of milliseconds between
//                                 the time the first change happens and the
//                                 notification is sent
//
// Return Values:
//    HRESULT
//    S_OK - the notification request was removed from the list
//    E_INVALIDARG - dwMillisecondsIdle is set to INFINITE
```

```
//    E_INVALID_HANDLE - hNotify is invalid
//    An error value wrapped as a FACILITY_WIN32 HRESULT
//
// Results:
//    SUCCEEDED - the new batch times are set
//    FAILED - no change
//
// Description:
//    when a value is changed, the notification system waits
//    dwMillisecondsIdle milliseconds and then sends the notification. If a
//    another change happens during that wait period the timer is reset and
//    the notification system will wait another dwMillisecondsIdle
//    milliseconds to send the notification. In order to ensure that the
//    dwMillisecondsIdle doesn't prevent the notification from ever being
//    sent, dwMillisecondsMax is used. dwMillisecondsMax is the maximum
//    number of milliseconds that can pass from the time the first notification
//    arrives and the time notification is sent. If dwMillisecondsMax is set to
//    INFINITE the notification will batch until the value is idle.
//    dwMillisecondsIdle can not be INFINITE.
//
// *************************************************************
HRESULT WINAPI RegistryBatchNotification(HREGNOTIFY hNotify,
                DWORD dwMillisecondsIdle,
                DWORD dwMillisecondsMax);

HRESULT WINAPI RegistryScheduleNotifications(SYSTEMTIME * pstStart,
                DWORD dwIntervalMinutes,
                RSN_BEHAVIOR rsnBehavior,
                LPCTSTR pszName,
                LPCTSTR pszApp,
```

```
            LPCTSTR pszClass,
            LPCTSTR pszWindow,
            UINT msg);
```

Managed API

The following is an exemplary Managed API:

```
namespace A.Mobile
{
/// used to specify what should happen when an event occurs while device is in standby
        public enum StandbyBehavior
    {
            /// do not raise the event at all
            Ignore,
            /// bring the device out of standby and raise the event
            Wake,
            /// raise the event once the device is woken up by something else
            Delay
    } public interface IAppLaunchable
    {
            /// Unique name for this notification
            public string appLaunchId{ get; }

/// register this notification for a specific executable and command line params
        /// until this is called, the notification is not active /// <param name="appLaunchId">
            /// unique identifier for this notification.
```

/// used to open it back up when the application closes/restarts

/// an exception is thrown if this ID is already in use

/// </param>

/// <param name="filename">

/// application to launch when notification is raised.

/// if null or empty, the calling executable is used

/// </param>

/// <param name="parameters">command line parameter to send to application</param> void EnableAppLaunch( string appLaunchId, string filename, string parameters );

/// register this notification for a specific executable with no command line params /// until this is called, the notification is not active /// <param name="appLaunchId">

/// unique identifier for this notification.

/// used to open it back up when the application closes/restarts

/// an exception is thrown if this ID is already in use

/// </param>

/// <param name="filename">application to launch when notification is raised</param> void EnableAppLaunch( string appLaunchId, string filename);

/// register this notification for the calling executable with no parameters

/// until this is called, the notification is not active.

///

/// if this is called from a DLL rather than an EXE, an exception is thrown.

/// DLLs need to call one of the other overloads

/// <param name="appLaunchId">

/// unique identifier for this notification.

```
/// used to open it back up when the application closes/restarts
/// an exception is thrown if this ID is already in use
/// </param>
void EnableAppLaunch( string appLaunchId );
/// unregistr this notification
/// used to stop the notification from firing
void DisableAppLaunch();
}
/// notification that raises on a scheduled basis
    public class ScheduledNotification : ILaunchable
    {
        // when the next occurence of this notification is scheduled to occur
        public DateTime NextOccurrence{ get; set; }

/// how much time passes between occurrences of this notification
        /// seconds and milliseconds are ignored
        public TimeSpan Interval{ get; set; }

/// how this notification acts when the device is in standby during an occurrence
        /// ignore it, wake the device, wait until something else wakes the device.
        /// default value is Wake.
        public StandbyBehavior StandbyBehavior{ get; set; }

/// determines if the named notification is registered
        /// <param name="appLaunchId">name of a notification</param>
        /// <returns>true if the notification is registered</returns>
        public static bool AppLaunchIdExists( string appLaunchId ) { } public event EventHandler Occurred;
```

```
            /// create a new persistent notification with the given name
            /// <param name="nextOccurrence">when the next occurrence
is</param>
            /// <param name="interval">how long between occurrences. seconds
and milliseconds are ignored</param>
            public ScheduledNotification( DateTime nextOccurrence, TimeSpan
interval ) { }
            /// constructor that loads in a previously registered notification
            /// <param name="existingAppLaunchId">name of previously registered
notification</param>
            public ScheduledNotification( string existingAppLaunchId )
            {
                if (!AppLaunchIdExists( name ))
                    throw new ArgumentException();
            }
        }
    } namespace A. Mobile.Status
{
    /// used for conditional change notifications to specify how the new value
    /// should be compared to the desired value
    public enum StateComparisonType
    {
        /// event is raised regardless of value. this is the default
        All,
        Equal,
        NotEqual,
        Greater,
```

```
            GreaterOrEqual,
            LessOrEqual,
            Less,
            Contains,
            StartsWith,
            EndsWith
        }
        /// Enum that represents all of the system states that can be queried and listened to.

public abstract class StateBase : ILaunchable
        {
            /// for conditional notifications, how to compare new value to TargetValue
            public ComparisonType ComparisonType { get; set; }

/// what to compare new value to.  notification only raises if comparison is true
            public object ComparisonValue { get; set; }
            /// current value of this system property
            public object CurrentValue { get; } public event ChangeNotificationEventHandler Changed;
        }
        /// transient notification that raises when a system-defined property changes
        public class SystemState : StateBase
        {
            /// gets the value of the specified system property
            /// <param name="property">property to get the value of</param>
            /// <returns></returns>
```

```csharp
public static object GetValue( SystemProperty property ) { }

/// system property to monitor
public SystemProperty Property { get; }
/// determines if the named notification is registered
/// <param name="appLaunchId">name of a notification</param>
/// <returns>true if the notification is registered</returns>
public static bool AppLaunchIdExists( string appLaunchId ) { }

/// constructor with no conditionals (event is always raised)
/// <param name="property"></param>
public SystemState( SystemProperty property ) { }
/// constructor thats sets conditionals for when event should be raised
/// <param name="property">property to watch</param>
/// <param name="comparisonType">how to compare it</param>
/// <param name="comparisonValue">what to compare it to</param>
public SystemState( SystemProperty property, ComparisonType comparisonType, object comparisonValue ) { }

/// constructor that loads in a previously registered notification
/// <param name="existingAppLaunchId">name of previously registered notification</param>
public SystemState( string existingAppLaunchId )
{
    if (!AppLaunchIdExists( name ) )
        throw new ArgumentException();
}

}
```

```
/// transient notification that raises when a registry value changes
public class RegistryValue : StateBase
{
    /// registry key to monitor
    public RegistryKey Key { get; }

/// name of value in registry key to monitor
    public string ValueName { get; }

/// determines if the named notification is registered
    /// <param name="appLaunchId">name of a notification</param>
    /// <returns>true if the notification is registered</returns>
    public static bool AppLaunchIdExists( string appLaunchId ) { }

/// constructor with no conditionals (event is always raised)
    /// <param name="key">registry key to watch</param>
    /// <param name="valueName">name of registry value in the key to watch</param>
    public RegistryValue( RegistryKey key, string valueName ) { }

/// constructor thats sets conditionals for when event should be raised
    /// <param name="key">registry key to watch</param>
    /// <param name="valueName">name of registry value in the key to watch</param>
    /// <param name="comparisonType">how to compare it</param>
    /// <param name="comparisonValue">what to compare it to</param>
    public RegistryValue( RegistryKey key, string valueName,
        ComparisonType comparisonType, object comparisonValue ) { }

/// constructor that loads in a previously registered notification
```

```
            /// <param name="existingAppLaunchId">name of previously registered
notification</param>
            public RegistryValue( string existingAppLaunchId )
            {
                if (!AppLaunchIdExists( name ) )
                    throw new ArgumentException();
            }
        } public delegate void ChangeNotificationEventHandler( object sender,
ChangeNotificationEventArgs e );
        public class ChangeNotificationEventArgs : EventArgs
        {
            public object CurrentValue { get; }
        }
}
```

Sample Usage of Managed API

```
// querying a system property
int signal = SystemState.PhoneSignalStrength;
// or...
int signal = (int)SystemState.GetValue( SystemProperty.PhoneSignalStrength );
// or...
SystemState state = new SystemState( SystemProperty.PhoneSignalStrength );
int signal = (int)state.CurrentValue;
```

```
// registering for a transient notification
SystemState state = new SystemState( SystemProperty.PhoneSignalStrength );
```

```
state.Changed += new ChangeNotificationEventHandler( ... );
```

---

```
// registering for a persistent notification with conditional
SystemState state;
if( SystemState.AppLaunchIdExists( "MyApp.GoodSignal" ) )
{
    state = new SystemState( "MyApp.GoodSignal" );
}
else
{
    state = new SystemState( SystemProperty.PhoneSignalStrength,
ComparisonType.Greater, 75 );
    state.EnableAppLaunch( "MyApp.GoodSignal" );
}
state.Changed += new ChangeNotificationEventHandler( ... );
```

---

```
// registering for a scheduled notification
ScheduledNotification daily;
if( ScheduledNotification.AppLaunchIdExists( "MyApp.Daily" ) )
{
    daily= new ScheduledNotification( "MyApp.Daily" );
}
else
{
    daily = new ScheduledNotification( DateTime.Now, new TimeSpan( 24, 0, 0 ) );
    daily.EnableAppLaunch( "MyApp.Daily" );
}
            daily.Occurred += new EventHandler( ... );
```

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for providing notifications to clients in response to state property changes, comprising:
    at a notification broker that is located on a computing device, receiving an automatic notification request from a client application on the computing device to receive a notification in response to an event that originates on the computing device; wherein the event is associated with a change in a state property of the computing device, wherein execution of the client application on the computing device is dependent upon a received notification; wherein an Application Program Interface (API) is utilized by the client application to register the notification request, wherein the notification request made through the API specifies to receive a notification upon an occurrence of at least one of: when a registered state property changes, when a change to the state property meets a conditional expression that is specified through the API, and upon a schedule determined by the client, wherein the API also comprises functions for: registering different state properties across different components of the computing device to be monitored for changes by the notification broker; querying each of the state properties to determine a value; and setting the state properties;
    ensuring that the state property is registered with the notification broker, wherein the notification broker includes state properties that are updated by different components within the computing device;
    determining when the state property changes, wherein determining when the state property changes comprises using the API to specify a batching operation on changes to the state property that occur within a predetermined time period; wherein a call to the API batching operation specifies a time period for which a value of the state property is to remain constant before notifying the client application of a change to the state property;
    determining when the client should receive notification of the state property change; and
    the notification broker on the computing device notifying the client of the state property change when determined.

2. The method of claim 1, wherein the notification request specified through the API comprises indicating when the notification is a permanent notification request and when the notification is a transient notification request; wherein the permanent notification request is stored by the notification broker in a data-store on the computing device that maintains the notification request across a reboot; wherein the transient notification is not maintained across the reboot.

3. The method of claim 1, wherein the API includes functionality for specifying an action of the computing device when a change occurs to a registered state property when the computing device is in a standby mode, wherein the action comprise: ignoring the change, bringing the device out of the standby mode and raising the event when the computing device is taken out of the standby mode by a different event.

4. The method of claim 1, wherein the conditional expression is expressed through the API using the following conditions: all, equal, not equal, greater than, greater or equal than, less than or equal, less than, contains, starts with, and ends with.

5. The method of claim 1, further comprising using the API to specify when to launch the client application in response to at least one of: a state property change and a scheduled event and when to notify a window of a client and notify a callback when a state property changes.

6. The method of claim 1, further comprising specifying through the API a friendly string name that identifies one of the registered state properties; wherein a friendly string name for a parent state property identifies state properties common to the parent state property and children state properties of the parent state property.

7. The method of claim 1, wherein receiving the notification request from the client to receive the notification in response to the change associated with the state property, further comprises using the API to associate a group of state properties with the notification request from the client when an identifier associated with the request identifies a category of state properties, wherein the state properties are arrange in a hierarchy within the notification system.

8. The method of claim 1, further comprising providing pre-loaded state properties that may be accessed by the clients without any client having to register the pre-loaded state properties with the notification broker; wherein the pre-loaded state properties comprise a majority of the following states: a display orientation state; an undismissed reminders state; an undismissed alarms state; a battery state; a memory state; a storage card state; a hardware state, a keyboard enabled state, a Wifi enabled state, a Bluetooth enabled state, a headphones state, a camera state; a messaging state; a tasks state; a calendar state; an Instant Messenger state; a connectivity state; a media player state; a synchronization status state; and a telephony state.

9. A system for state management and notifications, comprising:
    a processing unit;
    a data store on a mobile device that is arranged to store information relating to state properties, wherein at least some of the state properties are modified by different components;
    an Application Program Interface (API) configured to perform operations relating to the state properties; wherein the API includes functions comprising: registering the state properties to be monitored for changes by a notification broker; querying the state properties; setting the state properties; registering notification requests relating to the state properties; launching an application; and comparing the state properties to conditional expressions; using the API to specify a batching operation on changes to the state property that occur within a predetermined time period; wherein a call to the API batching operation specifies a time period for which a value of the state property is to remain constant before notifying a client application of a change to the state property;
    client applications that are configured to execute using the processing unit and automatically register notification requests using the API and receive notifications in response to a change in a state property for which they have registered to receive a notification, wherein the notification requests indicate when the clients should receive notifications in response to changes associated with the state properties, and wherein execution of the client applications is dependent upon a received notification; wherein the change in the state property is responsive to an event that originates on a device executing the client application;

a notification list stored within the data store that is arranged to store the clients that have been registered to receive notification requests;

the notification broker coupled to the data store, the notification list, and the clients, wherein the notification broker, includes functionality configured to perform the following actions, including to:

receive a notification request to add at least one client to the notification list;

add the at least one client to the notification list; and determine when a registered state property changes, and when the state property changes, determine the clients to receive a notification, and notify the determined clients of the state property change.

10. The system of claim 9, wherein determining the clients to receive the notification, comprises: applying a conditional expression specified through the API to the state property before notifying the client of the change to the state property.

11. The system of claim 10, wherein the conditional expression specified through the API comprises the following conditions: all, equal, not equal, greater than, greater or equal than, less than or equal, less than, contains, starts with, and ends with.

12. The system of claim 10, further comprising either launching the client or notifying the client in response to a change to a registered state property.

13. The system of claim 9, further comprising specifying through the API a friendly string name that identifies one of the registered state properties; wherein a friendly string name for a parent state property identifies state properties common to the parent state property and children state properties of the parent state property.

14. The system of claim 9, wherein value of the state properties within the data store persists across device reboots and wherein the API includes functionality for specifying an action when a change occurs to a registered state property when a computing device executing the client application to be notified is in a standby mode, wherein the action comprise: ignoring the change, bringing the computing device out of the standby mode and raising the event when the computing device is taken out of the standby mode by a different event.

15. A computer-readable storage device having computer executable instructions for performing operations on state properties, comprising:

receiving at a notification broker on a device an automatic request from a client application that is executed on the device to receive an identifier identifying at least one state property within a group of state properties of the device such that the execution of the client application on the device is in response to the state properties associated with the device on which the client application resides; wherein state properties within the group of state properties are updated by different components on the device; wherein the state properties change is response to an event that originates on the device; wherein an Application Program Interface (API) is utilized by the client application to register the request and comprises functions for: registering state properties to be monitored for changes by a notification broker; querying the state properties; and setting the state properties; using the API to specify a batching operation on changes to the state property that occur within a predetermined time period; wherein a call to the API batching operation specifies a time period for which a value of the state property is to remain constant before notifying the client application of a change to the state property;

receiving the identifier at the device that indicates the at least one state property within a group of state properties of the device;

determining an operation to perform on the device relating to a state property within the group of state properties; and performing the operation on the device in response to the received identifier.

16. The computer-readable storage device of claim 15, wherein performing the operation, comprises: applying a conditional expression specified through the API to the state property and notifying the client of the state property when the condition is met; wherein the conditional expression includes at least one of the following conditions: all, equal, not equal, greater than, greater or equal than, less than or equal, less than, contains, starts with, and ends with.

17. The computer-readable storage device of claim 15, wherein performing the operation further comprises launching a client application or notifying the client application in response to at least one of the following: a change in the state property and a scheduled event.

18. The computer-readable storage device of claim 15, wherein the API further comprises functionality for the client application specifying a batching operation for changes to the state property that occur within a predetermined time period and specifying a wake up condition for the device when the device is in a standby mode and a change occurs to a registered state property.

* * * * *